(12) United States Patent  
Sato et al.

(10) Patent No.: US 8,184,194 B2  
(45) Date of Patent: May 22, 2012

(54) IMAGE PROCESSING APPARATUS, IMAGE DIVISION PROGRAM AND IMAGE SYNTHESISING METHOD

(75) Inventors: Satoshi Sato, Osaka (JP); Katsuhiro Kanamori, Nara (JP)

(73) Assignee: Panasonic Corporation, Osaka (JP)

( * ) Notice: Subject to any disclaimer, the term of this patent is extended or adjusted under 35 U.S.C. 154(b) by 188 days.

(21) Appl. No.: 12/674,538

(22) PCT Filed: May 15, 2009

(86) PCT No.: PCT/JP2009/002164  
§ 371 (c)(1),  
(2), (4) Date: Feb. 22, 2010

(87) PCT Pub. No.: WO2009/157129  
PCT Pub. Date: Dec. 30, 2009

(65) Prior Publication Data  
US 2010/0283883 A1     Nov. 11, 2010

(30) Foreign Application Priority Data  
Jun. 26, 2008   (JP) ................................ 2008-167645

(51) Int. Cl.  
*G02B 13/16* (2006.01)  
*H04N 5/225* (2006.01)

(52) U.S. Cl. ............ 348/335; 353/20; 353/25; 353/121; 353/28; 382/162; 382/167; 356/364

(58) Field of Classification Search ............... 353/20, 353/25, 121, 28; 382/162, 167; 356/364; 348/335  
See application file for complete search history.

(56) References Cited

U.S. PATENT DOCUMENTS

| | | | |
|---|---|---|---|
| 5,028,138 A | | 7/1991 | Wolff |
| RE37,752 E | * | 6/2002 | Wolff .................... 348/207.99 |
| 7,136,217 B2 | | 11/2006 | Kawakami et al. |
| 7,626,585 B2 | * | 12/2009 | Kondo et al. ............... 345/426 |
| 7,760,256 B2 | * | 7/2010 | Kanamori et al. ........... 348/280 |
| 7,792,367 B2 | * | 9/2010 | Kanamori et al. ........... 382/224 |
| 7,948,622 B2 | * | 5/2011 | Kanamori et al. ........... 356/364 |

(Continued)

FOREIGN PATENT DOCUMENTS

JP     11-211433     8/1999

(Continued)

OTHER PUBLICATIONS

International Search Report for corresponding application No. PCT/JP2009/002164 dated Jul. 21, 2009.

(Continued)

*Primary Examiner* — David Ometz  
*Assistant Examiner* — Antoinette Spinks  
(74) *Attorney, Agent, or Firm* — Renner, Otto, Boisselle & Sklar, LLP

(57) ABSTRACT

A polarization image capturing section 103 obtains a first polarization image containing polarization information. A polarization information obtaining section 104 obtains first polarization information from the first polarization image. An illumination control section 102 changes an illumination section 101 and again obtains a second polarization image by means of the polarization image capturing section 103. The polarization information obtaining section 104 obtains second polarization information from the second polarization image. A light source dependency estimation section 105 obtains light source dependency from the first and second polarization information obtained from the first and second polarization images. An area dividing section 106 performs an area division by using the polarization information and light source dependency information.

18 Claims, 76 Drawing Sheets

U.S. PATENT DOCUMENTS

| | | | |
|---|---|---|---|
| 8,025,408 B2 * | 9/2011 | Sato et al. | 353/20 |
| 2003/0147431 A1 * | 8/2003 | Funakawa et al. | 372/20 |
| 2005/0133879 A1 * | 6/2005 | Yamaguti et al. | 257/435 |
| 2006/0044514 A1 * | 3/2006 | Ushigome | 353/20 |
| 2007/0200938 A1 * | 8/2007 | Kaku et al. | 348/239 |
| 2007/0222781 A1 | 9/2007 | Kanamori et al. | |
| 2008/0198333 A1 * | 8/2008 | Ushigome | 353/20 |
| 2009/0278954 A1 * | 11/2009 | Kanamori et al. | 348/222.1 |
| 2010/0303344 A1 * | 12/2010 | Sato et al. | 382/162 |

FOREIGN PATENT DOCUMENTS

| | | |
|---|---|---|
| JP | 2002-024818 | 1/2002 |
| JP | 2003-091726 | 3/2003 |
| WO | 2007/029446 A1 | 3/2007 |

OTHER PUBLICATIONS

L.B. Wolff and T.E. Boult, "Constraining Object Features Using a Polarization Reflectance Model", IEEE Transactions on Pattern Analysis and Machine Intelligence, vol. 13, No. 7, 1991, pp. 635-657, (cited in [0012], p. 5 of the specification).

Y. Sato et al., "Object Shape and Reflectance Modeling from Observation", SIGGRAPH 97, 1997, pp. 379-387, (cited in [0003], p. 2 of the specification).

Daisuke Miyazaki et al., "Wavelet-Texture Method: BTF Compression by Using Daubechies Wavelet, Parametric Reflection Model, and Circular Polarizer", Trans. of IEICE, vol. J90-D, No. 8, 2007, pp. 2081-2093, (cited in [0003], p. 2 of the specification) and a concise explanation.

T. Shibata et al., "Creating Photorealistic Virtual Model with Polarization based Vision System" in Proceedings of SPIE (Polarization Science and Remote Sensing II, Part of SPIE's International Symposium on Optics and Photonics 2005), vol. 5888, 2005, pp. 25-35 (cited in [0003], p. 2 of the specification).

T. Kawashima et al., "Development of polarization imaging device and applications by using patterned polarizer", Institute of IEICE General Conference 2006, No. D-11-52, 2006, p. 52, (cited in [0067], p. 48 of the specification).

Ondrej Drbohlav and Radim Sara, "Using Polarization to Determine Intrinsic Surface Properties", Proc. SPIE vol. 3826, 1999, pp. 253-263 (cited in [0131], p. 85 of the specification).

Megumi Saito et al., "Measurement of Surface Orientations of Transparent Objects Using Polarization in Highlight", Trans. of IEICE, D-II, vol. J82-D-II, No. 9, 1999, pp. 1383-1390 (cited in [0161], p. 105 of the specification) and a concise explanation.

Masayuki Kanbara and Naokazu Yokoya, "Geometric and Photometric Registration for Vision-based Augmented Reality", IEICE Technical Report, PRMU2002-190, 2003, pp. 7-12 (1-6), (cited in [0213], p. 133 of the specification).

Daisuke Miyazaki and Katsushi Ikeuchi, "A Method to Estimate Surface Shape of Transparent Objects by Using Polarization Raytracing Method", Trans. of IEICE, vol. J88-D-II, No. 8, 2005, pp. 1432-1439, (cited in [0220], p. 137 of the specification) and a concise explanation.

H. Hayakawa, "Photometric stereo under a light source with arbitrary motion", Journal of the Optical Society of America A, vol. 11, No. 11, 1994, pp. 3079-89, (cited in [0221], p. 137 of the specification).

Noboru Ota, "Fundamentals of Color Reproduction Optics", Corona Publishing Co., Ltd., pp. 90-92 (cited in [0260], p. 159 of the specification) and a concise explanation.

K. Ikeuchi and K. Sato, "Determining Reflectance Properties of an Object Using Range and Brightness Images", IEEE Transactions on Pattern Analysis and Machine Intelligence, vol. 13, No. 11, 1991, pp. 1139-1153, (cited in [0285], p. 171 of the specification).

Co-pending U.S. Appl. No. 12/672,940, filed on Feb. 10, 2010.

* cited by examiner

*FIG. 10*
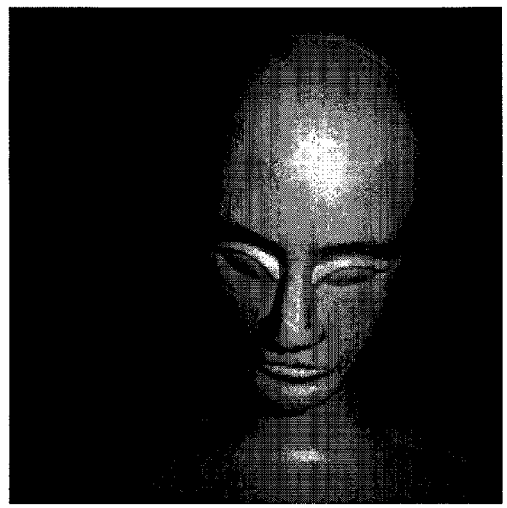
(a)
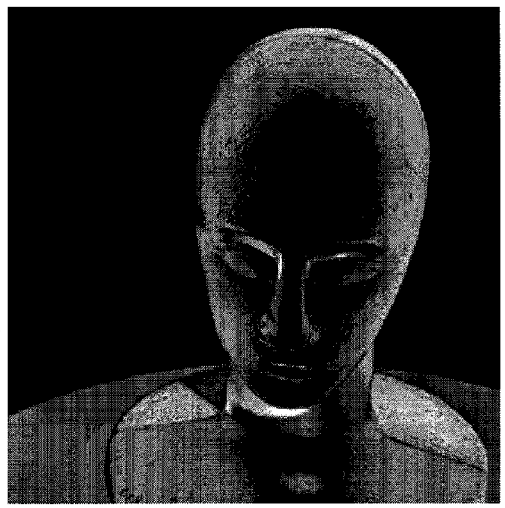
(b)  $\rho 1$
(c)  $\phi \max 1$
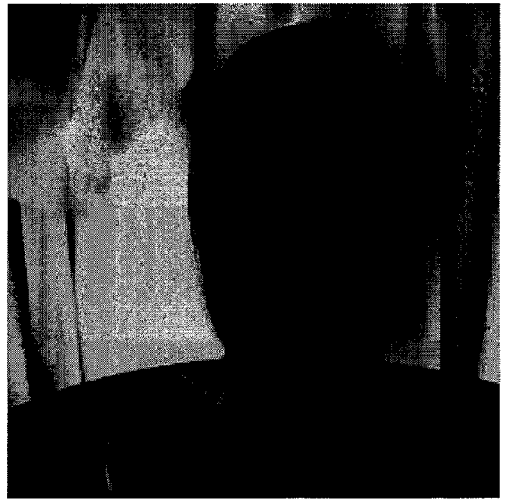
(d)  E1

FIG. 13
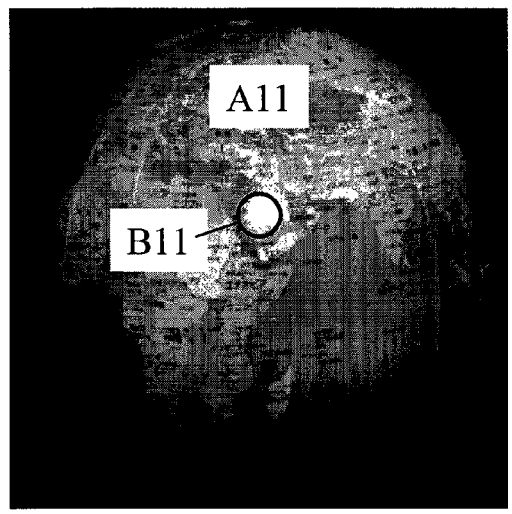
(a)
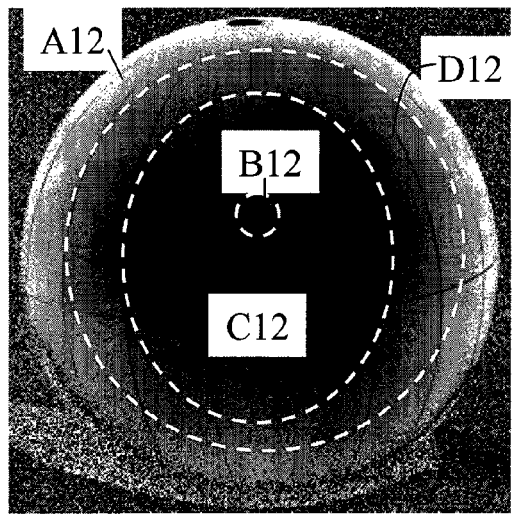
(b)  $\rho 2$
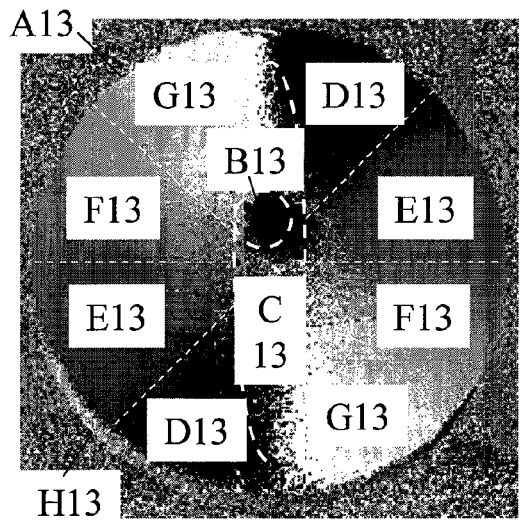
(c)  $\phi\max 2$
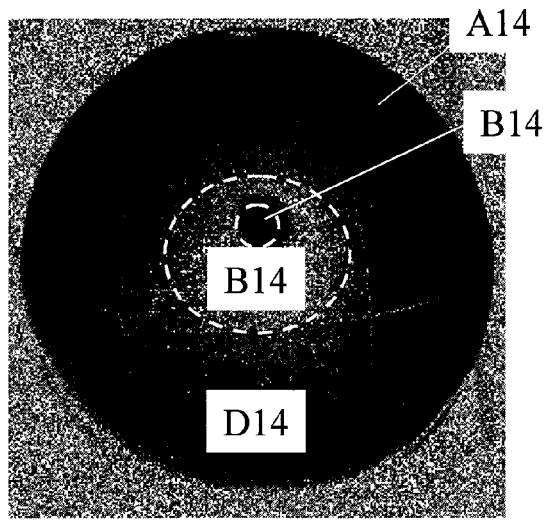
(d)  E2

FIG. 15
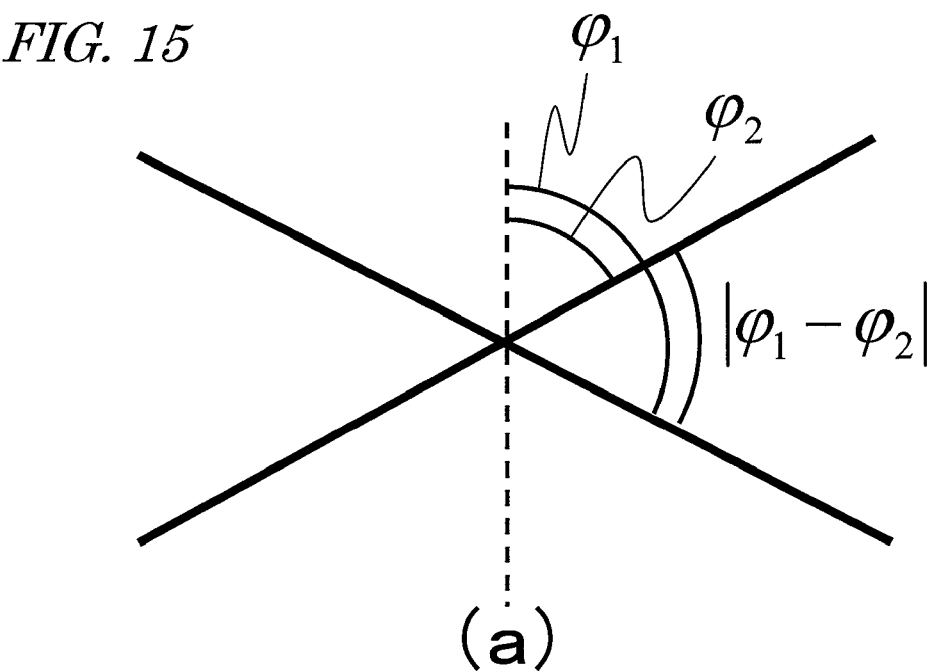
(a)
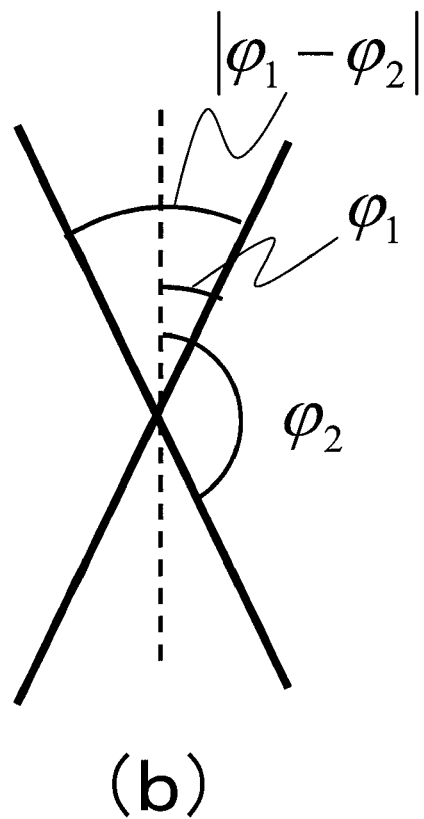
(b)

*FIG. 16*

|  |  | LIGHT SOURCE DEPENDENCY ||
|  |  | HIGH | LOW |
| --- | --- | --- | --- |
| DEGREE OF POLARIZATION | HIGH | SPECULAR REFLECTION POLARIZED AREA | DIFFUSE REFLECTION POLARIZED AREA |
|  | LOW | DIFFUSE REFLECTION NON-POLARIZED AREA ||

FIG. 20
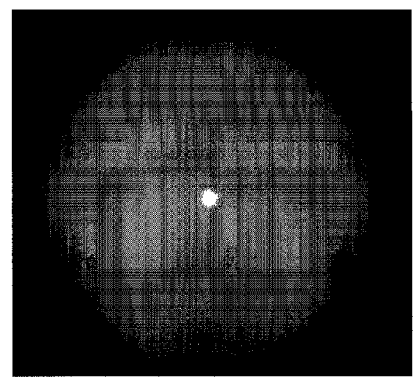
(a)
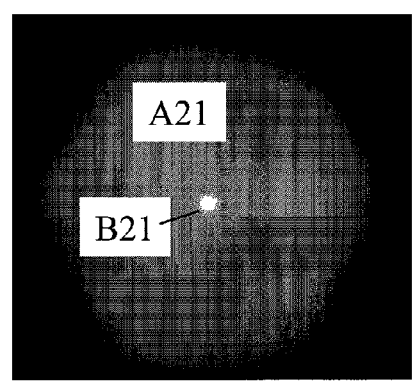 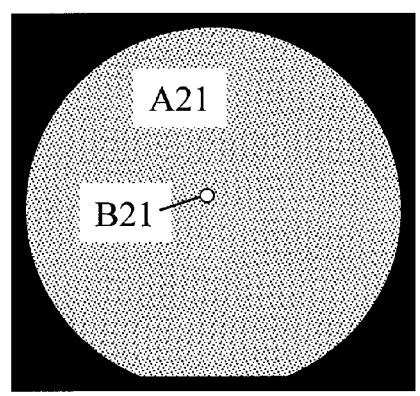
(b)　　　　　　　　　　(c)

*FIG. 22*
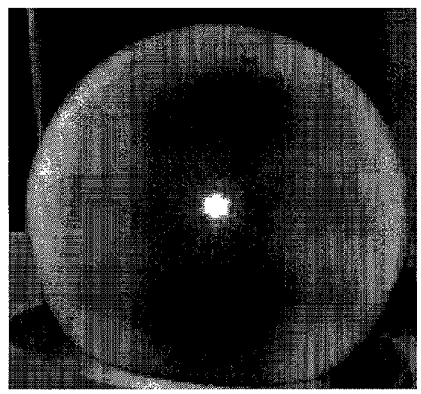
(a) ρ1
(POLARIZATION AXIS IS HORIZONTAL)
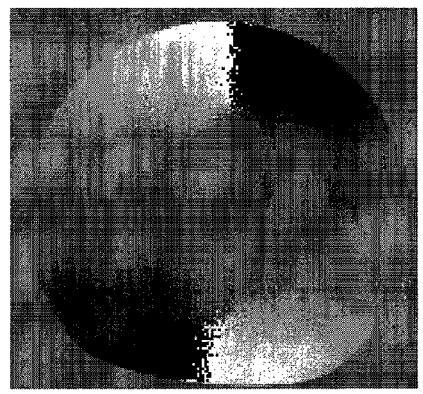
(b) φmax1
(POLARIZATION AXIS IS HORIZONTAL)
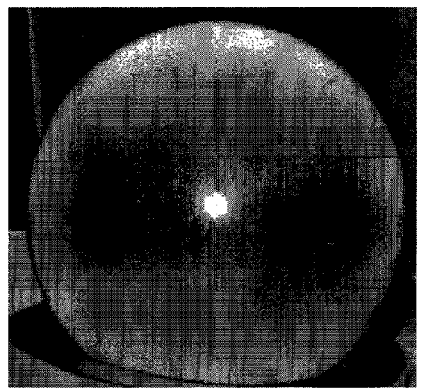
(c) ρ2
(POLARIZATION AXIS IS VERTICAL)
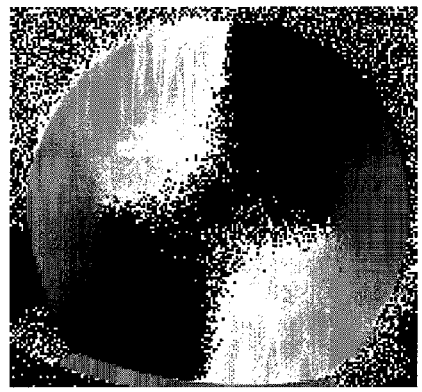
(d) φmax2
(POLARIZATION AXIS IS VERTICAL)
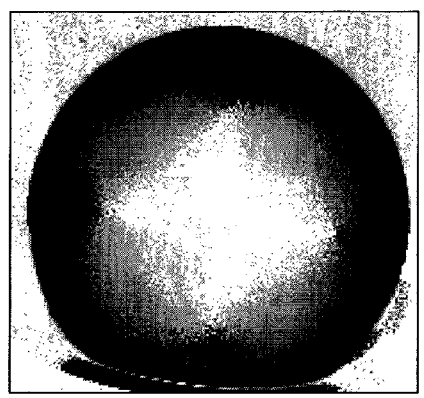
(e) LDφ

*FIG. 26*
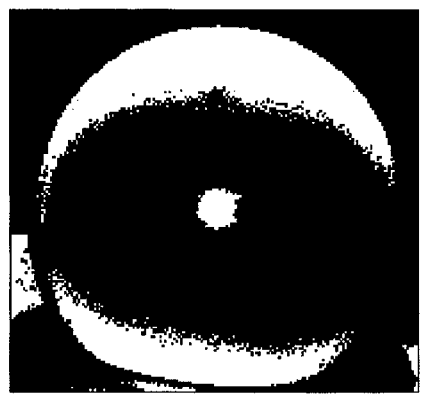
(a) $\rho 2 \geqq Th\rho$
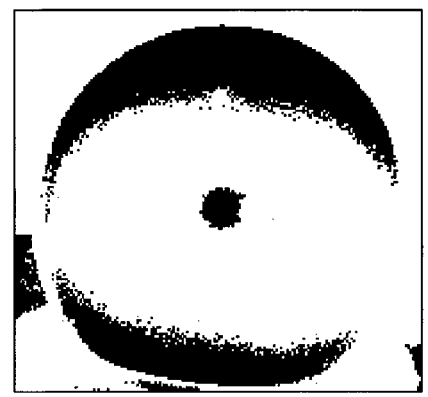
(b) DIFFUSE REFLECTION NON-POLARIZED AREA
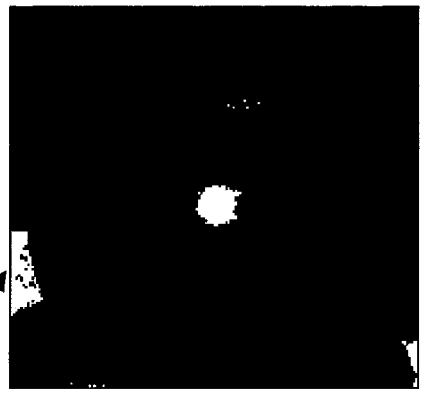
AREA B
(c) SPECULAR REFLECTION POLARIZED AREA
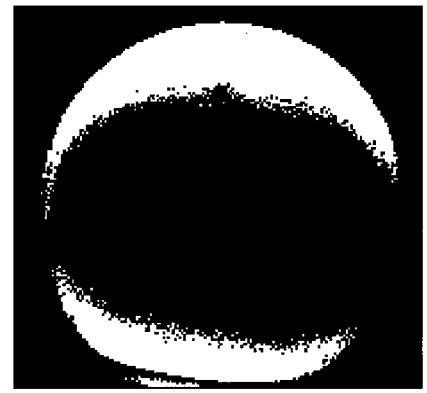
(d) DIFFUSE REFLECTION POLARIZED AREA
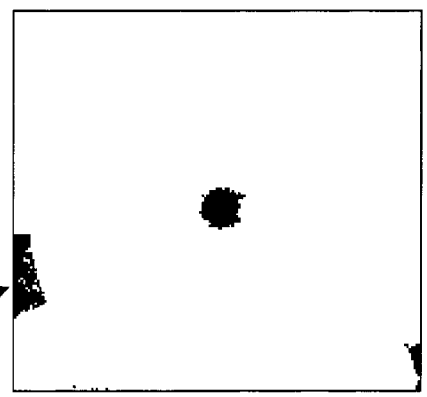
AREA B
(e) DIFFUSE REFLECTION AREA
(NON-POLARIZED AREA + POLARIZED AREA)

FIG. 29

|  |  | LIGHT SOURCE DEPENDENCY ||
|  |  | HIGH | LOW |
| --- | --- | --- | --- |
| DEGREE OF POLARIZATION | HIGH | LIGHT SOURCE -DEPENDENT POLARIZED AREA | LIGHT SOURCE -INDEPENDENT POLARIZED AREA |
|  | LOW | LIGHT SOURCE -DEPENDENT NON-POLARIZED AREA | LIGHT SOURCE -INDEPENDENT NON-POLARIZED AREA |

FIG. 36
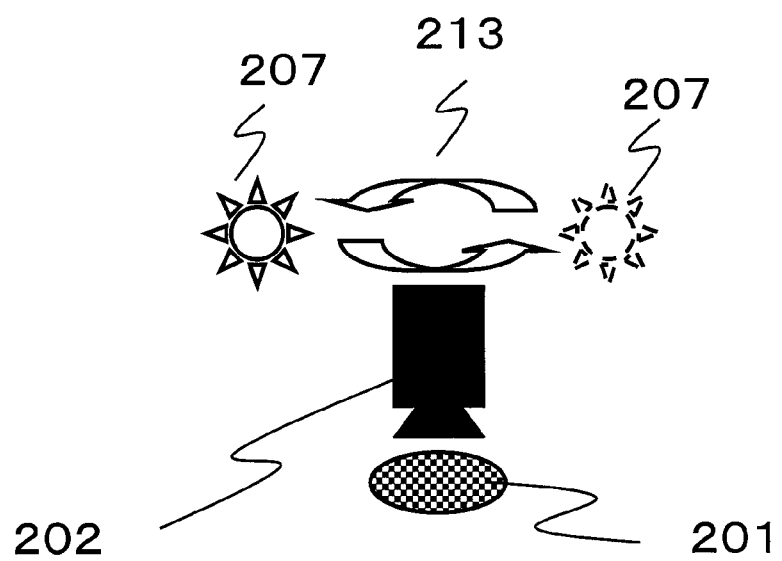
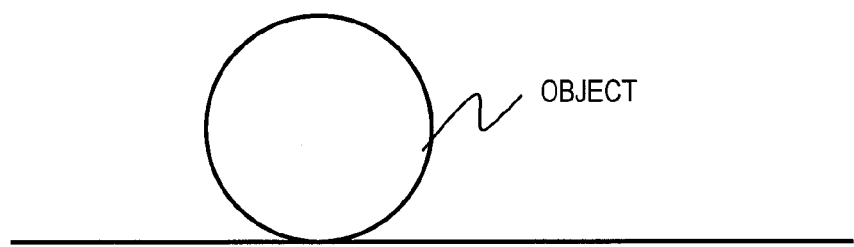

FIG. 37
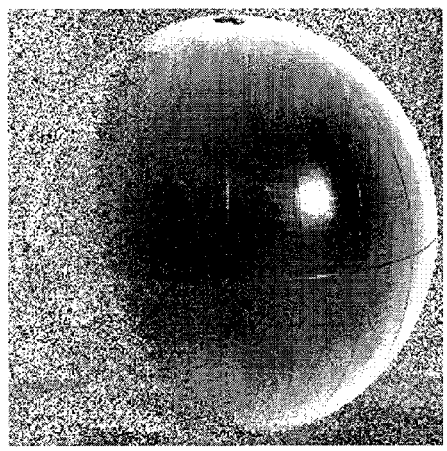
(a) ρ3
(LIGHT SOURCE TOWARD RIGHT SIDE)
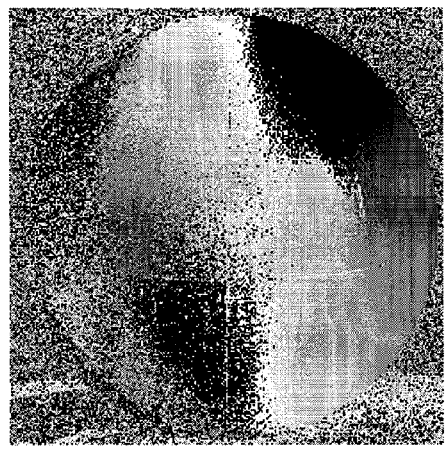
(b) φmax3
(LIGHT SOURCE TOWARD RIGHT SIDE)
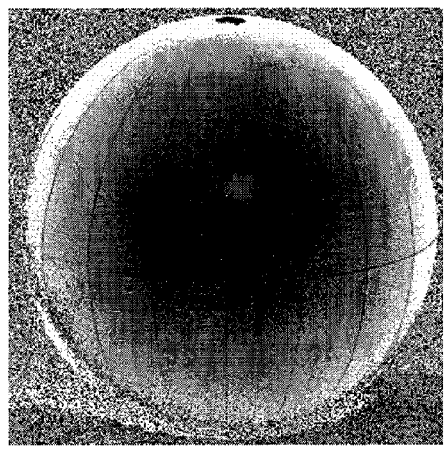
(c) ρ4
(LIGHT SOURCE TOWARD UPPER SIDE)
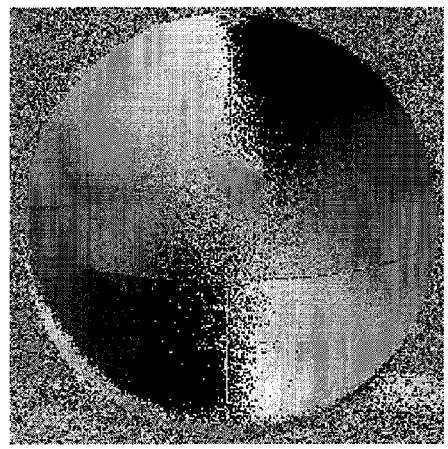
(d) φmax4
(LIGHT SOURCE TOWARD UPPER SIDE)
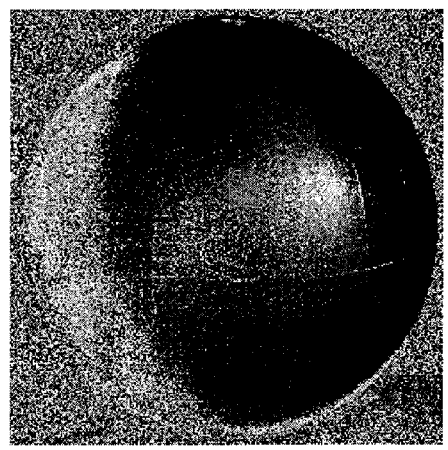
(e) LDφ

FIG. 41
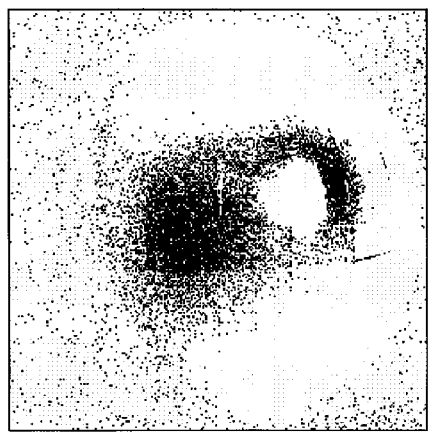
(a) $\rho 3 \geq Th\rho$
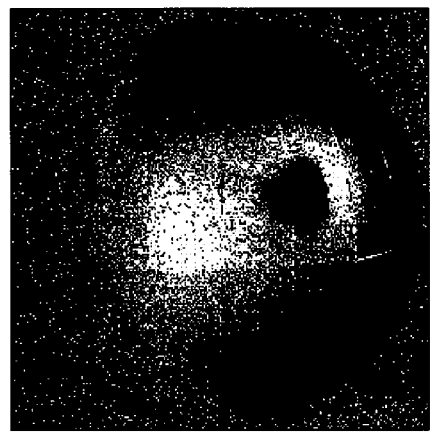
(b) DIFFUSE REFLECTION
NON-POLARIZED AREA
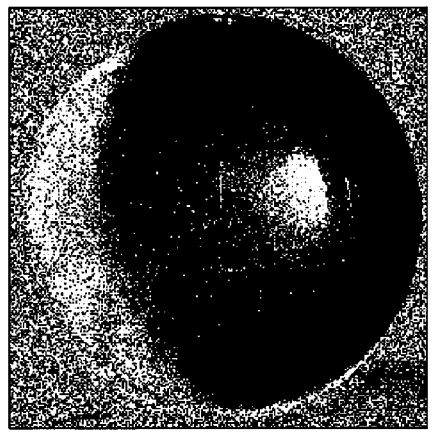
(c) SPECULAR REFLECTION
POLARIZED AREA
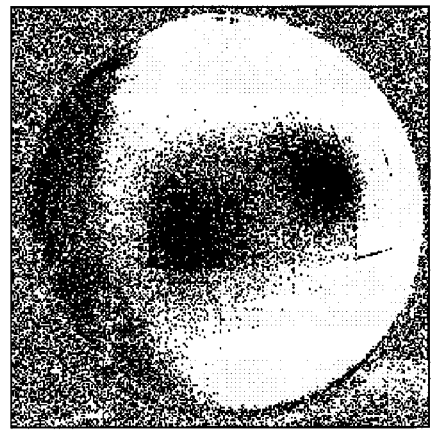
(d) DIFFUSE REFLECTION
POLARIZED AREA
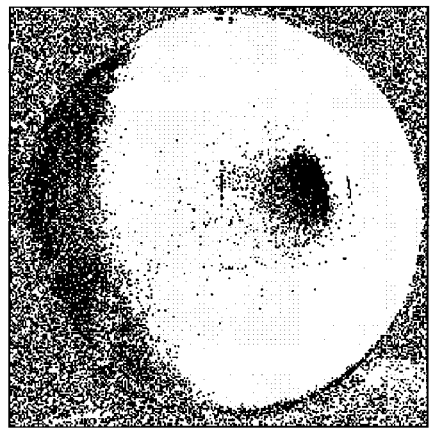
(e) DIFFUSE REFLECTION AREA
(NON-POLARIZED AREA + POLARIZED AREA)

FIG. 42
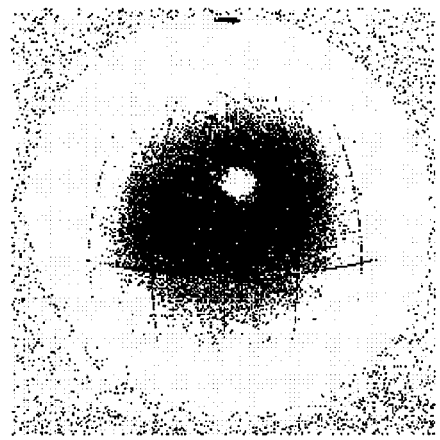
(a)  $\rho 4 \geq Th\rho$
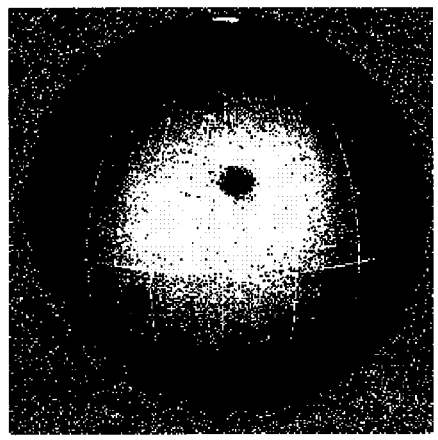
(b) DIFFUSE REFLECTION
NON-POLARIZED AREA
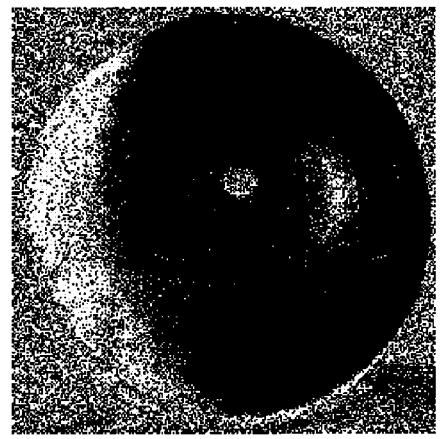
(c) SPECULAR REFLECTION
POLARIZED AREA
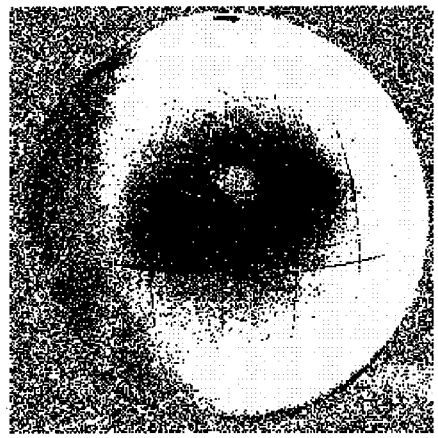
(d) DIFFUSE REFLECTION
POLARIZED AREA
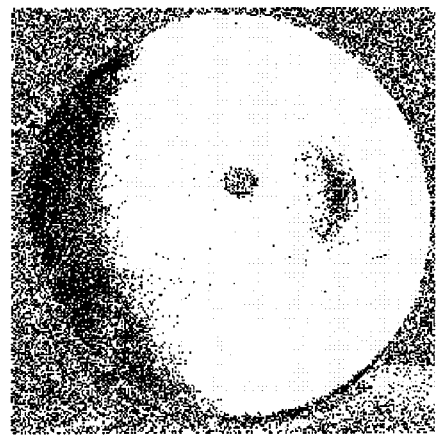
(e) DIFFUSE REFLECTION AREA
(NON-POLARIZED AREA + POLARIZED AREA))

FIG. 43

| | | | | LIGHT SOURCE DEPENDENCY | |
|---|---|---|---|---|---|
| | | | | HIGH | LOW |
| BRIGHTNESS | HIGH | DEGREE OF POLARIZATION | HIGH | LIGHT SOURCE -DEPENDENT POLARIZED AREA | LIGHT SOURCE -INDEPENDENT POLARIZED AREA |
| | | | LOW | LIGHT SOURCE -DEPENDENT NON-POLARIZED AREA | LIGHT SOURCE -INDEPENDENT NON-POLARIZED AREA |
| | LOW | | | SHADED AREA | |

FIG. 48

| | | | | LIGHT SOURCE DEPENDENCY | |
|---|---|---|---|---|---|
| | | | | HIGH | LOW |
| BRIGHTNESS | HIGH | DEGREE OF POLARIZATION | HIGH | LIGHT SOURCE -DEPENDENT POLARIZED AREA | LIGHT SOURCE -INDEPENDENT POLARIZED AREA |
| | | | LOW | LIGHT SOURCE -DEPENDENT NON-POLARIZED AREA | LIGHT SOURCE -DEPENDENT NON-POLARIZED AREA |
| | LOW | POLARIZATION ERROR | LARGE | cast shadow | |
| | | | SMALL | attached shadow | |

*FIG. 50*

|  |  |  | LIGHT SOURCE DEPENDENCY ||
|  |  |  | HIGH | LOW |
| --- | --- | --- | --- | --- |
| BRIGHTNESS | HIGH | DEGREE OF POLARIZATION HIGH | LIGHT SOURCE -DEPENDENT POLARIZED AREA | LIGHT SOURCE -INDEPENDENT POLARIZED AREA |
| | | DEGREE OF POLARIZATION LOW | LIGHT SOURCE -DEPENDENT NON-POLARIZED AREA | LIGHT SOURCE -DEPENDENT NON-POLARIZED AREA |
| | LOW | DEGREE OF POLARIZATION HIGH | attached shadow ||
| | | DEGREE OF POLARIZATION LOW | cast shadow ||

FIG. 71

| | | | |
|---|---|---|---|
| PIXEL POSITION (x,y) | ... | (100,200) | ... |
| ALBEDO ρd (PSEUDO-ALBEDO tfρdp) | ... | (200,200,100) | ... |
| SPECULAR REFLECTION COMPONENT COEFFICIENT ks | ... | 0.8 | ... |
| REFRACTIVE INDEX η | ... | 1.4 | ... |
| ROUGHNESS m | ... | 0.3 | ... |
| NORMAL x DIRECTION nx | ... | 0.43 | ... |
| NORMAL y DIRECTION ny | ... | 0.31 | ... |
| NORMAL z DIRECTION nz | ... | -0.85 | ... |

*FIG. 74*
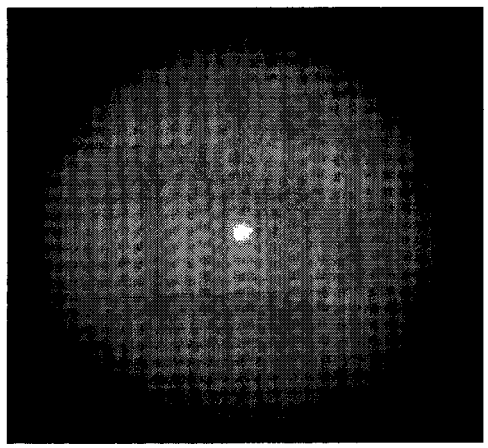
(a)
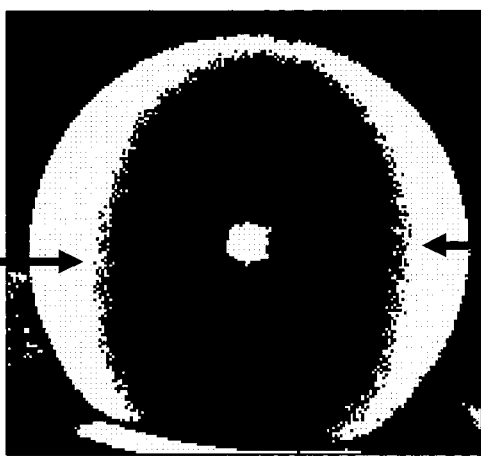
(b) ← AREA A        AREA A →
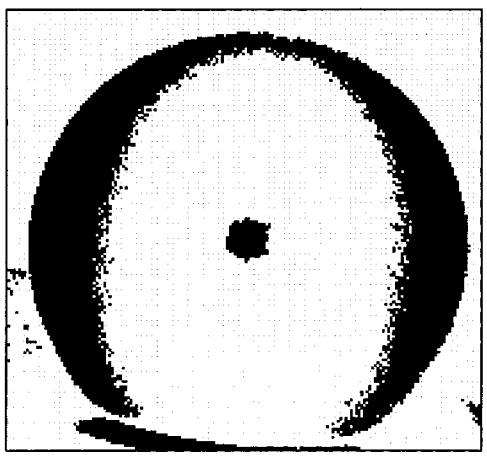
(c)

*FIG. 75*
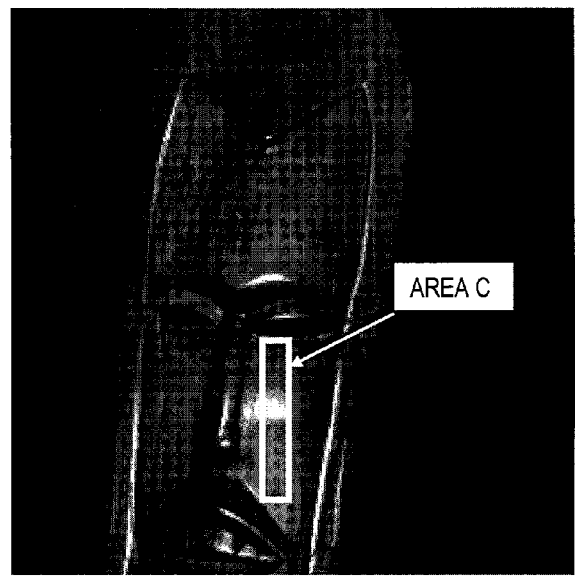
(a)
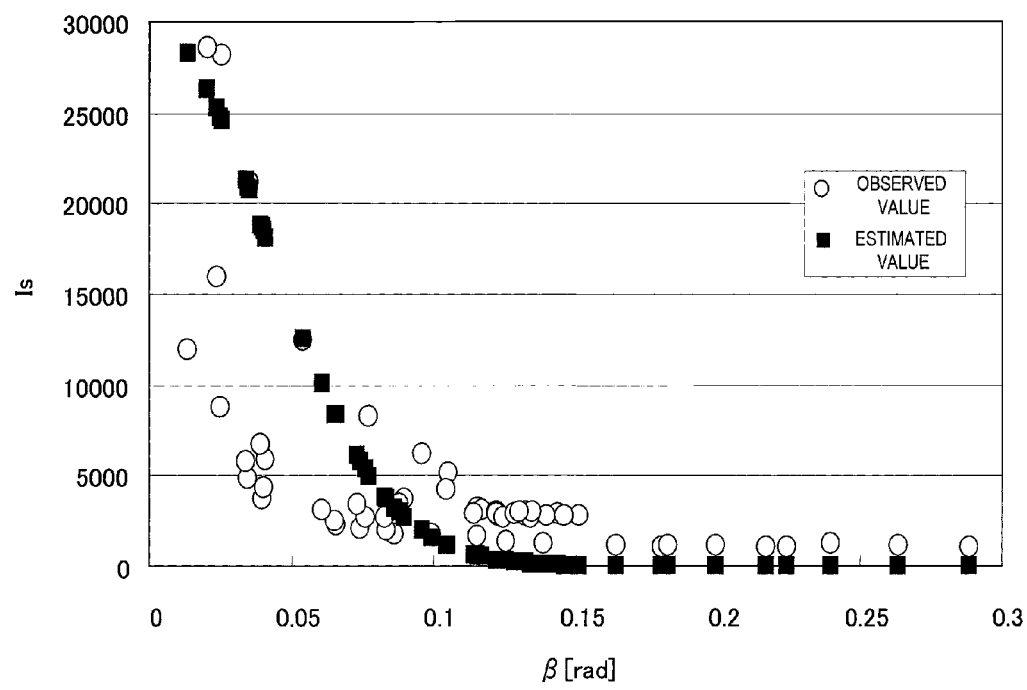
(b)

IMAGE PROCESSING APPARATUS, IMAGE DIVISION PROGRAM AND IMAGE SYNTHESISING METHOD

TECHNICAL FIELD

The present invention relates to an image processing technique, and more particularly to a technique for improving the precision of image division, which has been an issue when obtaining shape information of an object and when synthesizing an image.

BACKGROUND ART

It is known that the appearance of an object is composed of a plurality of components such as a specular reflection component, which is the incident light reflected by the surface of the object being observed as a "gloss", and a diffuse reflection component observed as light repeatedly scattered inside the object.

In recent years, methods have been widely employed in which an image is separated into such components for compressing the information for digital archives or for obtaining the shape/surface material of the object (e.g., Non-Patent Document 1, Non-Patent Document 2 and Non-Patent Document 3). This is because a process with a higher precision can be achieved by performing a process for each of the separated components.

As the method for separating an image into different components as described above, a method for separating it into a specular reflection component and a diffuse reflection component has been widely used. Particularly, a method utilizing polarization information has been widely researched because specular reflection and diffuse reflection can be separated with a simple device. In this method, a linearly-polarized light source is emitted onto the object, and the specular reflection component and the diffuse reflection component are separated from each other by rotating a linear polarization filter provided between the camera and the object about the optical axis.

It is known that where Φ is the rotation angle (polarization main axis angle) of the linear polarization filter, the luminance value observed in each pixel changes along a sinusoidal function with respect to the rotation angle Φ. The image separation can be done by determining the amplitude component of the sinusoidal function as the "specular reflection component" and the bias component as the "diffuse reflection component". That is, for each of a plurality of pixels of an image, the pixel can be assigned as a "specular reflection area" or a "diffuse reflection area" depending on whether the specular reflection component or the diffuse reflection component is dominant. In other words, pixels where the specular reflection component is dominant form a "specular reflection area", and pixels where the diffuse reflection component is dominant form a "specular reflection area".

A method for performing an area division for the surface of an object as described above can be realized based on the difference in polarization characteristics between specular reflection and diffuse reflection.

Since the specular reflection component occurs from surface reflection, the polarization characteristics of the incident light are maintained. Therefore, it is observed as the polarized component of the brightness observed by the camera.

Since the diffuse reflection occurs through repeated scattering, the polarization characteristics of the incident light have been lost. Therefore, it is observed as the non-polarized component of the brightness observed by the camera.

These polarization characteristics are based on the following two conditions.

(Condition 1) Where linearly-polarized light is emitted, a specular reflection component is observed as a polarized component.

(Condition 2) Where linearly-polarized light is emitted, a diffuse reflection component is observed as a non-polarized component.

Referring to FIGS. 74(*a*)-(*c*), a conventional area division will be described.

FIGS. 74(*b*) and (*c*) show the specular reflection area and the diffuse reflection area, respectively, obtained by dividing the image of FIG. 74(*a*) by a conventional area division. That is, areas denoted by white pixels in FIG. 74(*b*) are those divided as "specular reflection areas", whereas areas denoted by white pixels in FIG. 74(*c*) are those divided as "diffuse reflection areas".

As seen from these images, the peripheral portion of the sphere near the occluding edge (the area A in FIG. 74(*b*)) is divided as a "specular reflection area". However, specular reflection occurs in or near a regular reflection area. A specular reflection component being estimated in such an occluding edge area indicates that the separation precision is not sufficient.

Such a problem occurs as (Condition 2) is not satisfied because a portion of the diffuse reflection component is polarized. The cause of such a problem will be discussed below with reference to FIGS. 72 and 73.

FIGS. 72 and 73 are graphs showing the degree of polarization of the specular reflection component and the degree of polarization of the diffuse reflection component, respectively, for objects whose refractive indices are n=1.1, 1.3, 1.5 and 2.0 (see, for example, L. B. Wolff and T. E. Boult, "Constraining object features using a polarization reflectance model", IEEE Transactions on Pattern Analysis and Machine Intelligence, Vol. 13, No. 7, pp. 635-657, 1991). The horizontal axis of the graph of FIG. 72 represents the angle of incidence, and the vertical axis represents the degree of polarization, whereas the horizontal axis of the graph of FIG. 73 represents the emittance angle, and the vertical axis represents the degree of polarization. The following can be known from the figures.

The degree of polarization of the diffuse reflection component is sufficiently small except for areas where the emittance angle is sufficiently large.

The degree of polarization of the diffuse reflection component is sufficiently larger than the degree of polarization of the specular reflection component in areas where the emittance angle is sufficiently large.

That is, the following can be known.

(Condition 2) holds except for areas where the emittance angle is sufficiently large.

(Condition 2) does not hold in areas where the emittance angle is sufficiently large.

This is a major reason why the conventional area division shown in FIG. 74 failed to accurately separate the specular reflection component and the diffuse reflection component from each other.

CITATION LIST

Patent Literature

[Non-Patent Document 1] Y. Sato, M. D. Wheeler, and K. Ikeuchi, "Object shape and reflectance modeling from observation", SIGGRAPH 97, pp. 379-387, 1997

[Non-Patent Document 2] Daisuke Miyazaki, Takushi Shibata, Katsushi Ikeuchi, "Wavelet-Texture Method: BTF Compression by Using Daubechies Wavelet, Parametric Reflection Model, and Circular Polarizer", Trans. of IEICE, Vol. J90-D No. 8, pp. 2081-2093, 2007

[Non-Patent Document 3] T. Shibata, T. Takahashi, D. Miyazaki, Y. Sato, K. Ikeuchi, "Creating Photorealistic Virtual Model with Polarization Based Vision System", in Proceedings of SPIE (Polarization Science and Remote Sensing II, Part of SPIE's International Symposium on Optics and Photonics 2005), Vol. 5888, pp. 25-35, 2005

SUMMARY OF INVENTION

Technical Problem

The importance of such a problem will be even greater in the future as the dynamic range of recent cameras has been increased. With conventional cameras, the brightness dynamic range is not sufficiently large, and the degree of polarization of diffuse reflection is unlikely to be observed. However, with the increased dynamic range of cameras in recent years, the deterioration in the separation precision described above will be a significant problem.

The deterioration in the separation precision between the specular reflection component and the diffuse reflection component will be a significant problem of synthesizing together images of substantially different textures when performing a model-based image synthesis, which has been used in the fields of digital archives and augmented reality. The model-based image synthesis is a technique widely used in the CG (Computer Graphics) field. Since various image processes such as a viewpoint changing process and a light source environment changing process can be done, it is very effective for digital archives and as a method of interactive image presentation. It also enables an efficient data compression. As an example, a method is known in the art where an image is separated into the specular reflection component and the diffuse reflection component, and the image is modeled by using the Cook-Torrance model for the specular reflection component and the Lambertian model for the diffuse reflection component.

For the image shown in FIG. 75(a), data shown in the graph of FIG. 75(b) was obtained for the area C of the object. FIG. 75(b) is a graph representing the half-way vector β between the viewing vector and the illumination direction vector along the horizontal axis, and the luminance value Is of the specular reflection component along the vertical axis, for the area C of FIG. 75(a). In the graph of FIG. 75(b), the open circular dots are obtained by plotting the luminance value Is observed for the area C. The solid squares are obtained by plotting the estimation of the reflection parameters of the Cook-Torrance model. From this figure, it can be seen that the model fitting is not working well.

FIG. 76 shows a synthesized image produced by using a conventional area dividing approach. Thus, when an image is synthesized by using mis-estimated parameters, the texture of the synthesized image will be substantially different from the actual texture. A reason for such an estimation failure is that the luminance value Is is estimated to be larger than the actual value particularly in areas where the half-way vector p is large due to the deterioration in the separation precision between the specular reflection component and the diffuse reflection component described above. The insufficient separation precision between the specular reflection component and the diffuse reflection component results in using the specular reflection component and the diffuse reflection component, which are different from the actual components, when estimating parameters in each model. Therefore, the process estimates model parameters that are different from the actual model parameters. As described above, an accurate area division of an image is very important in model-based image synthesis.

Solution to Problem

An image processing apparatus of the present invention is an image processing apparatus for capturing an image of an object and thereby performing an optical area division of a surface of the object, comprising: a polarization image capturing section for obtaining a polarization image of the object by receiving light having passed through a three-way or more polarizer having different polarization main axis angles, wherein the area division is performed based on a polarization state on the surface of the object and a light source dependency, which represents a degree of change in the polarization state on the surface of the object occurring when changing at least one of a polarization state of light emitted from a light source and a light source position.

In a preferred embodiment, it comprises an illumination unit including the light source and being capable of changing at least one of the polarization state of light emitted from the light source and the light source position; and a control section for synchronizing the changing by the illumination unit of at least one of the polarization state of light emitted from the light source and the light source position with the image-capturing by the polarization image capturing section.

In a preferred embodiment, it comprises: an illumination control section for changing the polarization state of the linearly-polarized light emitted from the light source; a polarization information obtaining section for generating, from the obtained polarization image, polarization information for received polarized light by using a correspondence with a brightness of the light having passed through the three-way or more polarizer, for each of unit pixels of the polarization image; a light source dependency estimation section for estimating light source dependency information by making a comparison between the polarization information generated by the polarization information obtaining section when the polarization state of light emitted from the light source is changed by the illumination control section; and an area dividing section for performing the area division based on the polarization information generated by the polarization information obtaining section and light source variation information estimated by the light source dependency estimation section.

In a preferred embodiment, the polarization information obtaining section generates, as the polarization information, at least one of a degree of polarization, a polarization phase, a polarization estimation error, a polarization maximum luminance value, and a polarization minimum luminance value.

In a preferred embodiment, the area dividing section performs the area division so that the surface of the object is divided into areas each being a diffuse reflection area or a specular reflection area.

In a preferred embodiment, the area dividing section performs the area division so that the surface of the object is divided into areas each being a diffuse reflection non-polarized area, a diffuse reflection polarized area, or a specular reflection polarized area.

In a preferred embodiment, the area dividing section performs the area division so that the surface of the object is divided into areas each being a light source-dependent polarized area, a light source-dependent non-polarized area, a light source-independent polarized area, or a light source-independent non-polarized area.

In a preferred embodiment, the area dividing section performs the area division so that the surface of the object is further divided into areas including a shaded area.

In a preferred embodiment, the illumination control section changes a main axis direction of the linearly-polarized light.

In a preferred embodiment, the illumination control section changes a main axis direction of the linearly-polarized light by 90 degrees.

In a preferred embodiment, it comprises a plurality of illumination sections of different polarization states, wherein the illumination control section changes the polarization state by switching between the plurality of illumination sections.

In a preferred embodiment, an illumination section is present near the polarization image capturing section.

In a preferred embodiment, the light source dependency estimation section estimates, as the polarization dependency, the value of change of at least one of the polarization phase and the degree of polarization.

In a preferred embodiment, it comprises: an illumination position changing section for changing the position of the light source; a polarization information obtaining section for generating, from the obtained polarization image, polarization information for received polarized light by using a correspondence with a brightness of the light having passed through the three-way or more polarizer, for each of unit pixels of the polarization image; a light source dependency estimation section for estimating light source dependency information by making a comparison between the polarization information generated by the polarization information obtaining section when the position of the light source is changed by the illumination control section; and an area dividing section for performing the area division based on the polarization information generated by the polarization information obtaining section and light source variation information estimated by the light source dependency estimation section.

In a preferred embodiment, it comprises a plurality of illumination sections of different light source positions, wherein the illumination position changing section changes a position of illumination section by switching between the plurality of illumination sections.

In a preferred embodiment, the illumination position changing section changes the light source position by moving an illumination section.

In a preferred embodiment, the area dividing section performs the area division so that the surface of the object is divided into areas each being a diffuse reflection area or a specular reflection area.

In a preferred embodiment, the area dividing section performs the area division so that the surface of the object is divided into areas each being a specular reflection area, a diffuse reflection area, or a shaded area.

In a preferred embodiment, the area dividing section performs the area division so that it is divided into areas each being a specular reflection area, a diffuse reflection area, an attached shadow area, or a cast shadow area.

An image processing system of the present invention is an image processing system comprising an illumination device and an area dividing device for capturing an image of an object and thereby performing an optical area division of a surface of the object, the illumination device comprising: an illumination section for emitting linearly-polarized light onto the object; and an illumination control section for changing a polarization state of the linearly-polarized light of the illumination section, the area dividing device comprising: a polarization image capturing section for obtaining a polarization image of the object by receiving light having passed through a three-way or more polarizer having different polarization main axis angles; and a captured image determination section for comparing a polarization image captured in a past by the polarization image capturing section with a currently-captured polarization image to thereby determine whether the captured polarization states have changed sufficiently; a polarization information obtaining section for generating, from the obtained polarization image, polarization information for received polarized light by using a correspondence with a brightness of the light having passed through the three-way or more polarizer, for each of unit pixels of the polarization image; a light source dependency estimation section for estimating a light source dependency information by making a comparison between the polarization information generated by the polarization information obtaining section when it is determined by the captured image determination section that the polarization state of the illumination section has been changed by the illumination control section; and an area dividing section for performing the area division by using the polarization information generated by the polarization information obtaining section and light source variation information estimated by the light source dependency estimation section.

Another image processing system of the present invention is an area dividing system comprising an illumination device and an area dividing device for capturing an image of an object and thereby performing an optical area division of a surface of the object, the illumination device comprising: an illumination section for emitting linearly-polarized light onto the object; an illumination control section for changing a polarization state of the linearly-polarized light of the illumination section; and a communication section for transmitting a signal indicating a light emission to the area dividing device and receiving a signal indicating a completion of image-capturing from the area dividing device, the area dividing device comprising: a communication section for receiving a signal indicating a light emission from the illumination device and transmitting a signal indicating a completion of image-capturing to the illumination device; a polarization image capturing section for obtaining a polarization image of the object by receiving light having passed through a three-way or more polarizer having different polarization main axis angles; a captured image determination section for comparing a polarization image captured in a past by the polarization image capturing section with a currently-captured polarization image to thereby determine whether the captured polarization states have changed sufficiently; a polarization information obtaining section for generating, from the obtained polarization image, polarization information for received polarized light by using a correspondence with a brightness of the light having passed through the three-way or more polarizer, for each of unit pixels of the polarization image; a light source dependency estimation section for estimating light source dependency information by making a comparison between the polarization information generated by the polarization information obtaining section when it is determined by the captured image determination section that the polarization state of the illumination section has been changed by the illumination control section; and an area dividing section for performing the area division by using the polarization information generated by the polarization information obtaining section and light source variation information estimated by the light source dependency estimation section.

An area dividing method of the present invention is an area dividing method for capturing an image of an object and thereby performing an optical area division of a surface of the object, comprising: an illumination step of emitting linearly-polarized light onto the object; an illumination control step of changing a polarization state of the linearly-polarized light of the illumination section; a polarization image capturing step of obtaining a polarization image of the object by receiving light having passed through a three-way or more polarizer having different polarization main axis angles; a polarization information obtaining step of generating, from the obtained polarization image, polarization, information for received polarized light by using a correspondence with a brightness of the light having passed through the three-way or more polarizer, for each of unit pixels of the polarization image; a control step of synchronizing the illumination control step with the polarization image capturing step; a light source dependency estimation step of estimating light source dependency information by making a comparison between the polarization information generated by the polarization information obtaining step when the polarization state of the illumination step is changed by the illumination control step; and an area dividing step of performing the area division by using the polarization information generated by the polarization information obtaining step and light source variation information estimated by the light source dependency estimation step.

A program of the present invention is a program for an area dividing device for capturing an image of an object and thereby performing an optical area division of a surface of the object, wherein the program instructs a computer to perform steps included in the area dividing method set forth above.

A model-based image synthesis device of the present invention is a model-based image synthesis device comprising a parameter estimation device and an image synthesis apparatus for synthesizing an image using a reflection model, the parameter estimation device comprising: an image capturing section for capturing an image of an object; an area dividing section for performing an optical area division of an image captured by the image capturing section according to the area dividing method set forth above; a light source information estimating section for estimating light source information regarding a light source illuminating the object; a shape information obtaining section for obtaining, as shape information, surface normal information or 3-dimensional position information of the object; a parameter estimation section for estimating a reflection model parameter by modeling the light source information estimated by the light source information estimating section for each area divided by the area dividing section and the shape information obtained by the shape information obtaining section, from the captured image of the object; a parameter database for storing the reflection parameter estimated by the parameter estimation section, the image synthesis apparatus comprising: a viewpoint/light source information obtaining section for obtaining a viewpoint or light source information of an image to be synthesized; and a rendering section for synthesizing an image according to the viewpoint or light source information obtained by the viewpoint/light source information obtaining section by using the reflection parameter information stored in the parameter database.

A model-based image synthesis method of the present invention is a model-based image synthesis method comprising a parameter estimation step and an image synthesis method step for synthesizing an image using a reflection model, the parameter estimation step comprising: an image capturing step of capturing an image of an object; an area dividing step of performing an optical area division of an image captured by the image capturing section according to the area dividing method set forth above; a light source information estimating step of estimating light source information regarding a light source illuminating the object; a shape information obtaining step of obtaining, as shape information, surface normal information or 3-dimensional position information of the object; and a parameter estimation step of estimating a reflection model parameter by modeling the light source information estimated by the light source information estimating section for each area divided by the area dividing section and the shape information obtained by the shape information obtaining section, from the captured image of the object, the image synthesis step comprising: a viewpoint/light source information obtaining step of obtaining a viewpoint or light source information of an image to be synthesized; and a rendering step of synthesizing an image according to the viewpoint or light source information obtained by the viewpoint/light source information obtaining section by using reflection parameter information estimated by the shape information obtaining step.

Advantageous Effects of Invention

With an image process of the present invention, it is possible to accurately separate a specular reflection area and a diffuse reflection area from each other by using two kinds of information, i.e., the light source condition dependency and the polarization information. Moreover, it is possible to synthesize an image faithful to the object by applying the area division based on the two kinds of information, i.e., the light source condition dependency and the polarization information, to the parameter estimation of a model-based image synthesis method.

BRIEF DESCRIPTION OF DRAWINGS

FIG. 10 An image captured of the object being a styrene-foam head model, and the degree of polarization $\rho 1$, the polarization phase $\phi max1$ and the polarization estimation error E1 obtained from that image.

FIG. 13 A diagram showing the image of FIG. 11 divided into a plurality of areas based on the high/low of the brightness.

FIG. 15 A schematic diagram illustrating the polarization phase difference.

FIG. 16 A table showing an area division criterion for an area dividing section according to the first embodiment of the present invention.

FIG. 20 An image captured of a billiard ball being the object, and schematic views thereof.

FIG. 22 Views showing intermediate results of a process of the area dividing method according to the first embodiment of the present invention.

FIG. 26 Views showing results of another process of the area dividing method according to the first embodiment of the present invention.

FIG. 29 A table showing another area division criterion for the area dividing section according to the first embodiment of the present invention.

FIG. 36 Another system diagram showing the shooting conditions for the area dividing device according to the second embodiment of the present invention.

FIG. 37 Views showing intermediate results of a process of the area dividing method according to the second embodiment of the present invention.

FIG. 41 Views showing results of the process of the area dividing method according to the second embodiment of the present invention.

FIG. 42 Views showing results of another process of the area dividing method according to the second embodiment of the present invention.

FIG. 43 A table showing an area division criterion, including a shaded area, for the area dividing section according to the second embodiment of the present invention.

FIG. 48 A table showing an area division criterion, including an attached shadow and a cast shadow, for the area dividing section according to the second embodiment of the present invention.

FIG. 50 A table showing another area division criterion, including an attached shadow and a cast shadow, for the area dividing section according to the second embodiment of the present invention.

FIG. 71 A schematic table showing model parameters stored in a parameter DB for an image synthesis process according to one embodiment of the present invention.

FIG. 74 Views showing the specular reflection area and the diffuse reflection area divided by a conventional area division.

FIG. 75 A schematic graph showing BRDF obtained in order to illustrate problems of a conventional method.

DESCRIPTION OF EMBODIMENTS

Embodiments of the present invention will now be described with reference to the drawings.

First Embodiment

First, the outline of an image processing apparatus according to a first embodiment of the present invention will be described. The image processing apparatus of the present embodiment calculates the light source dependency by changing the polarization state of the illumination section (light source). An area division of the object is performed by using the polarization information and the light source dependency resulting from the change of the polarization state.

Figure 1:
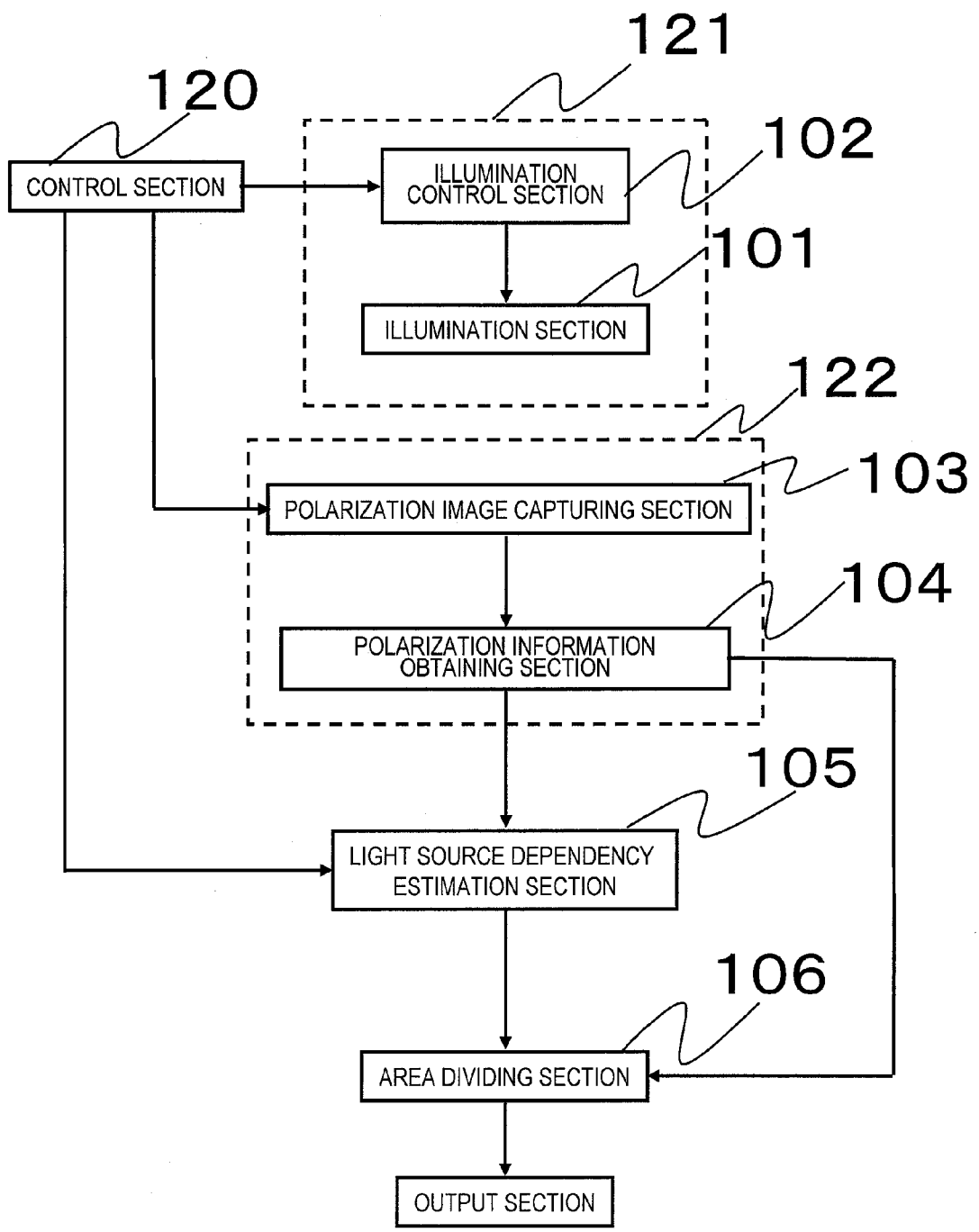
FIG. 1 A block diagram of an area dividing device according to a first embodiment of the present invention.

FIG. 1 is a block diagram showing the image processing apparatus of the present embodiment. The image processing apparatus is an apparatus for capturing an image of the object and thereby dividing (performing an area division of) the surface of the object into a plurality of areas of different optical properties.

The image processing apparatus includes: an illumination unit 121 for emitting linearly-polarized light onto the object while changing the polarization state thereof; a polarization information obtaining section 122 for obtaining polarization information of the object; a control section 120 for performing a synchronization operation between the illumination unit 121 and the polarization information obtaining section 122; a light source dependency estimation section 105 for estimating light source dependency information by making a comparison between different polarization information generated by the polarization information obtaining section 122 when the polarization state (the polarization main axis direction of the linearly-polarized light in the present embodiment) is changed by the illumination unit 121; and an area dividing section 106 for performing an area division by using the polarization information generated by the polarization information obtaining section 122 and the light source variation information estimated by the dependency estimation section 105.

The illumination unit 121 includes an illumination section 101 for emitting linearly-polarized light onto the object, and an illumination control section 102 for changing the polarization state of the linearly-polarized light of the illumination section 101. The polarization information obtaining section 122 includes a polarization image capturing section 103 for obtaining a polarization image of the object, and a polarization information obtaining section 104 for generating the polarization information, which is information regarding the received polarized light. The polarization image capturing section 103 obtains the polarization image of the object by receiving light having passed through a three-way or more polarizer having different polarization main axis angles. From the obtained polarization image, the polarization information obtaining section 104 generates the polarization information, which is information regarding the received polarized light, by using the correspondence with the brightness of the light having passed through the three-way or more polarizer, for each of unit pixels of the polarization image.

Figure 2:
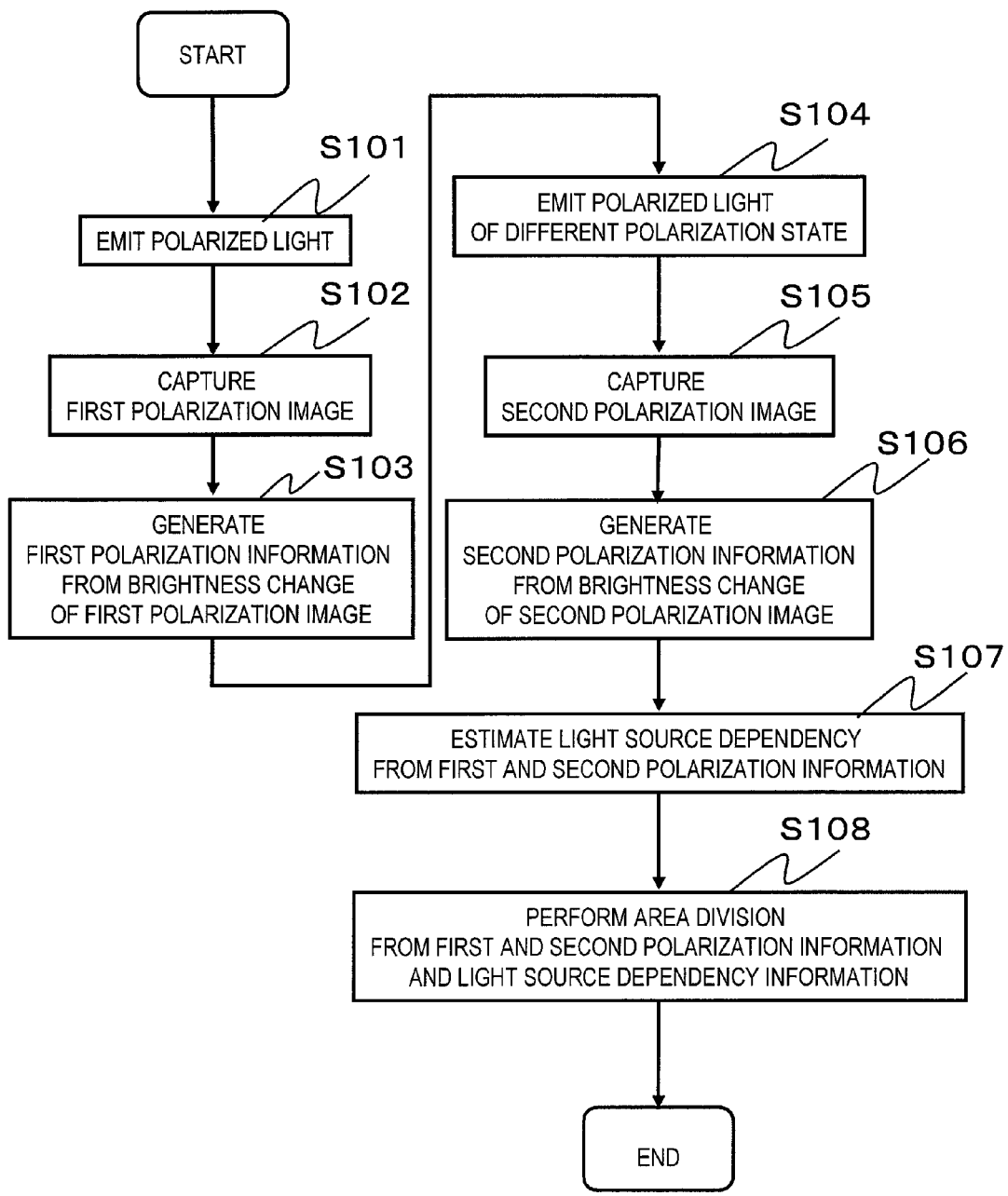
FIG. 2 A flow chart showing the flow of the process of an area dividing method according to the first embodiment of the present invention.

FIG. 2 is a flow chart showing the flow of the process of an area dividing method of the present embodiment. In step S101 of FIG. 2, the illumination section 101 emits polarized light which is polarized in a main axis direction specified by the illumination control section 102 onto the object. In step S102, the polarization image capturing section 103 receives light, by means of an image sensor, from the object through a patterned polarizer to be described later, thus obtaining a first polarization image, which is an image including polarization information. This is achieved by the control section 120 synchronizing the illumination unit 121 and the polarization information obtaining section 122 with each other.

The patterned polarizer has three or more polarization main axis angles as will be described later. In step S103, the polarization information obtaining section 104 generates the polarization information, which is information regarding the received polarized light, by using the correspondence with the brightness of the light having passed through the three-way or more polarizer, for each of unit pixels of the captured first polarization image.

In step S104, the illumination control section 102 controls the illumination section 101 so as to vary the main axis direction of the linearly-polarized light of the illumination section 101 so that the illumination section 101 emits polarized light of a different polarization state from that of step S101 onto the object. In step S105, the polarization image capturing section 103 again receives light, by means of an image sensor, from the object through a patterned polarizer 201, thus obtaining a second polarization image. This is achieved by the control section 120 synchronizing the illumination unit 121 and the polarization information obtaining section 122 with each other.

The first polarization image and the second polarization image are polarization images for different main axis directions of the linearly-polarized light from the illumination section 101. In step S106, the polarization information obtaining section 104 again generates the polarization information, which is information regarding the received polarized light, by using the correspondence with the brightness of the light having passed through the three-way or more polarizer, for each of unit pixels of the captured second polarization image.

In step S107, the light source dependency estimation section 105 estimates the light source dependency by making a comparison between the polarization information obtained by the polarization information obtaining section 104 from the first polarization image and the second polarization image. In step S108, the area dividing section 106 performs an area division by using the polarization information generated by the polarization information obtaining section 104 and the light source dependency information estimated by the light source dependency estimation section 105.

It is assumed herein that the illumination control section 102, the polarization image capturing section 103, the polarization information obtaining section 104, the light source dependency estimation section 105, the area dividing section 106 and the control section 120 are implemented by a CPU 204 executing a program. Note however that some or all of these functions may be implemented by hardware. A memory 203 stores a polarization image captured by the polarization image capturing section 103, polarization information obtained by the polarization information obtaining section 104, and light source dependency information estimated by the light source dependency estimation section 105.

Figure 3:
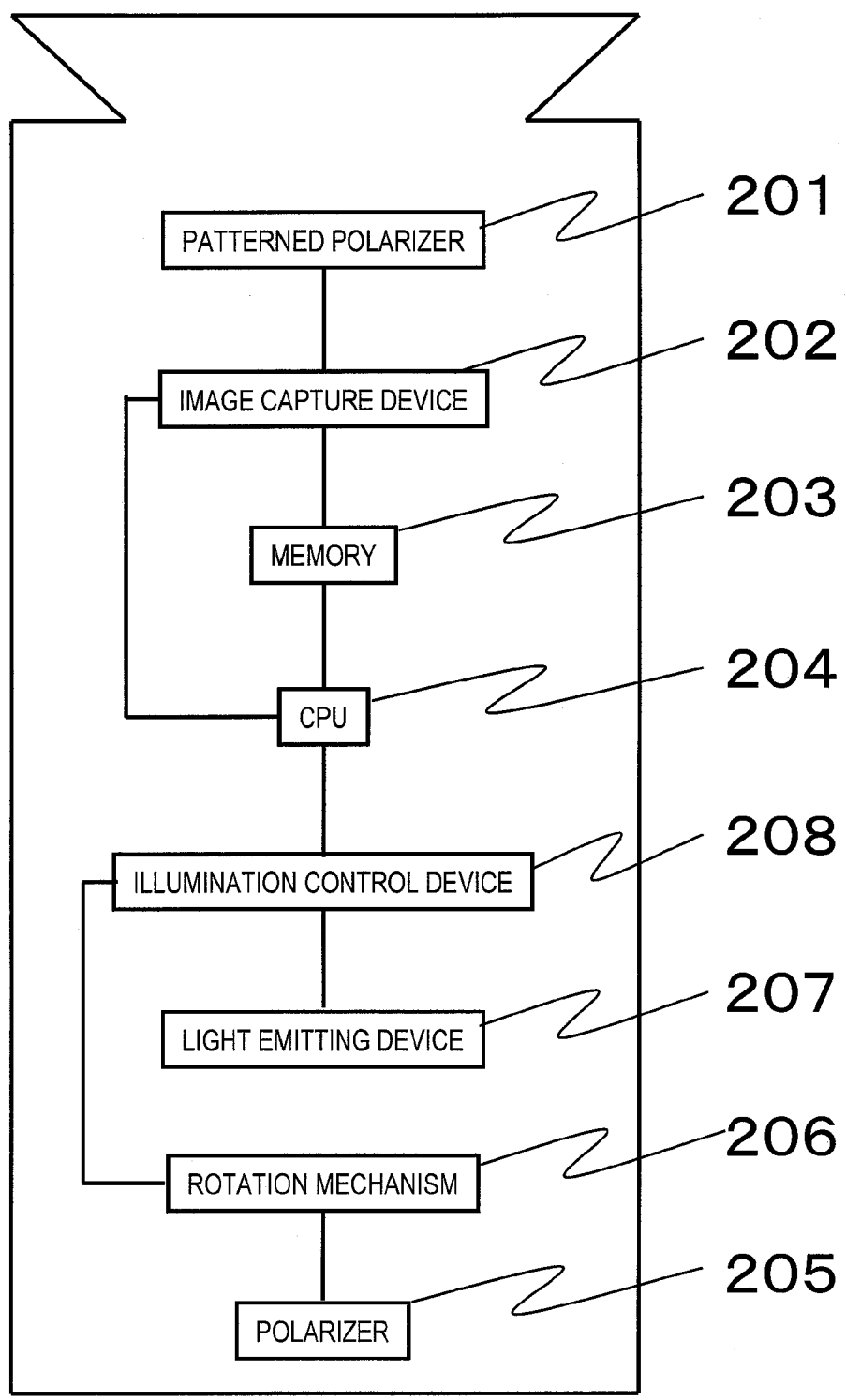
FIG. 3 A diagram showing an exemplary configuration of a camera including therein an area dividing device according to the first embodiment of the present invention.

Next, referring to FIG. 3, a configuration and an operation of a camera including therein the image processing apparatus of the present embodiment will be described. FIG. 3 is a block diagram showing an exemplary configuration of such a camera. The camera of FIG. 3 includes the patterned polarizer 201, an image capture device 202, the memory 203, the CPU 204, an illumination control device 208, a light emitting device 207, a rotation mechanism 206, and a polarizer 205.

In step S101, polarized light is emitted onto the object from the camera of FIG. 3. Where a flash is used as the light emitting device 207, since a polarization filter (the polarizer 205) is provided in front of the flash, polarized light can be emitted onto the object. As means for using polarized light, a liquid crystal polarizer, or the like, may be used.

The polarizer 205 is rotated by the rotation mechanism 206. The illumination control section 102 changes the main axis direction of the polarized light by controlling the rotation mechanism 206. Where a liquid crystal polarizer is used as the polarizer, instead of using a polarization filter, the illumination control section 102 changes the main axis direction of the polarized light by changing the voltage applied to the liquid crystal polarizer.

An operation of the camera having such a configuration as shown in FIG. 3 will now be described in detail.

First, in step S101 shown in FIG. 2, the illumination section 101 of FIG. 1 uses the light emitting device 207 and the polarizer 205 to thereby emit polarized light which is polarized in a main axis direction specified by the illumination control section 102 onto the object. Where the flash of the camera is used as the light emitting device 207, for example, this can be realized by providing a polarization filter (the polarizer 205) in front of the flash. A liquid crystal polarizer, or the like, may be used as means for using polarized light.

The polarizer 205 is rotated by the rotation mechanism 206. The illumination control section 102 changes the main axis direction of the polarized light by controlling the rotation mechanism 206. Where a liquid crystal polarizer is used as the polarizer, instead of using a polarization filter, the illumination control section 102 may vary the main axis direction of the polarized light by changing the voltage applied to the liquid crystal polarizer.

In step S102, the polarization image capturing section 103 receives light, by means of the image capture device 202, from the object through the patterned polarizer 201, thus obtaining a first polarization image, which is an image including polarization information. This is achieved by the CPU 120 synchronizing the light emission by the light emitting device 207, the rotation of the polarizer 205 by the rotation mechanism 206, and the image-capturing by the image capture device 202 with one another.

Figure 4:
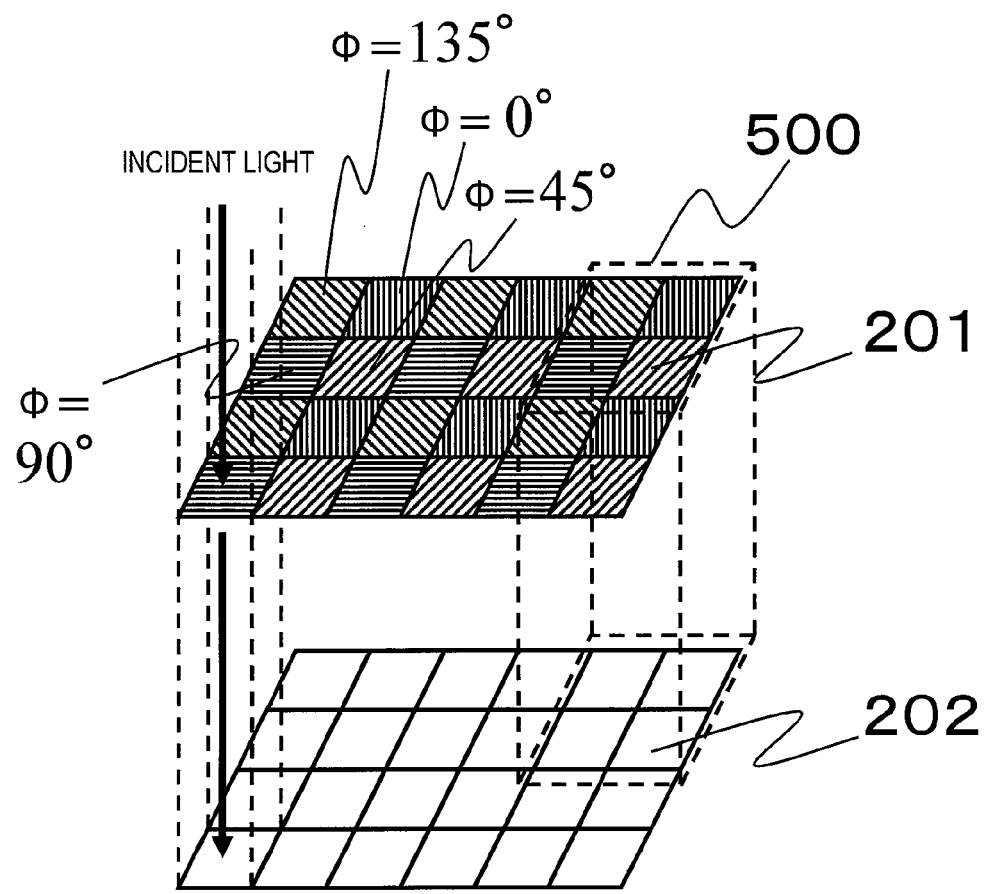
FIG. 4 A schematic diagram showing a relationship between a patterned polarizer and an image sensor of an image capture device of the present invention.

FIG. 4 is a schematic diagram showing the relationship between the patterned polarizer 201 and the image capture device 202 included in the polarization image capturing section 103 shown in FIG. 1. In the present embodiment, the patterned polarizer 201 is laid on the image capture device 202. It is preferred that the patterned polarizer 201 is provided in parallel to the image-capturing plane of the image capture device 202. The incident light passes through the patterned polarizer 201 to reach the image sensor 202, where the brightness thereof is observed, and therefore the polarization image capturing section 103 can obtain the polarization information.

Figure 5:
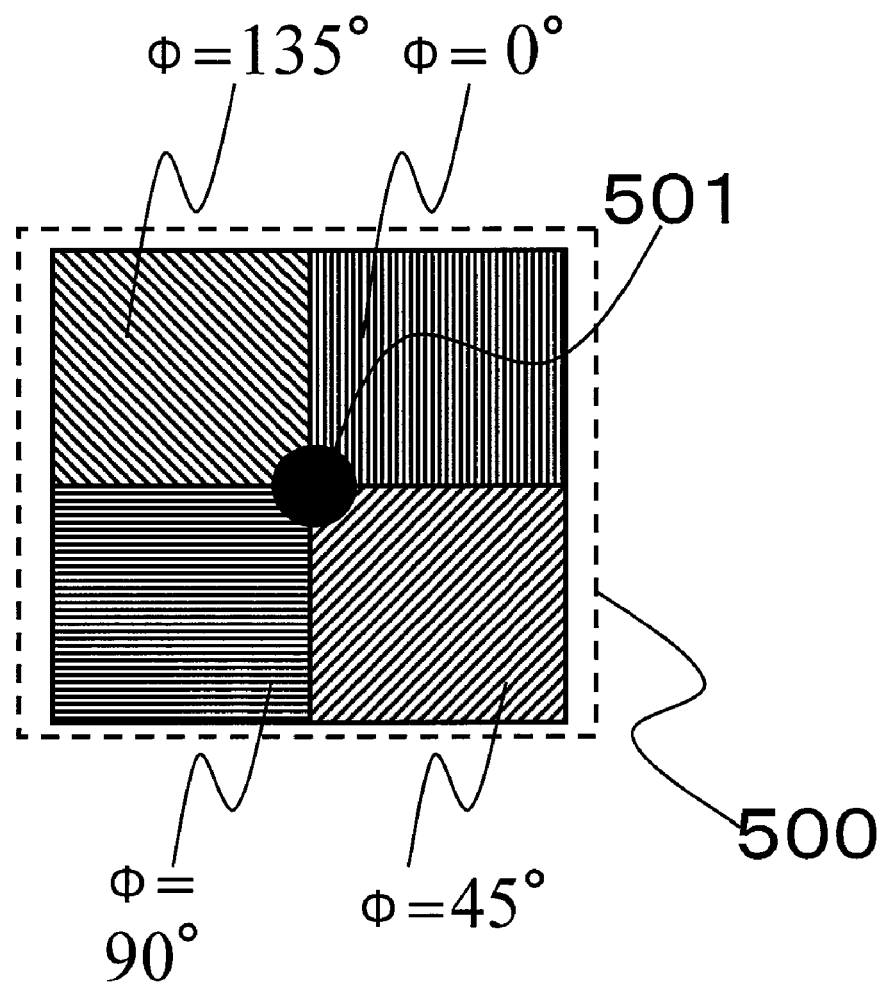
FIG. 5 A schematic diagram illustrating an arrangement of the patterned polarizer of the present invention.

FIG. 5 shows the four-way patterned polarizer, wherein straight lines in each pixel represent the polarization main axis direction of the minute polarizing plate provided on the pixel. That is, the image capture device includes pixels of four different polarization directions defined by the rotation angles (Φi=0°, 45°, 90° and 135°) of the polarization axis. The patterned polarizer exhibits polarization characteristics such that the TM-wave is transmitted and the TE-wave is reflected (not transmitted).

Such characteristics can be produced by, for example, using a photonic crystal described in Kawashima, Sato, Kawakami, Nagashima, Ota, Aoki, "Development polarization imaging device and applications by using patterned polarizer", Proceedings of the IEICE General Conference 2006, No. D-11-52, P. 52, 2006. With a photonic crystal, the TE-wave is light that has the vibration plane parallel to grooves formed on the surface and the TM-wave is light that has the vibration plane perpendicular thereto. When capturing this polarization image, it is preferred that the dynamic range of the brightness and the number of bits are as large as possible (e.g., 16 bits).

In step S103 of FIG. 2, the polarization information obtaining section 104 generates the polarization information, which is information regarding the received polarized light, by using the correspondence with the brightness of the light having passed through the three-way or more polarizer, for each of unit pixels of the first polarization image. This process will now be described in detail.

Figure 6:
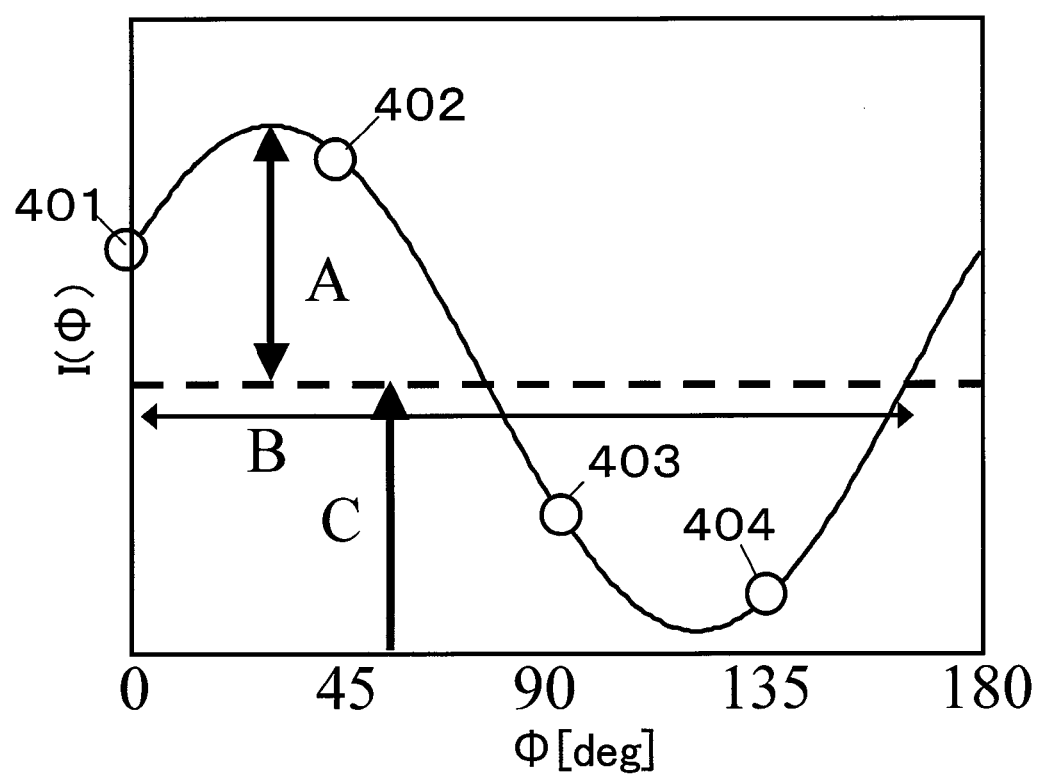
FIG. 6 A schematic diagram illustrating the sinusoidal brightness change and the observed brightness points of the present invention.

It is known in the art that the brightness of light having passed through a polarizer (linearly-polarized light which is polarized in the polarization main axis direction) changes depending on the polarization main axis angle of the polarizer. FIG. 6 shows how a single sinusoidal curve is formed by the brightnesses 401 to 404 of light having passed through four different polarizers having different polarization main axis angles φi=0°, 45°, 90° and 135°. The sinusoidal curve represents the polarization characteristics at the point 501 in FIG. 5. Herein, FIG. 5 is a schematic diagram showing the four-way polarizer 201 and the image sensor 202 of FIG. 4 as viewed from the direction of the incident light.

Note that the polarization main axis angle being 0° is equal to that being 180° (n). When obtaining the sinusoidal curve, it is preferred that a camera such that the shooting gamma=1 is used or a linearity correction is made so that the shooting gamma=1. While the four points are shown to be closely along the single sinusoidal curve, in fact, a single sinusoidal function with a 180-degree cycle is determined, as an optimal value, from many measured points.

The polarization information obtaining section 104 generates, as the polarization information, the amplitude and the phase information of the curve. Specifically, the reflected light brightness I for the main axis angle φ of the patterned polarizer is approximated as follows.

[Exp. 1]

$$I(\phi) = A \cdot \sin 2(\phi - B) + C \quad \text{Expression 1}$$

Herein, as shown in FIGS. 6, A, B and C are constants that represent the amplitude, the phase and the average value, respectively, of the brightness fluctuation curve due to the polarizer. Now, Expression 1 can be developed as follows.

[Exp. 2]

$$I(\phi) = a \cdot \sin 2\phi + b \cdot \cos 2\phi + C \quad \text{Expression 2}$$

where

[Exp. 3]

$$A = \sqrt{a^2 + b^2},$$
$$\sin(-2B) = \frac{b}{\sqrt{a^2 + b^2}},$$
$$\cos(-2B) = \frac{a}{\sqrt{a^2 + b^2}}$$

Expression 3

[Exp. 4]

$$B = -\frac{1}{2}\tan^{-1}\left(\frac{b}{a}\right) \quad \text{Expression 4}$$

That is, for a 4-pixel sample ($\phi_i$, $I_i$), the sinusoidal function, Expression 1, can be approximated by obtaining A, B and C that minimize Expression 5 below. Note that $I_i$ represents the measured brightness for the polarizing plate rotation angle $\phi_i$. N is the number of samples, which is 4 here.

[Exp. 5]

$$f(a, b, C) = \sum_{i=1}^{N} (I_i - a \cdot \sin 2\phi_i - b\cos 2\phi_i - C)^2 \quad \text{Expression 5}$$

Through the above process, the three parameters A, B and C of the sinusoidal approximation are determined. By using the parameters obtained as described above, the polarization information obtaining section 104 obtains at least one of the degree of polarization ρ, the polarization phase φmax, the polarization estimation error E, the polarization maximum luminance value Imax, and the polarization minimum luminance value Imin, as the polarization information.

Degree of polarization ρ

[Exp. 6]

$$\rho = \frac{I_{max} - I_{min}}{I_{max} + I_{min}} = \frac{A}{C} = \frac{A}{\bar{I}} \quad \text{Expression 6}$$

Polarization phase φmax (0≦φmax≦π [rad])

Expression 7

$$\phi_{max} = \frac{\pi}{4} + B \quad [\text{Exp. 7}]$$

Polarization estimation error E

Expression 8

$$E = \sum_{i=0}^{N-1} (I_i - A \cdot \sin 2(\psi_i - B) - C)^2 \quad [\text{Exp. 8}]$$

Polarization maximum luminance value Imax

[Exp. 9]

$$I_{max}=A+C \qquad \text{Expression 9}$$

Polarization minimum luminance value Imin

[Exp. 10]

$$I_{min}=C-A \qquad \text{Expression 10}$$

Herein, the degree of polarization is an index representing how much the light is polarized, and the polarization phase is the angle at which the brightness, which changes depending on the polarization main axis angle, is maximized. The polarization estimation error is the total difference between the brightness measured for a 4-pixel sample and the brightness determined from the above sinusoidal function obtained by approximation. The polarization maximum luminance value is the maximum luminance value which can be reached as the main axis angle φ of the patterned polarizer is changed, and the polarization minimum luminance value is the minimum luminance value which can be reached as the main axis angle φ of the patterned polarizer is changed, and is a non-polarized component luminance value.

Figure 7:
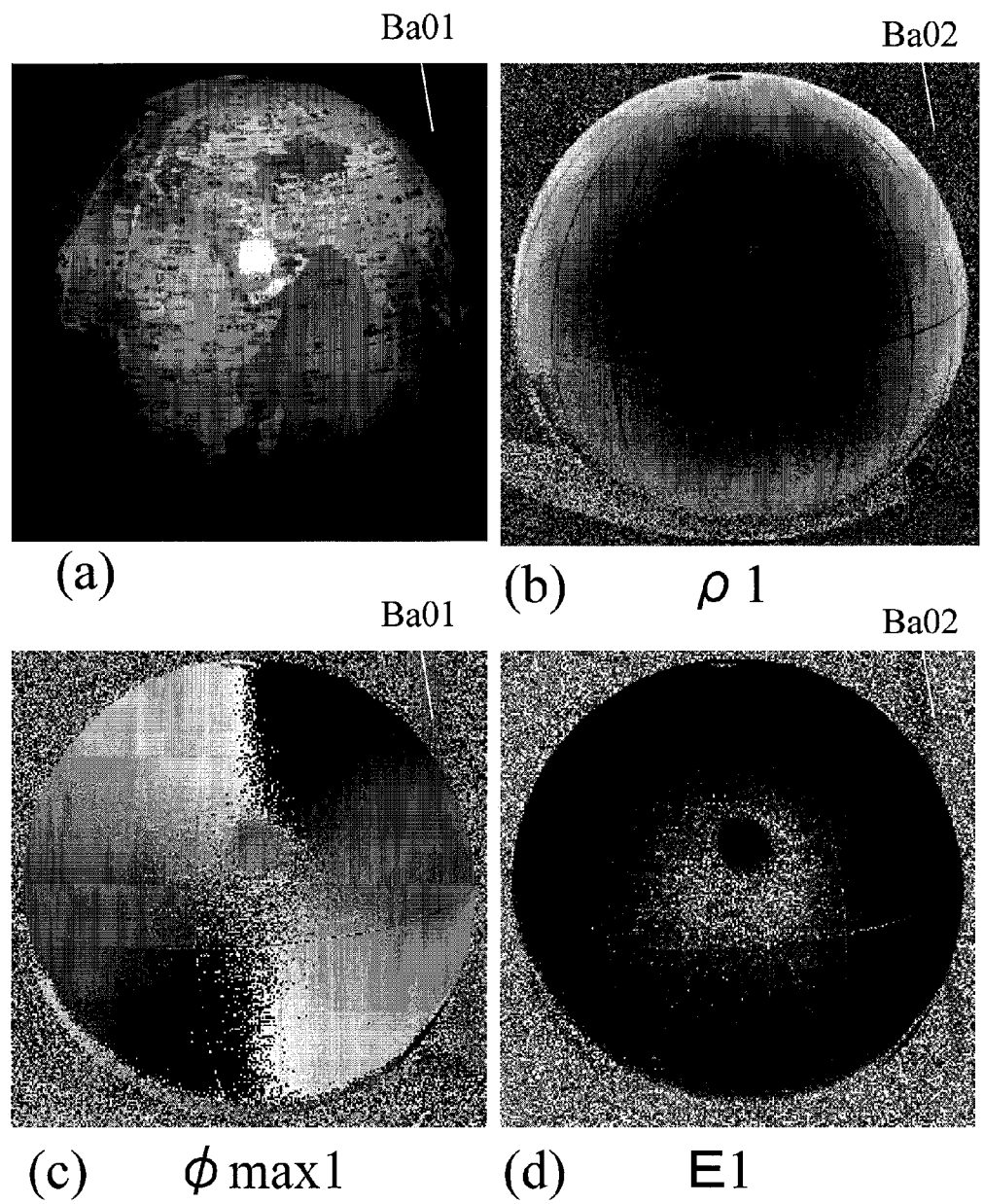
FIG. 7 An image captured of the object being a spherical globe, and degree of polarization $\rho 1$, the polarization phase $\phi max1$ and the polarization estimation error E1 obtained from that image.
Figure 8:
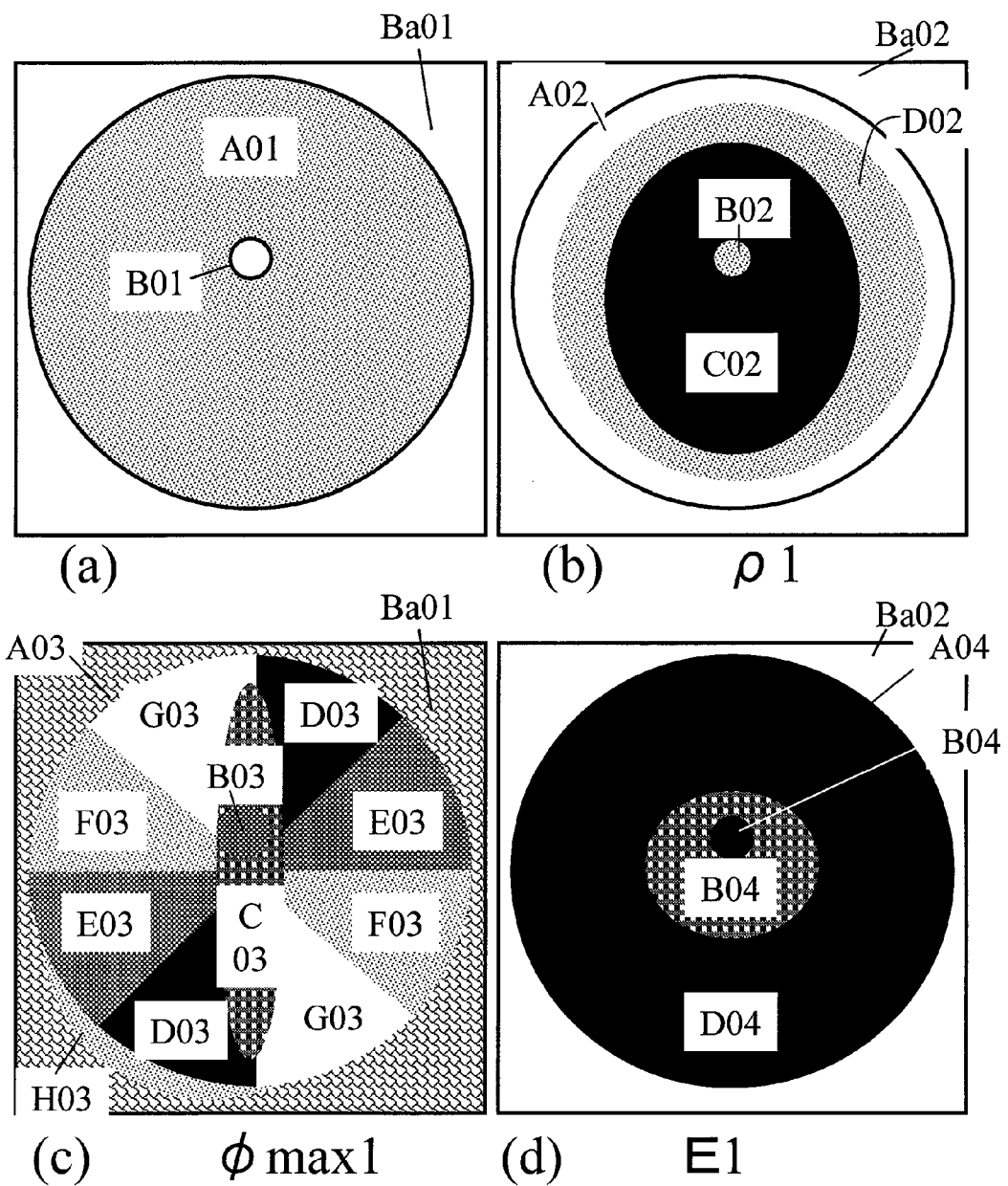
FIG. 8 Schematic diagrams showing an image captured of the object being a spherical globe, and the degree of polarization $\rho 1$, the polarization phase $\phi max1$ and the polarization estimation error E1 obtained from that image.
Figure 9:
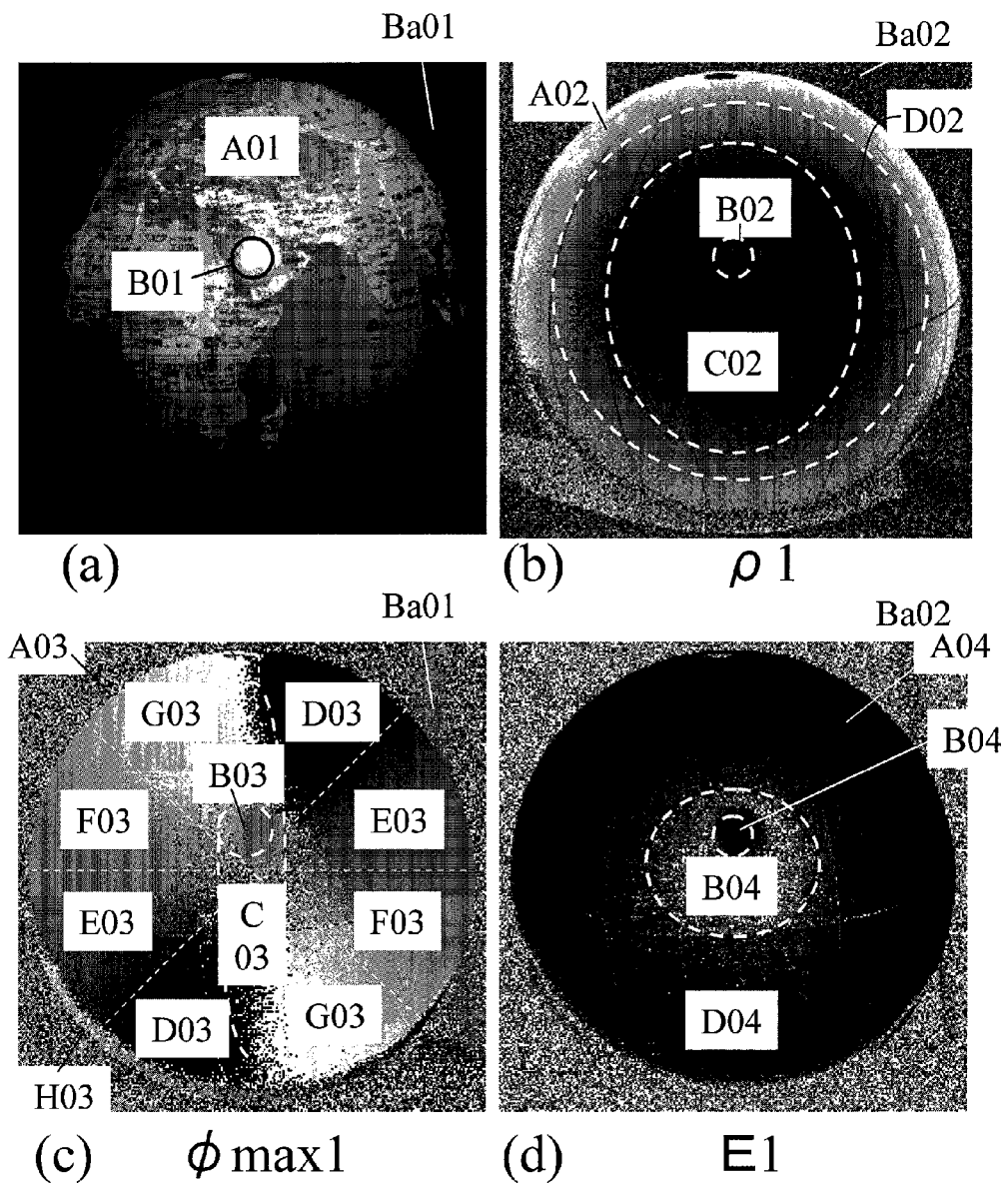
FIG. 9 A diagram showing the image of FIG. 7 divided into a plurality of areas based on the high/low of the brightness.

FIG. 7 shows, each as an image, the degree of polarization ρ1, the polarization phase φmax1 and the polarization estimation error E1, which are obtained from the first polarization image for the spherical globe. In this figure, FIG. 7(a) shows an image of the globe, which is the object, FIG. 7(b) the degree of polarization ρ1 for the object of FIG. 7(a), FIG. 7(c) the polarization phase φmax1 (0° being black, and 180° being white) for the object of FIG. 7(a), and FIG. 7(d) the polarization estimation error E1 for the object of FIG. 7(a). FIG. 8 shows the images of FIG. 7 in a schematic manner (with shading emphasized). In the figure, areas (A01 to D04) correspond to the areas in FIG. 9. FIG. 9 shows views obtained by dividing each image of FIG. 7 into a plurality of areas based on the high/low of the brightness. In any image, the higher the brightness is (the whiter), the larger the value.

FIG. 10 shows the result of a similar process performed for a styrene-foam head model. From these images, it can be seen that the degree of polarization is high near the occluding edge, and that the polarization phase monotonously increases clockwise around the sphere with a 180° cycle in areas that are not covered by the shade of the object. These polarization information images are deeply related to the direction of the surface normal of the object, and provide a basis for shape estimation.

In FIGS. 7(h) to 7(d), data of the background area (Ba01 to Ba04) are disturbed. This is because the brightness resolution was low in the background area since it was very dark therein. Therefore, the reliability of the polarization information is decreased, and the data is disturbed. By increasing the brightness of the background area by elongating the exposure time, it is possible to obtain polarization information of a sufficient precision even in the background area. The background area may be masked so that it is excluded from the area dividing process.

In step S104, the illumination control section 102 controls the illumination section 101 so as to emit, onto the object, polarized light whose polarization state is different from that when the first polarization image was obtained. The illumination section 101 again emits polarized light which is polarized in a main axis direction specified by the illumination control section 102 onto the object.

The change of the polarization state in this process is to vary the direction of the polarization main axis, for example. The illumination control section 102 may rotate the polarization main axis direction by 90 degrees, for example.

In step S105, the polarization image capturing section 103 receives light, by means of an image sensor, from the object through the patterned polarizer 201, as described above, thus obtaining a second polarization image, which is an image including polarization information. This is achieved by the control section 120 synchronizing the illumination unit 121 and the polarization information obtaining section 122 with each other. Where polarized light of varied polarization information are emitted at intervals of 0.2 sec by the control section 120, for example, the control section 120 may be used to synchronize the image-capturing in step S102 by the polarization image capturing section 103 with the emission of polarized light, and to set the interval from step S102 to the image-capturing in step S105 to be 0.2 sec. Then, the user can obtain two images, i.e., the first polarization image and the second polarization image, in a single image-capturing operation.

In step S106, the polarization information obtaining section 104 generates polarization information, which is information regarding the received polarized light, by using the correspondence with the brightness of the light having passed through the three-way or more polarizer, as described above, for each of unit pixels of the captured second polarization image.

Figure 11:
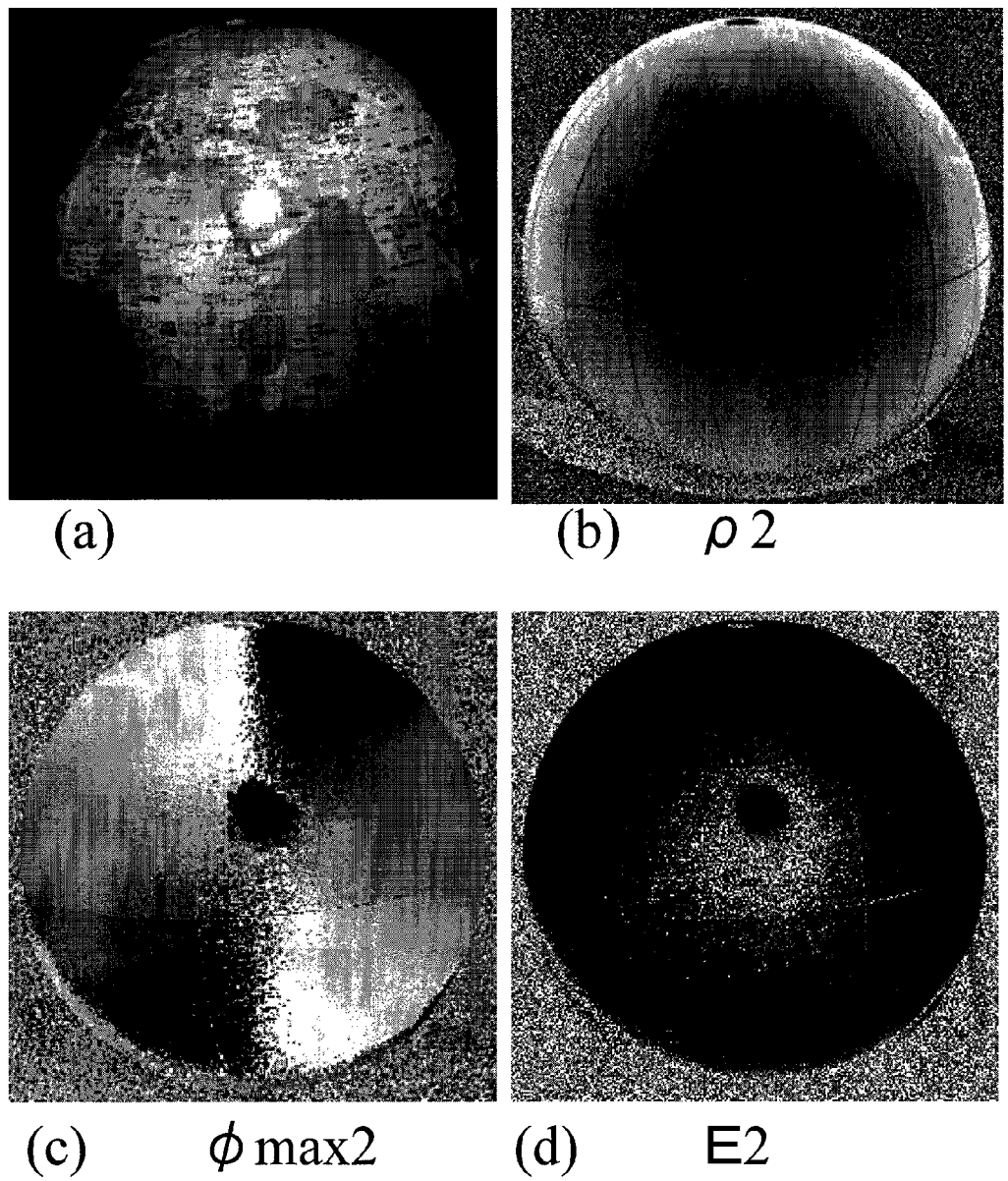
FIG. 11 An image captured of the object being a spherical globe, with the polarization state of the light source being different from that of FIG. 7, and the degree of polarization ρ2, the polarization phase φmax2 and the polarization estimation error E2 obtained from that image.
Figure 12:
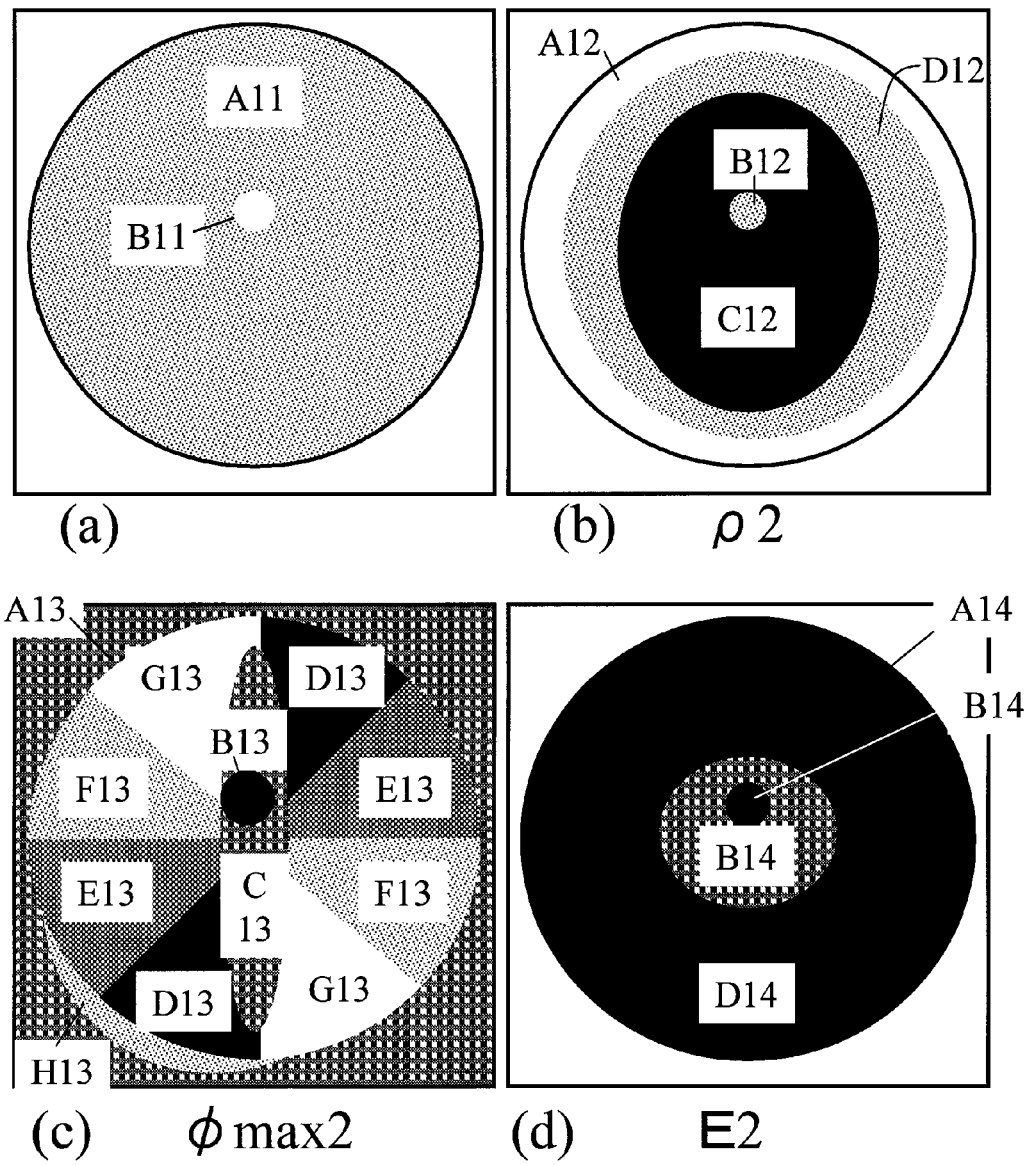
FIG. 12 Schematic diagrams showing an image captured, of the object being a spherical globe, with the polarization state of the light source being different from that of FIG. 7, and the degree of polarization ρ2, the polarization phase φmax2 and the polarization estimation error E2 obtained from that image.

FIG. 11 shows, each as an image, the degree of polarization ρ2, the polarization phase φmax2 and the polarization estimation error E2, which are obtained from the second polarization image. In this figure, FIG. 11(a) shows an image of the globe, which is the object, FIG. 11(b) the degree of polarization ρ2 for the object of FIG. 11(a), FIG. 11(c) the polarization phase φmax2 (0° being black, and 180° being white) for the object of FIG. 11(a), and FIG. 11(d) the polarization estimation error E2 for the object of FIG. 11(a). FIG. 12 shows the images of FIG. 11 in a schematic manner (with shading emphasized). In the figure, areas (A11 to D14) correspond to areas (A11 to D14) in FIG. 13. FIG. 13 shows views obtained by dividing each image of FIG. 11 into a plurality of areas based on the high/low of the brightness. In any image, the higher the brightness is (the whiter), the larger the value.

In step S107 of FIG. 2, the light source dependency estimation section 105 estimates the light source dependency by making a comparison between the polarization information obtained by the polarization information obtaining section 104 from the first polarization image and the second polarization image. This process will now be described in detail.

As described above, the specular reflection area and the diffuse reflection area are different from each other in terms of the light source dependency. In the present embodiment, the polarization axis direction of the emitted light is changed in order to examine the light source dependency. As described above, the illumination control section 102 is used to emit linearly-polarized light whose polarization axis directions are different from each other by 90 degrees, thereby obtaining the first polarization image and the second polarization image. The light source dependency is estimated by making a comparison between polarization phase information obtained from these images. Note that as is clear from a comparison between FIGS. 7 and 11, the degree of polarization ρ1 and the degree of polarization ρ2 are generally of the same magnitude (the same brightness) in the area B12. It is believed that this is because even though the polarized light emitted onto the object have polarization main axis angles different from each other, the brightnesses of the polarized light reflected in the specular reflection area by chance become substantially equal to each other.

Figure 14:
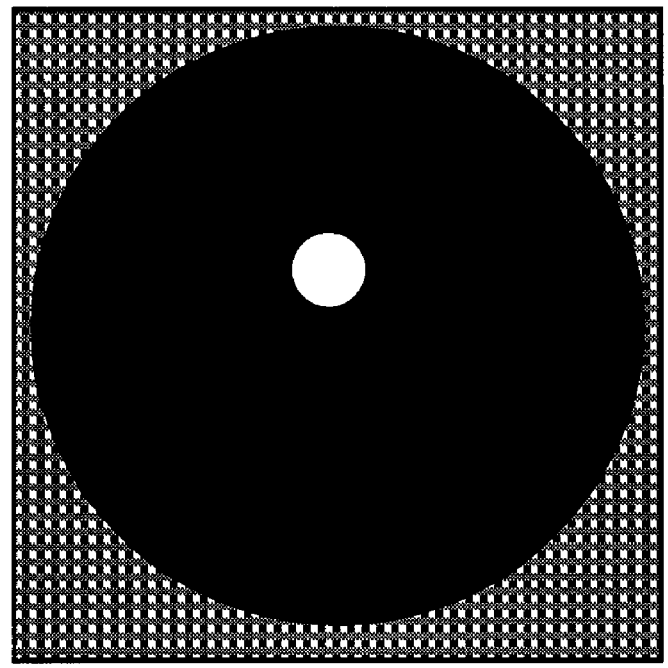
FIG. 14 A schematic diagram showing, as an image, polarization phase difference values obtained by a light source dependency estimation section according to the first embodiment of the present invention.

FIG. 14 shows, as an image, the difference value between the polarization phase φmax1 obtained from the first polarization image and the polarization phase φmax2 obtained from the second polarization image. In this figure, pixels with higher brightnesses (whiter) represent those of larger difference values.

As described above, since the specular reflection area occurs by the surface reflection, the polarization characteristics of the incident light are maintained. That is, it can be considered that the specular reflection area has a high light source dependency. On the other hand, in the diffuse reflection area, due to the repeated scattering, the polarization characteristics of the incident light have been lost. That is, it can be considered that the diffuse reflection area has a low light source dependency as it is not influenced by the incident light.

In view of this, the light source dependency estimation section 105 estimates, as the light source dependency, the first light source dependency LDφ according to the following expression by using the polarization phase difference of pixels between the first polarization image and the second polarization image.

Expression 11

$$LD_\varphi = \frac{2}{\pi} \cdot |\varphi_{max1} - \varphi_{max2}|$$ [Exp. 11]

Herein, $|\phi_{max1} - \phi_{max2}|$ is the difference value between the polarization phases φmax1[rad] and φmax2[rad] taking the period π into consideration, as expressed by the following expression. The range thereof is [0,π/2].

[Exp. 12]

$$|\phi_{max1} - \phi_{max2}| = \min(|\phi_{max1} - \phi_{max2}|, \pi - |\phi_{max1} - \phi_{max2}|)$$ Expression 12

FIG. 15 is a diagram showing the relationship between $|\phi_{max1} - \phi_{max2}|$ and φmax1, φmax2. The first light source dependency LDφ is 0 when the polarization phase of the first polarization image and that of the second polarization image are equal to each other, and the value increases as the polarization phase difference increases and is 1 when the polarization phase difference is at maximum (π/2). That is, the first light source dependency LDφ is larger when the polarization phase changes depending on the change of the polarization state of the light source, and the first light source dependency LDφ is small when the polarization phase is not influenced by the change of the polarization state of the light source.

The light source dependency does not need to be the polarization phase difference of pixels between the first polarization image and the second polarization image, but may be, for example, the second light source dependency LDρ, which is the difference in the degree of polarization between the first polarization image and the second polarization image. In such a case, the second light source dependency LDρ is expressed by the following expression.

[Exp. 13]

$$LD_\rho = |\rho_1 - \rho_2|$$ Expression 13

As is the first light source dependency LDφ, the second light source dependency LDρ is 1 when the degree of polarization of the first polarization image and that of the second polarization image are equal to each other, and the value increases as the difference in the degree of polarization increases and is 0 when the difference in the degree of polarization is at maximum (1.0). That is, the second light source dependency LDρ is large when the degree of polarization changes depending on the change of the polarization state of the light source, and the second light source dependency LDρ is small when the degree of polarization is not influenced by the change of the polarization state of the light source. Note that as described above, even though the polarized light emitted onto the object have polarization main axis angles different from each other, the brightnesses of the light reflected in the specular reflection area may by chance become equal to each other. In order to avoid an erroneous determination which may occur in such a case, polarized light of three or more different polarization axis directions may be used to obtain three or more different polarization images, based on which the difference in the degree of polarization is evaluated.

In step S108 of FIG. 2, the area dividing section 106 performs an area division based on the polarization information generated by the polarization information obtaining section 104 and the light source dependency information estimated by the light source dependency estimation section 105. This process will now be described in detail.

Figure 17:
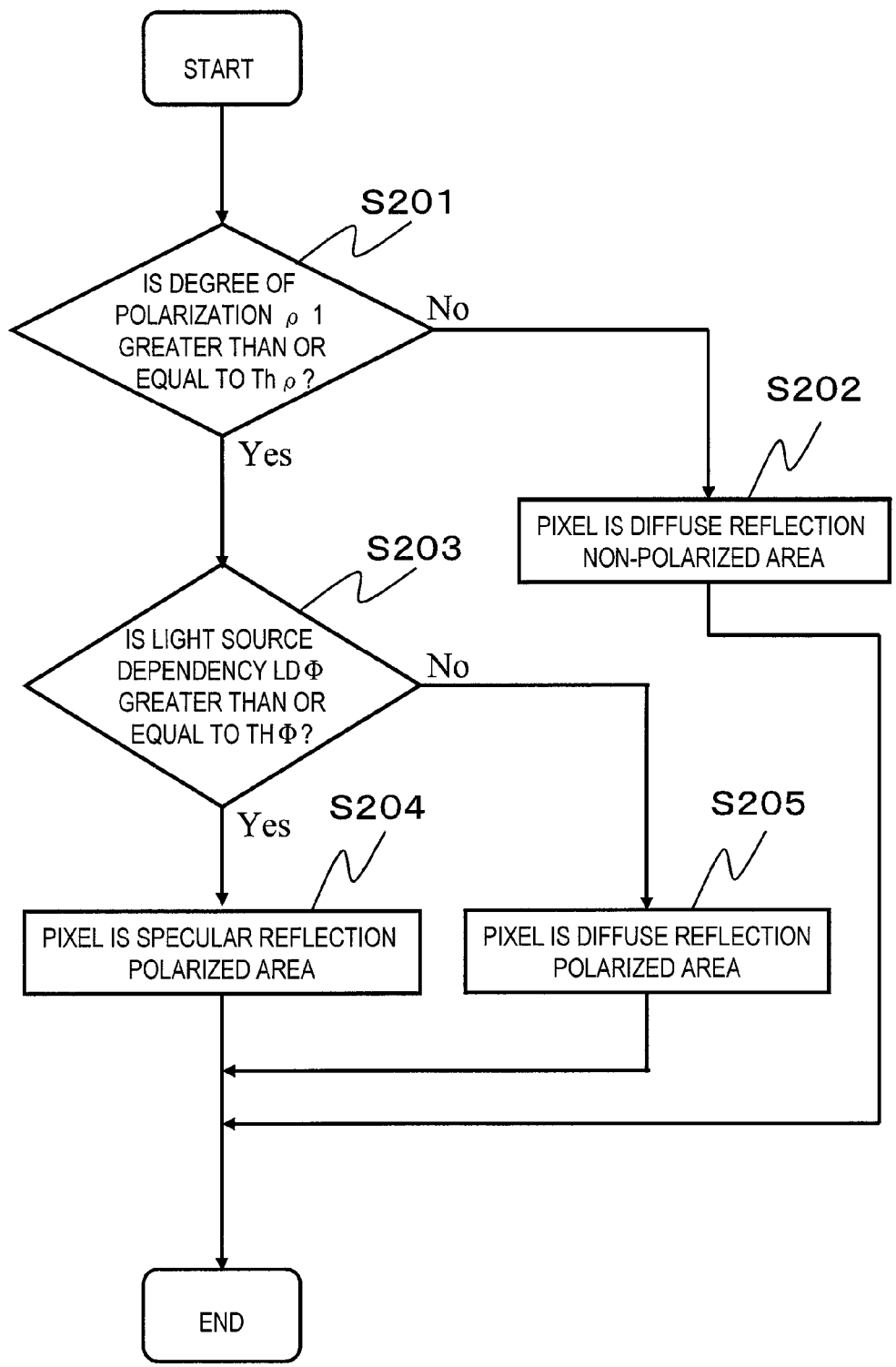
FIG. 17 A flow chart showing the flow of a process performed by the area dividing section according to the first embodiment of the present invention.

FIG. 16 shows an image division criterion for the area dividing section 106. FIG. 17 is a flow chart showing the flow of a process performed by the area dividing section 106. The flow of the process will now be described.

First, in step S201 of FIG. 17, in order to determine whether the pixel belongs to a non-polarized area or a polarized area, the area dividing section 106 compares the magnitude of the degree of polarization ρ1 of the pixel with the threshold Thρ to determine whether the degree of polarization ρ is greater than or equal to the threshold Thρ or smaller than Thρ. If the degree of polarization ρ1 of the pixel is smaller than the threshold Thρ (No in step S201), it is determined that the pixel is included in the diffuse reflection non-polarized area (step S202), and the process is ended. On the other hand, if the degree of polarization ρ1 of the pixel is greater than or equal to the threshold Thρ (Yes in step S201), it is determined whether the first light source dependency LDφ estimated by the light source dependency estimation section 105 is greater than the threshold Thφ (step S203). If the first light source dependency LDφ is greater than or equal to the threshold Thφ (Yes in step S203), it is determined that the pixel is a specular reflection polarized area (step S204), and the process is ended. On the other hand, if the first light source dependency LDφ is smaller than the threshold Thφ (No in step S203), it is determined that the pixel is included in the diffuse reflection polarized area (step S205), and the process is ended.

Figure 72:
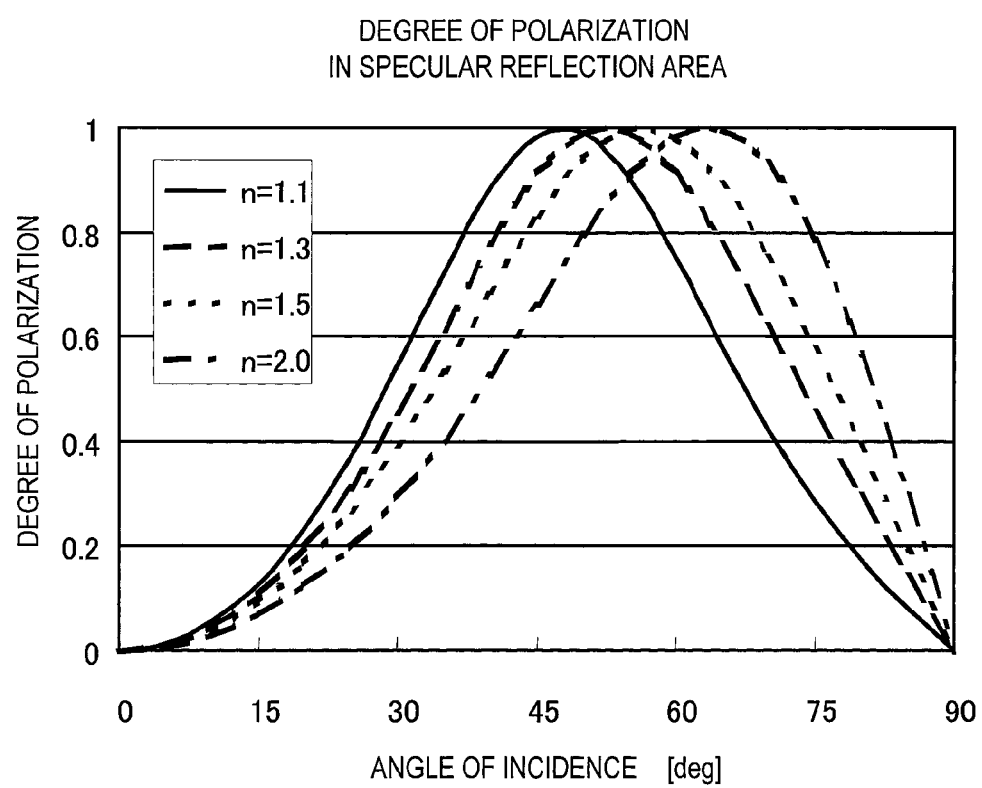
FIG. 72 A graph showing the degree of polarization of the specular reflection component with respect to the angle of incidence for objects whose refractive indices are n=1.1, 1.3, 1.5 and 2.0.
Figure 73:
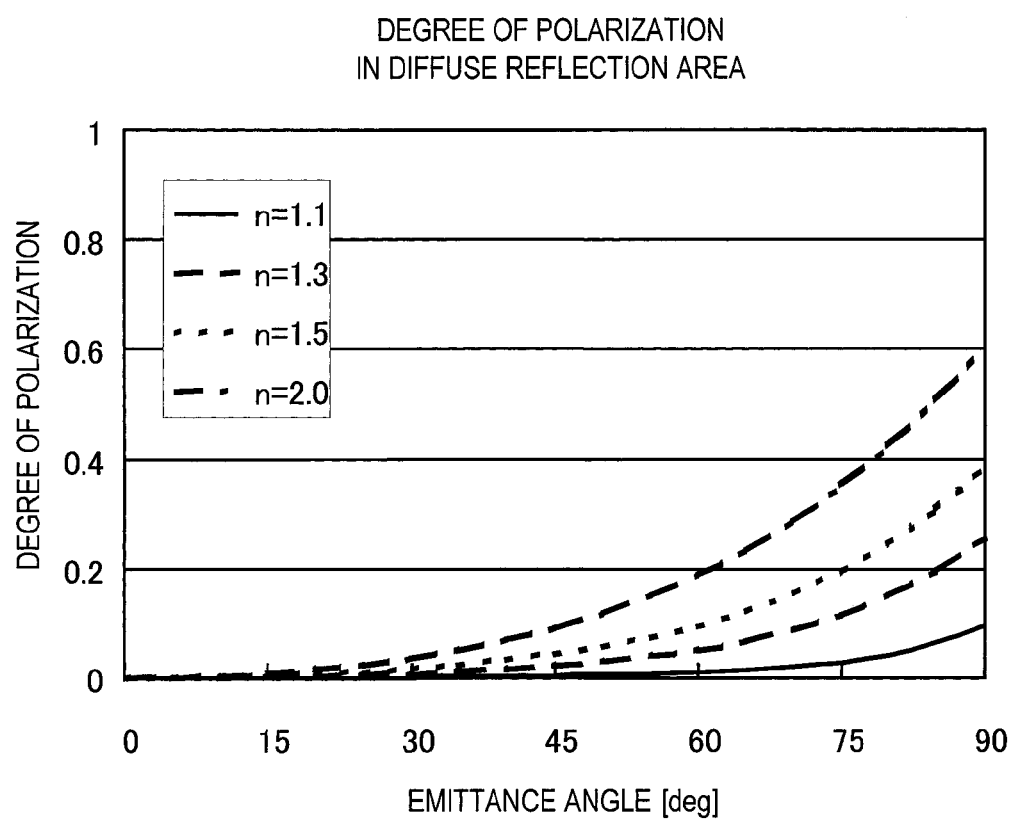
FIG. 73 A graph showing the degree of polarization of the diffuse reflection component with respect to the emittance angle for objects whose refractive indices are n=1.1, 1.3, 1.5 and 2.0.

The threshold Thρ of the degree of polarization may be set based on the refractive index of the object, the normal direction of the object, the light source direction, the viewing direction, etc. As shown in FIGS. 72 and 73, the degree of polarization of the specular reflection component and the degree of polarization of the diffuse reflection component of the object can be determined uniquely once the refractive index, the angle of incidence and the emittance angle are obtained. Therefore, the degree of polarization of the specular reflection component and the degree of polarization of the diffuse reflection component, which are obtained from FIGS. 72 and 73, may be used as Thρ. For example, if the refractive index of the object is 1.3 and the angle of incidence is 30 degrees, it is believed from FIG. 73 that the degree of polarization of the diffuse reflection component is certainly 0.05 or less, and therefore the threshold Thρ can be set to 0.05.

If information such as the refractive index of the object, the normal direction of the object, the light source direction, the viewing direction, etc., is not available, the threshold Thρ may be determined based on the maximum value of the degree of polarization of the diffuse reflection component. For example, assuming that there is no object whose refractive index is 2.0 or more, the maximum value of the degree of polarization of the diffuse reflection component is believed to be about 0.6 from FIG. 73, and the threshold Thρ may therefore be set to be about 0.8.

The threshold Thφ of the first light source dependency LDφ may be determined experimentally, and may be set to 0.5, for example. The threshold Thρ of the degree of polarization may also be determined experimentally.

In step S201, the comparison may be made using the degree of polarization ρ2 obtained from the second polarization image, instead of making the comparison using the degree of polarization ρ1 obtained from the first polarization image. Also in such a case, the comparison may be made with the threshold Thρ. Alternatively, the average value between the degree of polarization ρ1 obtained from the first polarization image and the degree of polarization ρ2 obtained from the second polarization image may be used. For example, when the main axis of the linearly-polarized light of the light source is changed by 90 degrees, it is possible to obtain a degree of polarization that is substantially equivalent to that when a light source of a non-polarized component is used, by obtaining the average value between the degree of polarization ρ1 and the degree of polarization ρ2. This allows for a more accurate area division. Also in such a case, the comparison may be made with the threshold Thρ.

Figure 18:
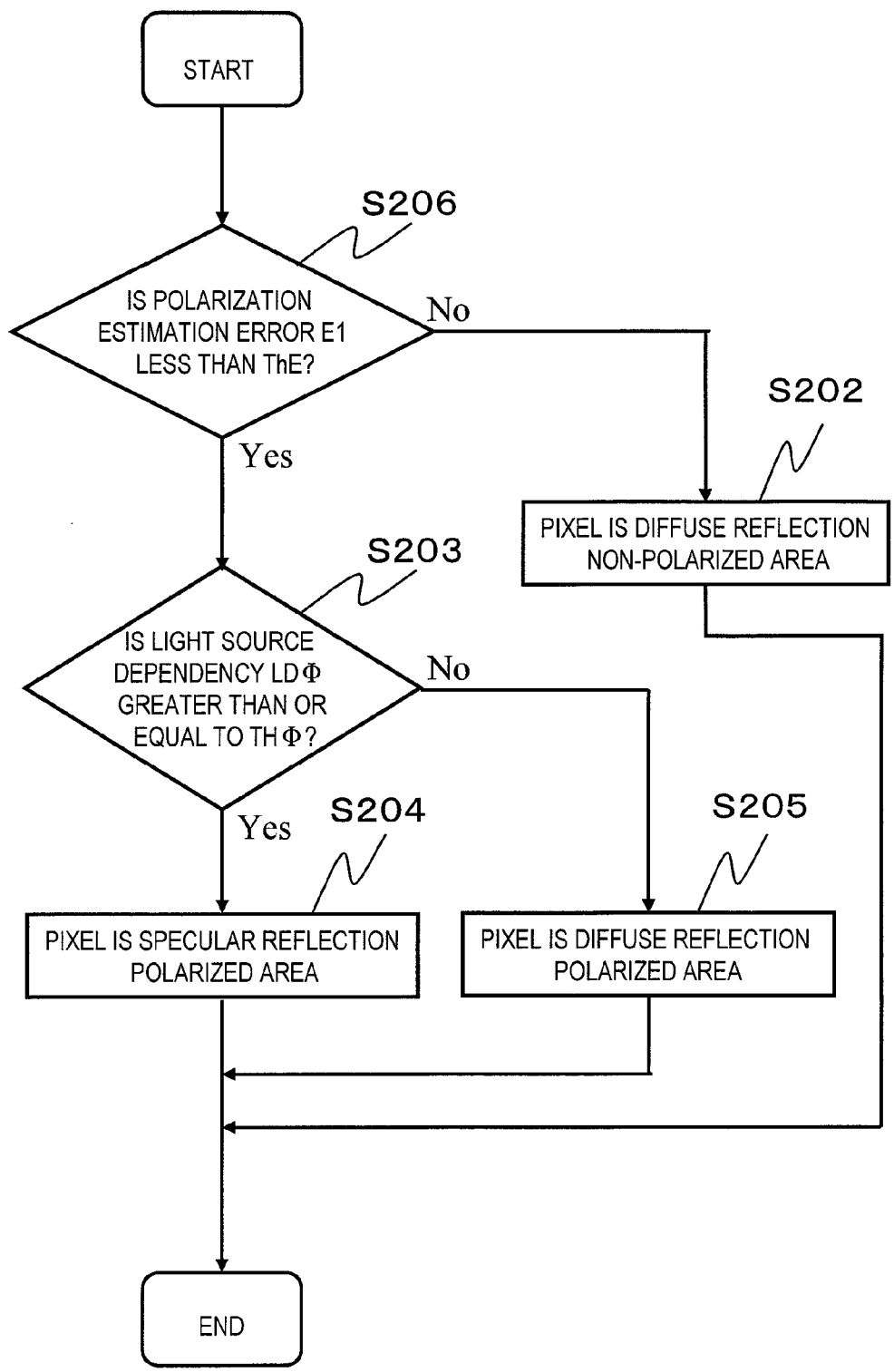
FIG. 18 A flow chart showing the flow of another process performed by the area dividing section according to the first embodiment of the present invention.

In step S201, the comparison may be made using the polarization estimation error E1 obtained from the first polarization image. This process is effective where there is a large error in the luminance value, e.g., where the stability of the light source is low. FIG. 18 is a flow chart showing the flow of the process performed by the area dividing section 106 in such a case. In FIG. 18, like steps to those of FIG. 17 are denoted by like reference numerals to those of FIG. 17 and will not be described in detail below.

In step S206 of FIG. 18, the area dividing section 106 determines whether the magnitude of the polarization estimation error E1 is greater than or equal to the threshold ThE or is less than the threshold ThE. If the polarization estimation error E1 of the pixel is greater than or equal to the threshold ThE (No in step S206), it is determined that the pixel is a diffuse reflection non-polarized area (step S202), and the process is ended. On the other hand, if the polarization estimation error E1 is less than the threshold ThE (Yes in step S206), a comparison is made as to whether the first light source dependency LDφ estimated by the light source dependency estimation section 105 is greater than the threshold Thφ (step S203).

In step S203, the second light source dependency LDρ, which is the difference in the degree of polarization between the first polarization image and the second polarization image described above, may be used. As the degree of polarization is strongly influenced by multiple reflection, or the like, it is effective to use the second light source dependency LDρ, which is the difference in the degree of polarization, for an object that is unlikely to be influenced by multiple reflection. Specifically, an object that is unlikely to be influenced by multiple reflection is an object having a convex shape. The first light source dependency LDφ and the second light source dependency LDρ may be used as being combined with each other. In such a case, the weighted average between Expression 11 and Expression 13 can be obtained. By using the two polarization information as a combination, it is possible to realize a robust area division.

Figure 19:
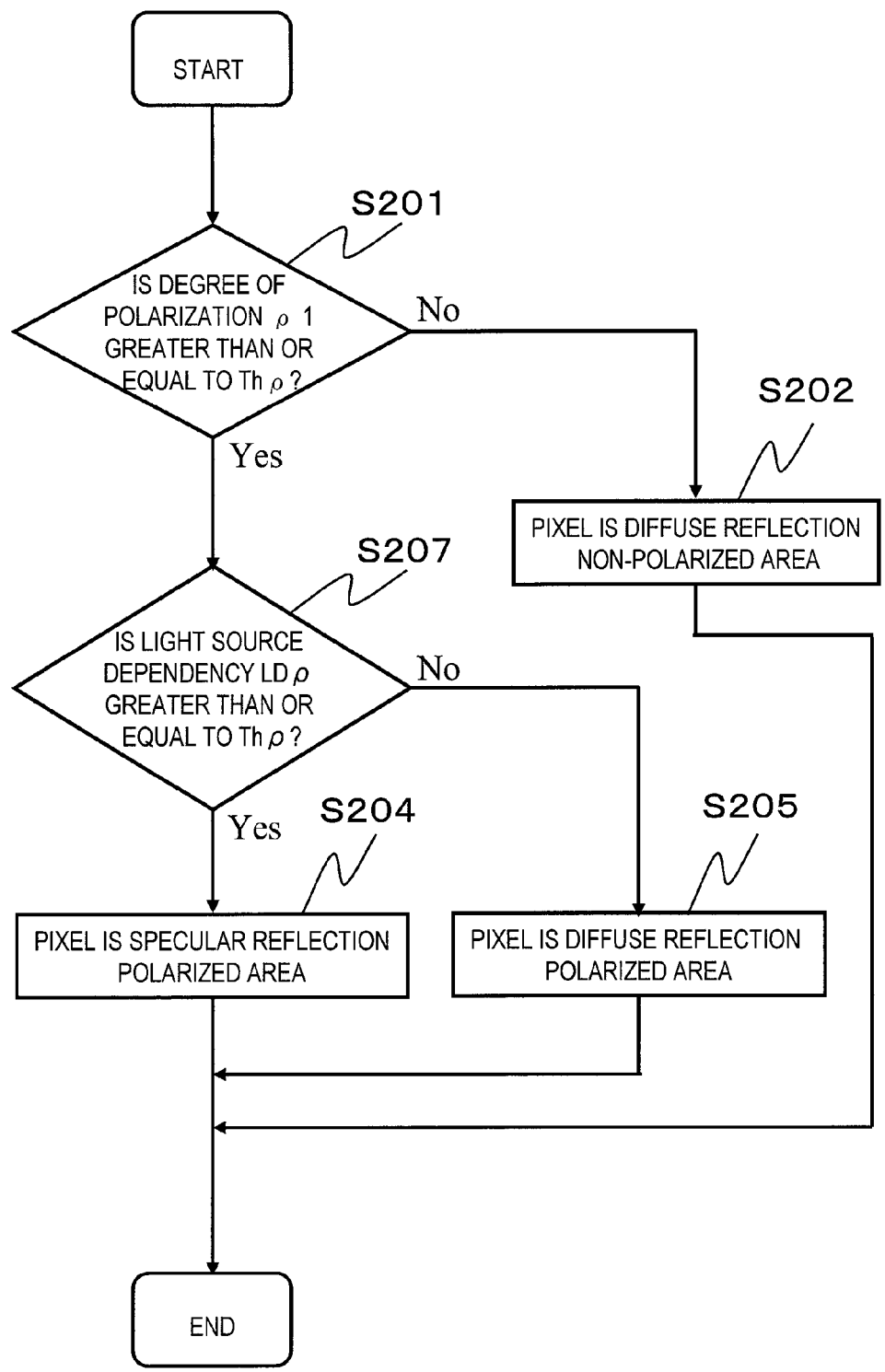
FIG. 19 A flow chart showing the flow of another process performed by the area dividing section according to the first embodiment of the present invention.

FIG. 19 is a flow chart showing the flow of the process performed by the area dividing section 106 in such a case. In FIG. 19, like steps to those of FIG. 17 are denoted by like reference numerals to those of FIG. 17 and will not be described in detail below. In step S207, if the second light source dependency LDρ is greater than or equal to the threshold Thρ (Yes in step S207), it is determined that the pixel is a specular reflection polarized area (step S204), and the process is ended. On the other hand, if the second light source dependency LDρ is smaller than the threshold Thρ (No in step S207), it is determined that the pixel is a diffuse reflection polarized area (step S205), and the process is ended.

The threshold Thρ of the second light source dependency LDρ may be determined experimentally, and may be set to 0.2, for example.

Figure 21:
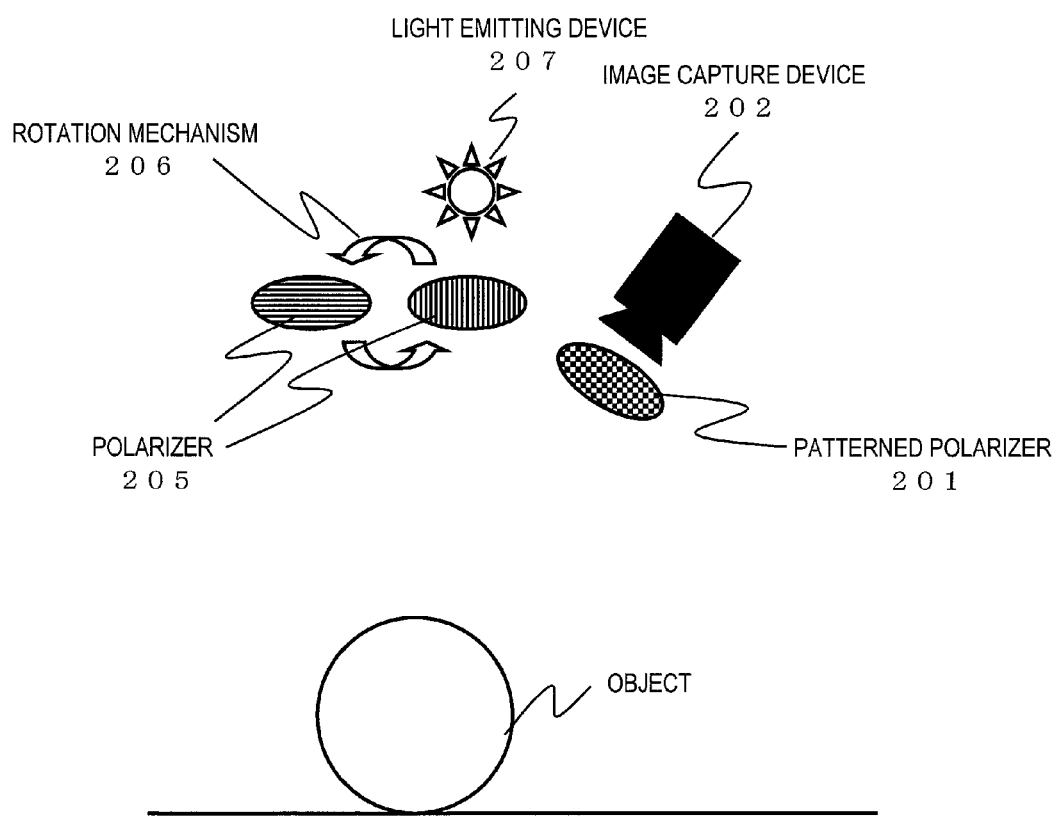
FIG. 21 A system diagram showing the shooting conditions for the area dividing device according to the first embodiment of the present invention.

FIGS. 20, 22 to 26 show results of performing the area division of the present embodiment. FIG. 21 is a diagram showing the shooting conditions for the area division of the present embodiment.

As shown in FIG. 21, the light emitting device 207 is provided near the image capture device 202, and the main axis direction of the polarizer is changed by 90 degrees by the rotation mechanism 206. FIG. 20(a) shows a billiard ball being the object. FIG. 20(b) is the image of the surface of the billiard ball shown in FIG. 20(a), in which the area of white pixels is labeled with reference numeral "B21", and the remaining area with reference numeral "A21". FIG. 20(c) shows FIG. 20(b) in a schematic manner (with shading emphasized). In this figure, the areas A21 and B21 correspond to the areas A21 and B21 of FIG. 20(b), respectively.

FIG. 22 shows polarization information obtained by the polarization information obtaining section 104 when the main axis direction of the polarized light is changed between the horizontal direction and the vertical direction by the illumination control section 102, with the billiard ball shown in FIG. 20(a) being the object. FIG. 22(a) shows the degree of polarization ρ1 obtained from the first polarization image which is captured with the main axis direction of the polarized light being in the horizontal direction, FIG. 22(b) shows the polarization phase φmax1 obtained from the first polarization image, FIG. 22(c) shows the degree of polarization ρ2 obtained from the second polarization image which is captured with the main axis direction of the polarized light being in the vertical direction, FIG. 22(d) shows the polarization phase φmax2 obtained from the second polarization image, and FIG. 22(e) shows the first light source dependency LDφ obtained from the polarization phases φmax1 and φmax2.

Pixels of higher brightnesses in FIGS. 22(a)-(d) indicate larger values of the degree of polarization ρ1, the polarization phase φmax1, the degree of polarization ρ2 and the polarization phase φmax2, respectively. Note that in FIG. 22(e), white represents the value of the first light source dependency LDφ being 1, and black represents the value being 0.

Figure 23:
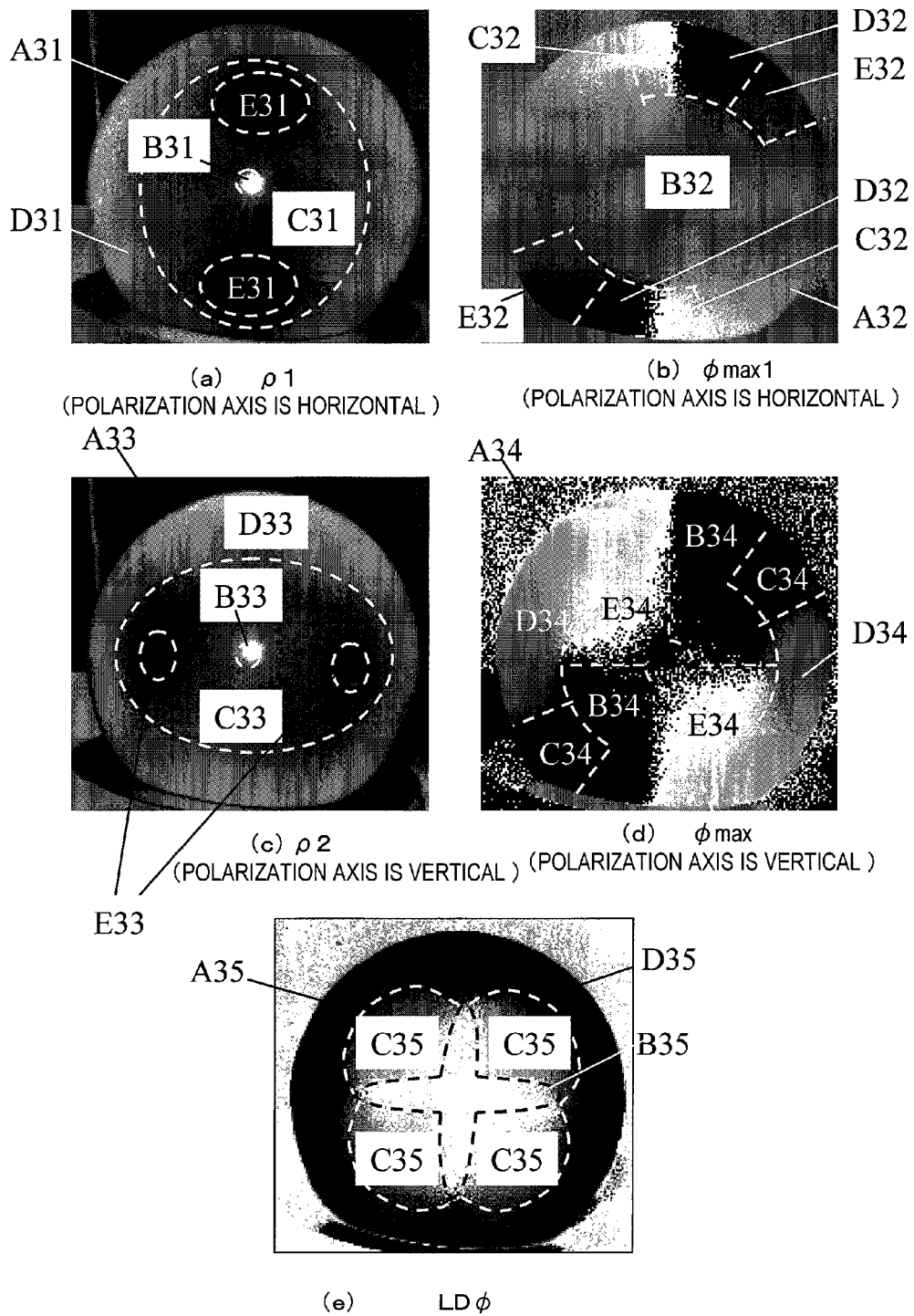
FIG. 23 A diagram showing the image of FIG. 22 divided into a plurality of areas based on the high/low of the brightness.
Figure 24:
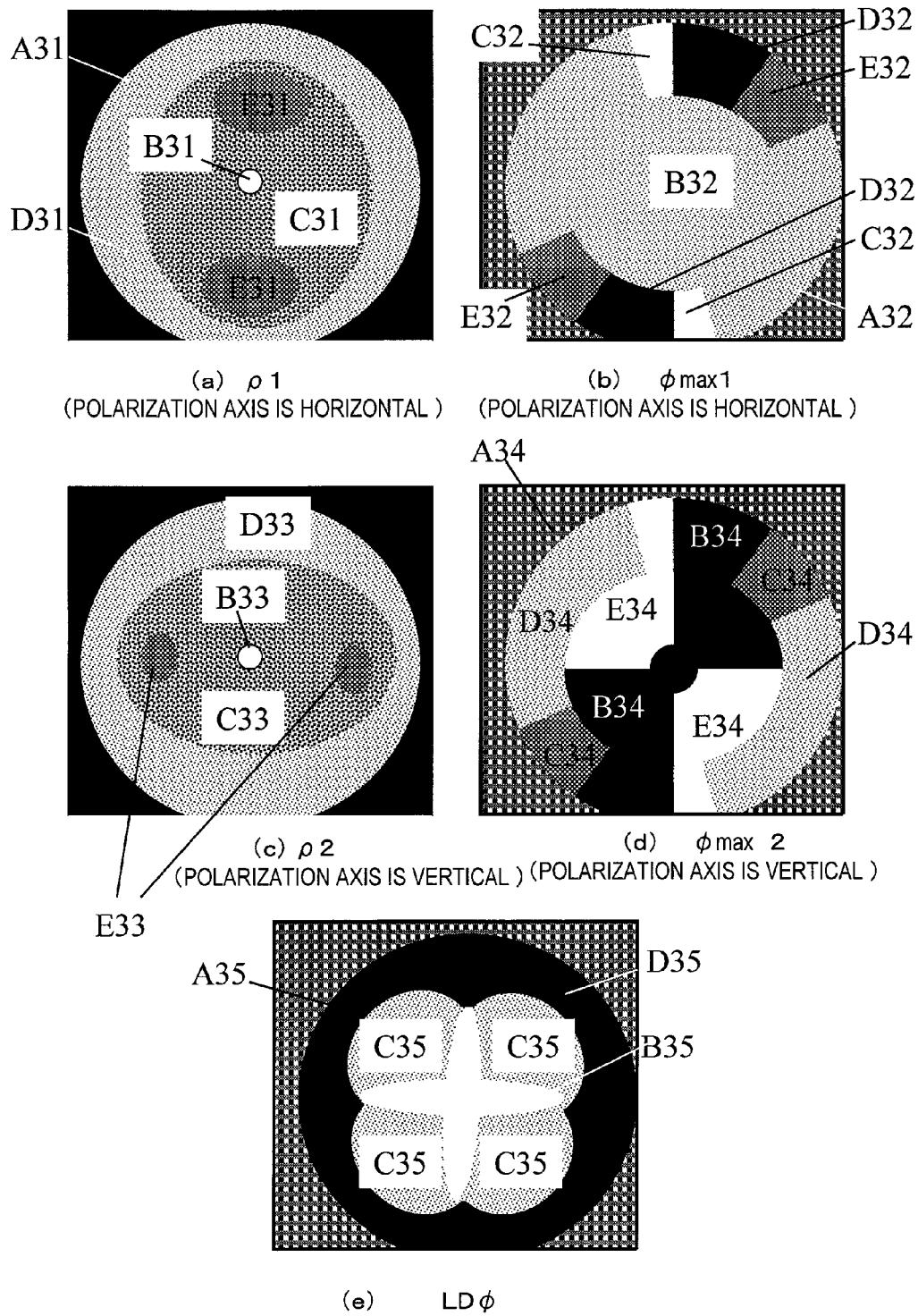
FIG. 24 Schematic diagrams showing intermediate results of a process of the area dividing method according to the first embodiment of the present invention.
Figure 25:
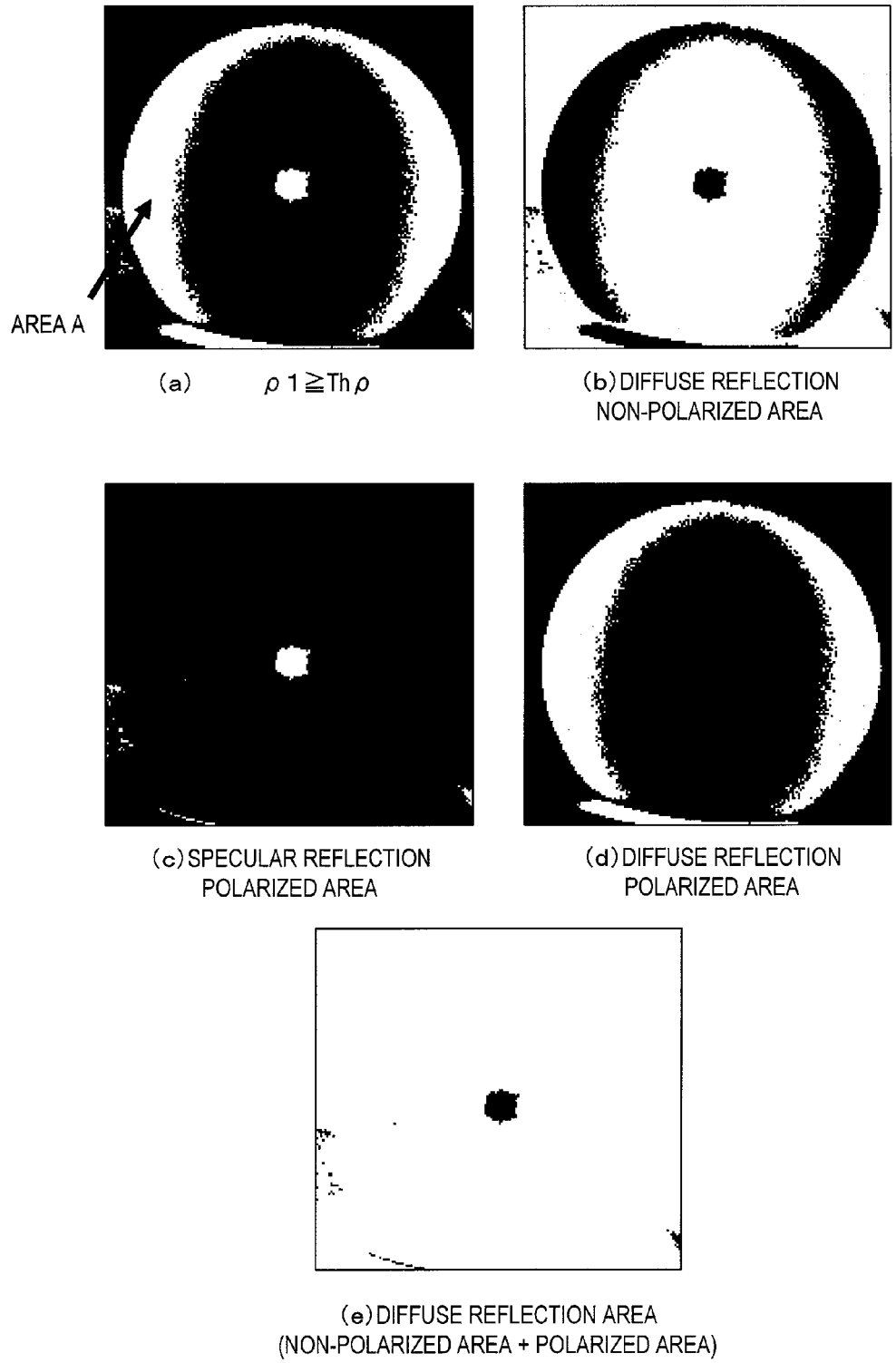
FIG. 25 Views showing results of the process of the area dividing method according to the first embodiment of the present invention.

FIG. 23 shows views obtained by dividing each image of FIG. 22 into a plurality of areas based on the high/low of the brightness. FIG. 24 shows the images of FIG. 22 in a schematic manner (with shading emphasized). In the figure, areas (A31 to D35) correspond to the areas in FIG. 23. FIG. 25 shows results of performing the area division of the present embodiment by using the polarization information of FIG. 22. FIG. 25(a) shows pixels where the degree of polarization ρ1 for the first polarization image is greater than or equal to the threshold Thρ in step S201. FIGS. 25(b), (c) and (d) show the "diffuse reflection non-polarized area", the "specular reflection polarized area" and the "diffuse reflection polarized area", respectively, as divided by the present embodiment. FIG. 25(e) shows the "diffuse reflection area", which is the union of the diffuse reflection non-polarized area and the diffuse reflection polarized area. Each area of white pixels in FIG. 25 represents an area divided from the remaining area (area of black pixels).

With the conventional method of performing an area division based only on the degree of polarization, the white pixel area shown in FIG. 25(a) will be assigned as the "specular reflection area" and the white pixel area shown in FIG. 25(b) as the "diffuse reflection area", resulting in the area A (FIG. 25(a)), which is near the occluding edge, being erroneously included in the specular reflection area, as described above, thereby causing a significant error in the extent of each divided area.

On the other hand, with the area dividing method of the present embodiment, where the light source dependency is used in addition to the polarization information, the white pixel area shown in FIG. 25(c) is divided as the "specular reflection area" and the white pixel area shown in FIG. 25(e) as the "diffuse reflection area". Thus, it is possible to perform an accurate area division as compared with the conventional method.

FIG. 26 shows results using the degree of polarization $\rho 2$ obtained from the second polarization image, instead of making a comparison by using the degree of polarization $\rho 1$ obtained from the first polarization image, in step S201. FIG. 26(a) shows pixels where the degree of polarization $\rho 2$ for the second polarization image is greater than or equal to the threshold Th$\rho$ in step S201. FIGS. 26(b), (c) and (d) show the "diffuse reflection non-polarized area", the "specular reflection polarized area" and the "diffuse reflection polarized area", respectively, as divided by the area division of the present embodiment. FIG. 26(e) shows the "diffuse reflection area", which is the union of the diffuse reflection non-polarized area and the diffuse reflection polarized area. Each area of white pixels in FIG. 26 represents an area divided from the remaining area (area of black pixels).

As with the area dividing method described above with reference to FIG. 25, using the degree of polarization $\rho 2$ for the second polarization image also makes it possible to perform a more accurate area division as compared with the conventional method since the polarization information and the light source dependency are both used.

A comparison between FIGS. 25 and 26 shows that an area B of white pixels is observed in FIG. 26(c), whereas such an area B is not seen in FIG. 25(c). The polarization state of light that is incident on and reflected by the surface of the object is influenced by the relationship between the polarization direction of the straight-line direction of incidence and the angle of incidence or the emittance angle, and the degree of polarization of reflected light of linearly-polarized light incident on the surface of an object may become high depending on the polarization direction. In such a case, a part of the "specular reflection area" may be determined erroneously for such pixels that give reflected light of a high degree of polarization. In order to reliably prevent such an erroneous determination, a comparison may be made by using the weighted sum between the degree of polarization $\rho 1$ obtained from the first polarization image and the degree of polarization $\rho 2$ obtained from the second polarization image in step S201 of FIG. 19.

Figure 27:
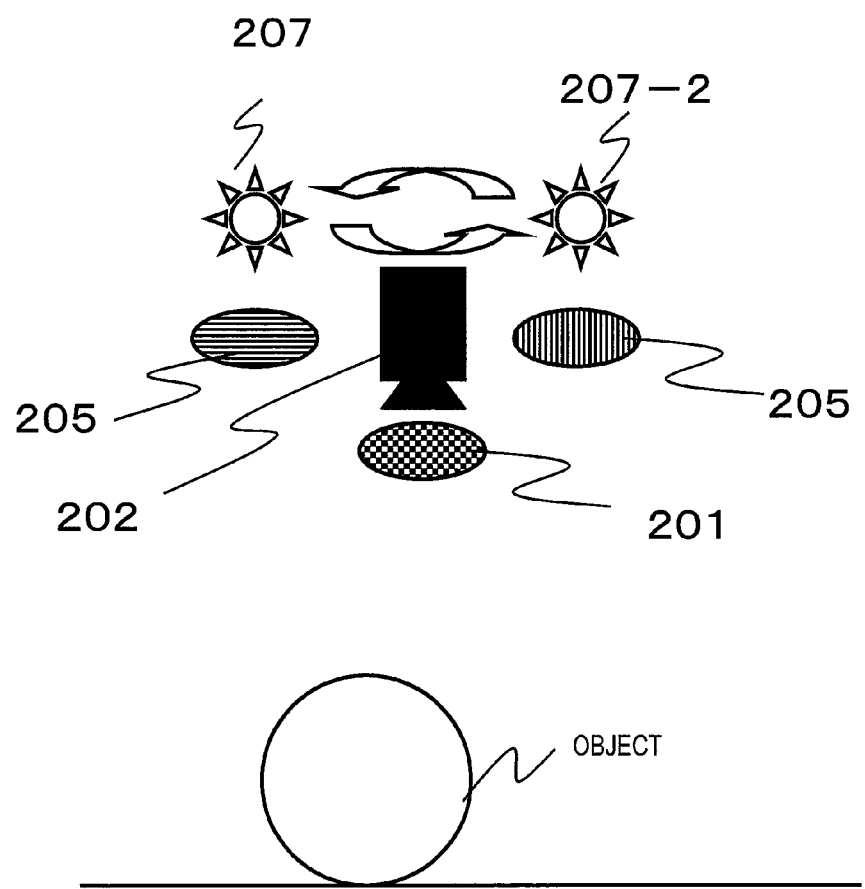
FIG. 27 Another system diagram showing the shooting conditions for the area dividing device according to the first embodiment of the present invention.

As shown in FIG. 27, the light emitting section 101 including a plurality of light emitting devices 207 and 207-2 may be used to emit polarized light of different polarization states from the light emitting devices 207 and 207-2. In such a case, the plurality of light emitting devices 207 and 207-2 are preferably provided near each other. FIG. 27 is a diagram schematically showing the arrangement of the light emitting devices 207 and 207-2, the image capture device 202, the object, etc., when the area division of the present embodiment is performed. In FIG. 27, like elements to those of FIG. 21 are denoted by like reference numerals to those of FIG. 21, and will not be described in detail below.

Figure 28:
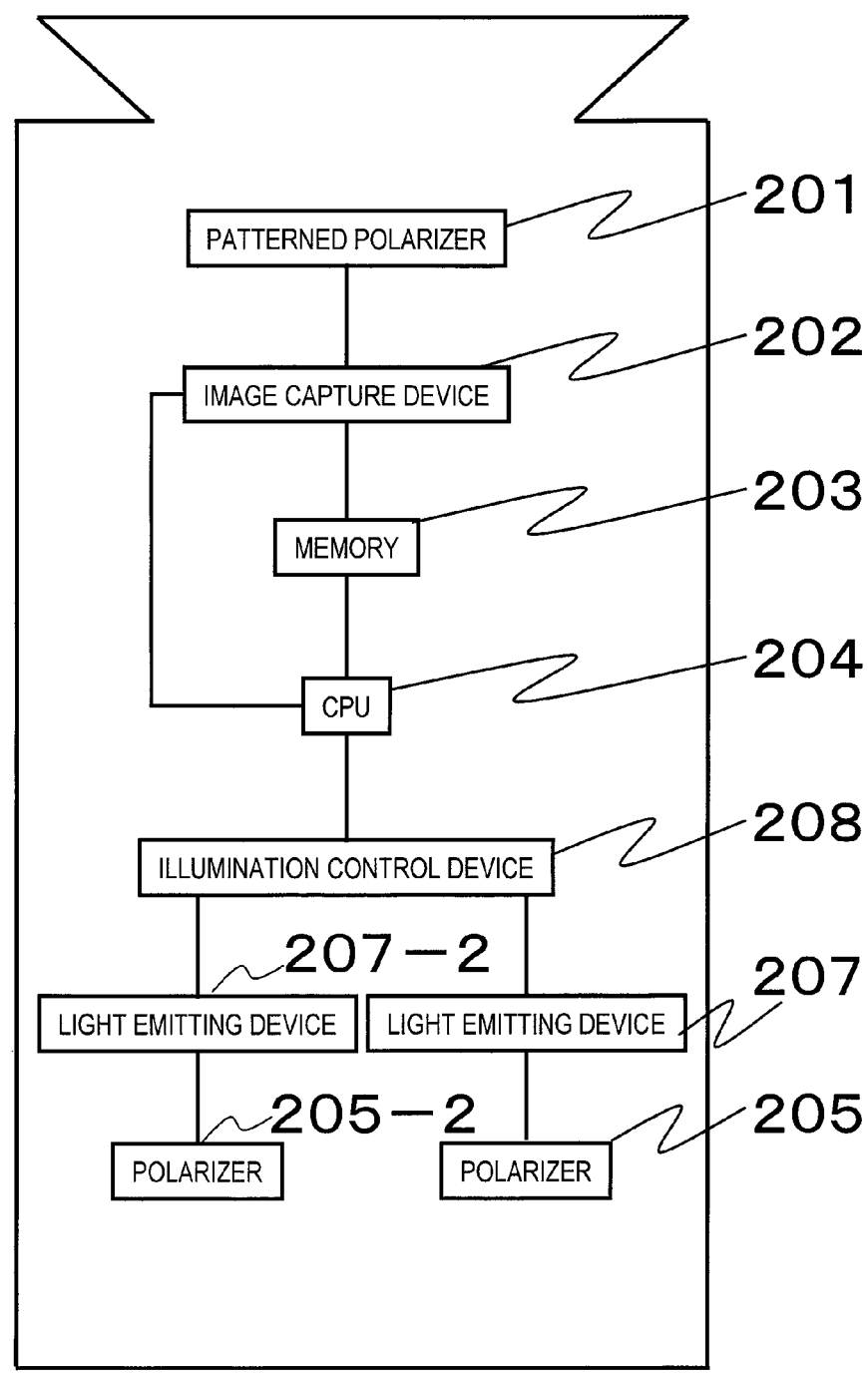
FIG. 28 A diagram showing another exemplary configuration of a camera including therein an area dividing device according to the first embodiment of the present invention.

FIG. 28 shows an exemplary configuration of a camera including therein the image processing apparatus of the present embodiment. In FIG. 28, like elements to those of FIG. 3 are denoted by like reference numerals to those of FIG. 3, and will not be described in detail below.

The illumination control section 102 shown in FIG. 28 changes the main axis direction of the polarized light by switching between the light emitting device 207 and the light emitting device 207-2, as a device serving as the light source. Specifically, the polarization main axis direction of the polarizer 205 for the light emitting device 207 and the polarization main axis direction of a polarizer 205-2 for the light emitting device 207-2 are perpendicular to each other. Therefore, as opposed to the apparatus shown in FIG. 3, there is no need for the rotation mechanism 206, thus allowing for a reduction in the size of the camera.

Note that while the patterned polarizer 201 is a photonic crystal in the present embodiment, it may be a polarizer element of a film type or a wire-grid type, or be a polarizer element of any other suitable principle as long as it is a polarizer element. Alternatively, images may be captured while rotating a polarizing plate attached in front of the lens of the image capture device, without using a patterned polarizer, to thereby obtain luminance values for different polarization main axes over time. This method is disclosed in Japanese Laid-Open Patent Publication No. 11-211433, for example.

Note that the light emitting device 207 is preferably provided near the image capture device 202. This is because by employing such an arrangement, the shaded area occurring on the object by being illuminated by the light emitting device 207 becomes smaller. Since shading is not taken into consideration by the area dividing method of the present embodiment, an area division becomes difficult when there is a shading. In a shaded area, light beams are complicated due to influence from multiple reflection, etc., thus losing the reliability of the polarization information. Therefore, in a shaded area, the area division precision deteriorates. For improving the precision of the area division, it is important to ensure that shading is unlikely to occur.

The area dividing section 106 may divide an image into four areas of the "light source-dependent polarized area", the "light source-dependent non-polarized area", the "light source-independent polarized area" and the "light source-independent non-polarized area", instead of dividing an image into the "specular reflection area" and the "diffuse reflection area". This process will now be described in detail.

Figure 30:
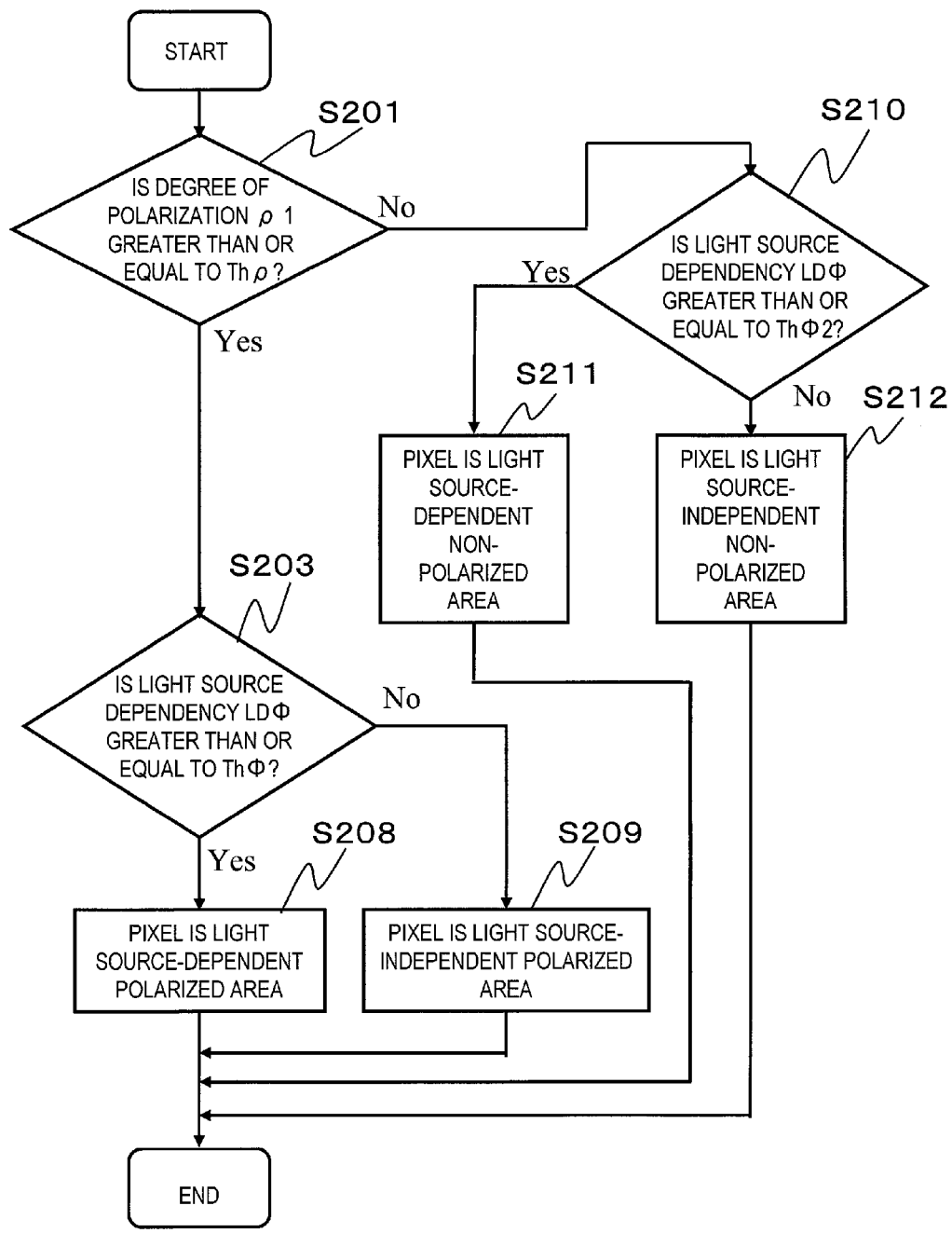
FIG. 30 A flow chart showing the flow of another process performed by the area dividing section according to the first embodiment of the present invention.

FIG. 29 shows an image division criterion for the area dividing section 106 of the present embodiment. FIG. 30 is a flow chart showing the flow of a process performed by the area dividing section 106 of the present embodiment. In FIG. 30, like steps to those of FIG. 17 are denoted by like reference numerals to those of FIG. 17 and will not be described in detail below.

First, in order to perform an area division of dividing an image into a non-polarized area and a polarized area by determining whether each pixel belongs to the non-polarized area or the polarized area, the area dividing section 106 compares the magnitude of the degree of polarization $\rho 1$ of the pixel with the threshold Th$\rho$ to determine whether the degree of polarization ρ is greater than or equal to the threshold Thρ or smaller than the threshold Thρ (step S201). If the degree of polarization ρ1 of the pixel is greater than or equal to the threshold Thρ (Yes in step S201), it is determined that the pixel is included in the polarized area, and it is determined whether the first light source dependency LDφ estimated by the light source dependency estimation section 105 is greater than or equal to the threshold Thφ (step S203). If the first light source dependency LDφ is greater than or equal to the threshold Thφ (Yes in step S203), it is determined that the pixel is included in the light source-dependent polarized area (step S208), and the process is ended.

On the other hand, if the first light source dependency LDφ is smaller than the threshold Thφ (No in step S203), it is determined that the pixel is included in the light source-independent polarized area (step S209), and the process is ended.

Note that the degree of polarization ρ1 of the pixel is smaller than the threshold Thρ (No in step S201), it is determined that the pixel is included in the non-polarized area, and a comparison is made as to whether the first light source dependency LDφ estimated by the light source dependency estimation section 105 is greater than or equal to the threshold Thφ2 (step S210). If the first light source dependency LDφ is greater than or equal to the threshold Thφ2 (Yes in step S210), it is determined that the pixel is included in the light source-dependent non-polarized area (step S211), and the process is ended. On the other hand, if the first light source dependency LDφ is smaller than the threshold Thφ2 (No in step S210), it is determined that the pixel is included in the light source-independent non-polarized area (step S212), and the process is ended.

The threshold Thφ2 of the light source dependency in step S210 may be set to be equal to the threshold Thφ in step S203. The threshold Thρ of the degree of polarization and the threshold Thφ of the first light source dependency LDφ may be set as described above. Moreover, step S203 and step S210 may use different thresholds, instead of using the same threshold Thφ. In such a case, since it is believed that the brightness resolution in the non-polarized area is smaller than that in the polarized area, the value Thφ2 is preferably set to be smaller than Thφ.

Note that in order to solve the problem of a shaded area, "shaded area" may be added to areas into which the division is performed by the area dividing section 106, as will be described later.

As described above, by using the area dividing method of the present invention, it is possible to perform an area division using the polarization information and the light source dependency. Such an area division is capable of a division between the specular reflection area and the diffuse reflection area taking into consideration the polarized component of the diffuse reflection component.

Second Embodiment

Next, the outline of an image processing apparatus according to a second embodiment of the present invention will be described. The image processing apparatus of the present embodiment calculates the light source dependency by changing the position of the illumination section (light source position). An area division of the object is performed by utilizing the light source dependency resulting from the changes of the polarization information and the light source position.

Figure 31:
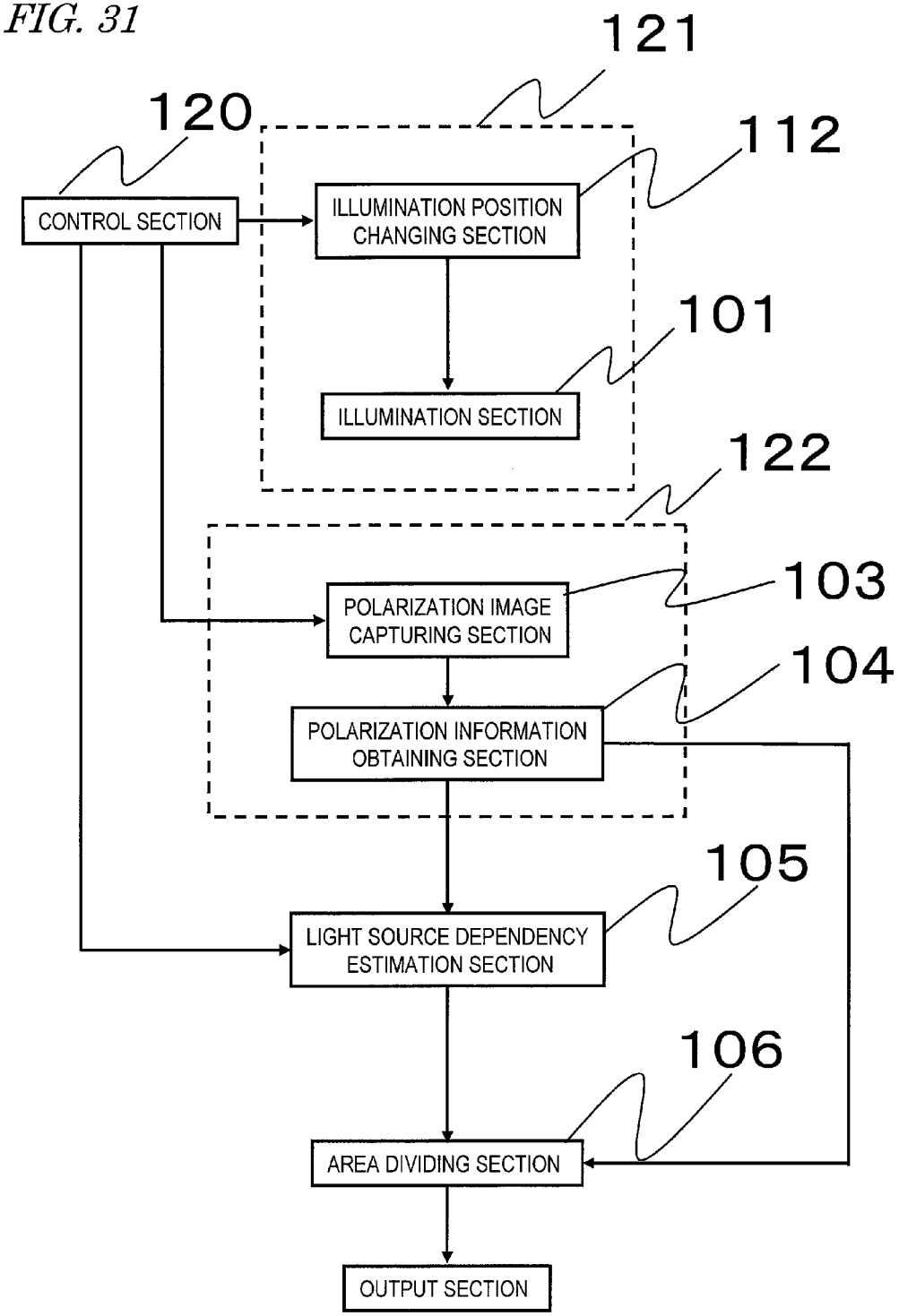
FIG. 31 A block diagram of an area dividing device according to a second embodiment of the present invention.

FIG. 31 is a block diagram of an image processing apparatus of the present embodiment. In FIG. 31, like elements to those of FIG. 1 are denoted by like reference numerals to those of FIG. 1, and will not be described in detail below. A difference from the first embodiment is that an illumination position changing section 112 is provided, instead of the illumination control section 102. With the image processing apparatus of the present embodiment, the position of the light emitting device 207 is changed by the illumination position changing section 112, instead of changing the main axis direction of the polarized light by the illumination control section 102.

The polarization phase resulting when the non-polarized light is emitted onto the object is dependent on the normal information of the object. However, the relationship changes depending on the specular reflection component and the diffuse reflection component.

First, consider the specular reflection component. The surface normal of the object has two degrees of freedom. It is herein determined by obtaining two angles: one being the incident plane that contains the incident light beam and the normal vector of the point of incidence (observation point), and the other being the angle of incidence within the incident plane. It is known that the incident plane of the specular reflection component is equal to the angle at which the brightness is at minimum in FIG. 6 obtained from the polarization image (for example, Ondřej Drbohlav and Sara Radim, "Using polarization to determine intrinsic surface properties", Proc. SPIE Vol. 3826, pp. 253-263, 1999).

Next, consider the diffuse reflection component. As described above, the surface normal of the object has two degrees of freedom. It is herein determined by obtaining two angles: one being the emittance plane that contains the light beam of exit light that is exiting from the object surface after repeated scattering and the normal vector of the emittance point (observation point), and the other being the emittance angle within the emittance plane. It is known that the emittance plane of the diffuse reflection component is equal to the angle at which the brightness is at maximum in FIG. 6 obtained from the polarization image (for example, U.S. Pat. No. 5,028,138). That is, while the polarization phase information is dependent on the angle of incidence in the specular reflection component, it is not dependent on the angle of incidence in the diffuse reflection component. If the light source position is changed while fixing the camera position, only the angle of incidence changes. Therefore, while the polarization characteristics vary in the specular reflection component, the polarization characteristics do not vary in the diffuse reflection component.

This is also related to the fact that since the specular reflection component occurs only in a partial area of the object that is near regular reflection, an area that has been a specular reflection area may become a diffuse reflection area as a result of changing the light source position. In any case, if the light source position is changed while fixing the camera position, the polarization characteristics vary in many specular reflection components, but the polarization characteristics do not vary in most of the diffuse reflection components. With the area dividing method of the present embodiment, an area division is performed utilizing this characteristic.

Figure 32:
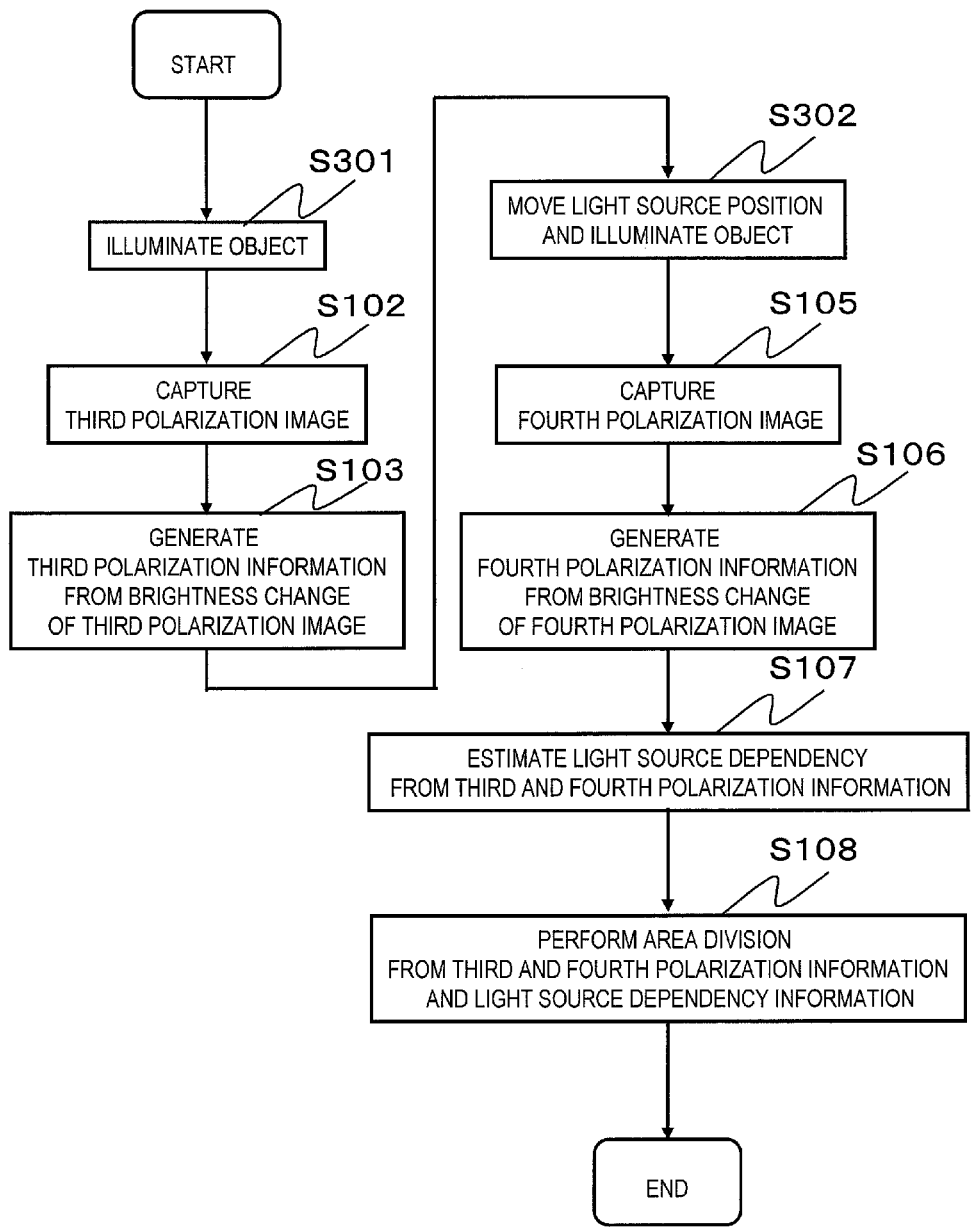
FIG. 32 A flow chart showing the flow of the process of an area dividing method according to the second embodiment of the present invention.
Figure 33:
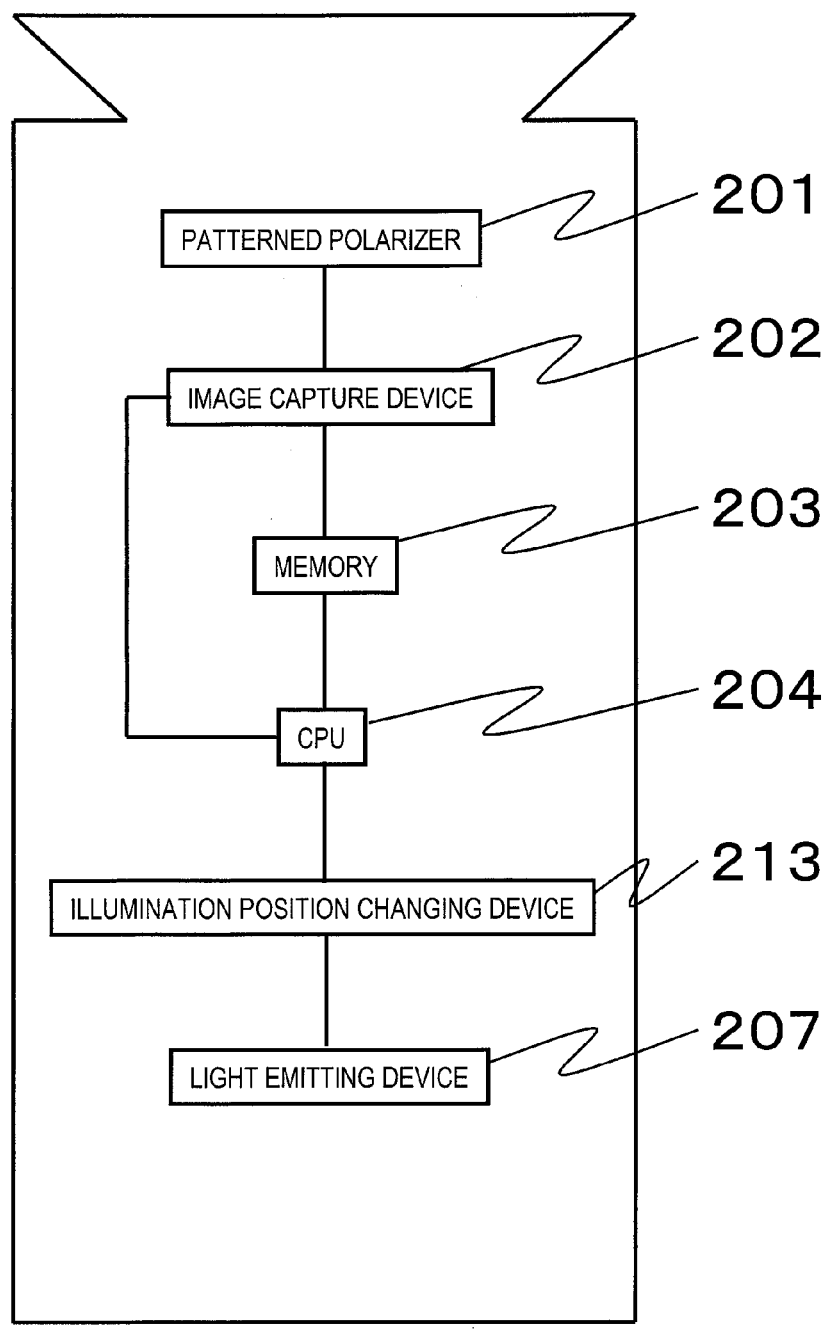
FIG. 33 A diagram showing an exemplary configuration of a camera including therein an area dividing device according to the second embodiment of the present invention.

FIG. 32 is a flow chart showing the flow of a process of the area dividing method of the present embodiment. In FIG. 32, like steps and corresponding steps to those of FIG. 2 are denoted by like reference numerals to those of FIG. 2 and will not be described in detail below. Moreover, FIG. 33 shows an exemplary configuration of a camera including therein the area dividing device of the present embodiment. In FIG. 33, like elements and corresponding elements to those of FIG. 3 are denoted by like reference numerals to those of FIG. 3 and will not be described in detail below.

Figure 34:
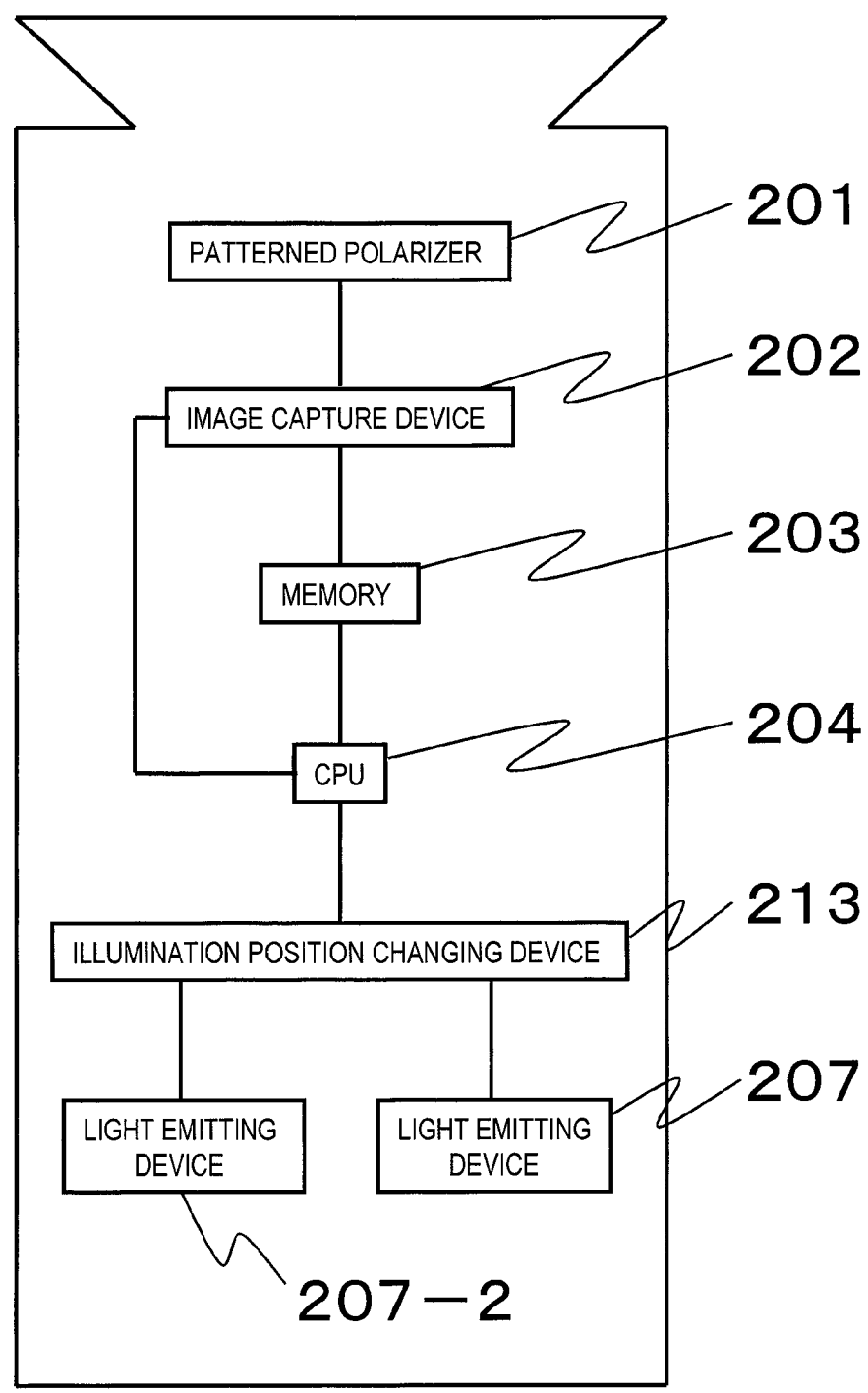
FIG. 34 A diagram showing an exemplary configuration of a camera including therein an area dividing device according to the second embodiment of the present invention.

The illumination position changing section 112 (FIG. 31) of the present embodiment is implemented by an illumination position changing device 213 shown in FIG. 33, for example. The illumination position changing device 213 changes the position of the light emitting device 207, and is implemented by using a motor, or the like. The light emitting device 207 may be attached to a moving portion of a robot, such as the arm. The image processing apparatus may include a plurality of light emitting devices 207 and 207-2. FIG. 34 shows an exemplary configuration of a camera including therein an area dividing device of the present embodiment having a plurality of light emitting devices 207 and 207-2. In such a case, the illumination position changing device 213 can vary the position of the light emitting device (light source position) by switching between the light emitting devices 207 and 207-2.

In FIG. 32, the illumination section 101 emits non-polarized light from the light emitting device 207 that is at the light source position specified by the control section 120 (step S301). The polarization image capturing section 103 receives light, by means of an image sensor, from the object through the patterned polarizer 201, thus obtaining a third polarization image, which is an image including polarization information (step S102). This is achieved by the control section 120 synchronizing the illumination unit 121 and the polarization information obtaining section 122 with each other. Then, the patterned polarizer has three or more polarization main axis angles, as described above. The polarization information obtaining section 104 generates polarization information, which is information regarding the received polarized light, as described above (step S103). The illumination position changing section 112 moves the illumination section 101 so that the light emitting device 207 that is at a different position from that of step S101 emits light, and the illumination section 101 emits non-polarized light onto the object from a position different from that of step S301 (step S302).

The polarization image capturing section 103 again receives light, by means of an image sensor, from the object through the patterned polarizer 201, thus obtaining a fourth polarization image (step S105). This is achieved by the control section 120 synchronizing the illumination unit 121 and the polarization information obtaining section 122 with each other. The third polarization image and the fourth polarization image are polarization images between which the light source (the light emitting device 207) position of the illumination section 101 is changed. The polarization information obtaining section 104 again generates polarization information, which is information regarding the received polarized light, by using the correspondence with the brightness of the light having passed through the three-way or more polarizer, for each of unit pixels of the captured fourth polarization image (step S106). The light source dependency estimation section 105 estimates the light source dependency by making a comparison between the polarization information obtained by the polarization information obtaining section from the third polarization image and the fourth polarization image (step S107). The area dividing section 106 performs an area division by using the polarization information generated by the polarization information obtaining section 104 and the light source dependency information estimated by the light source dependency estimation section 105 (step S108).

This process will now be described in detail with reference to the drawings.

Figure 35:
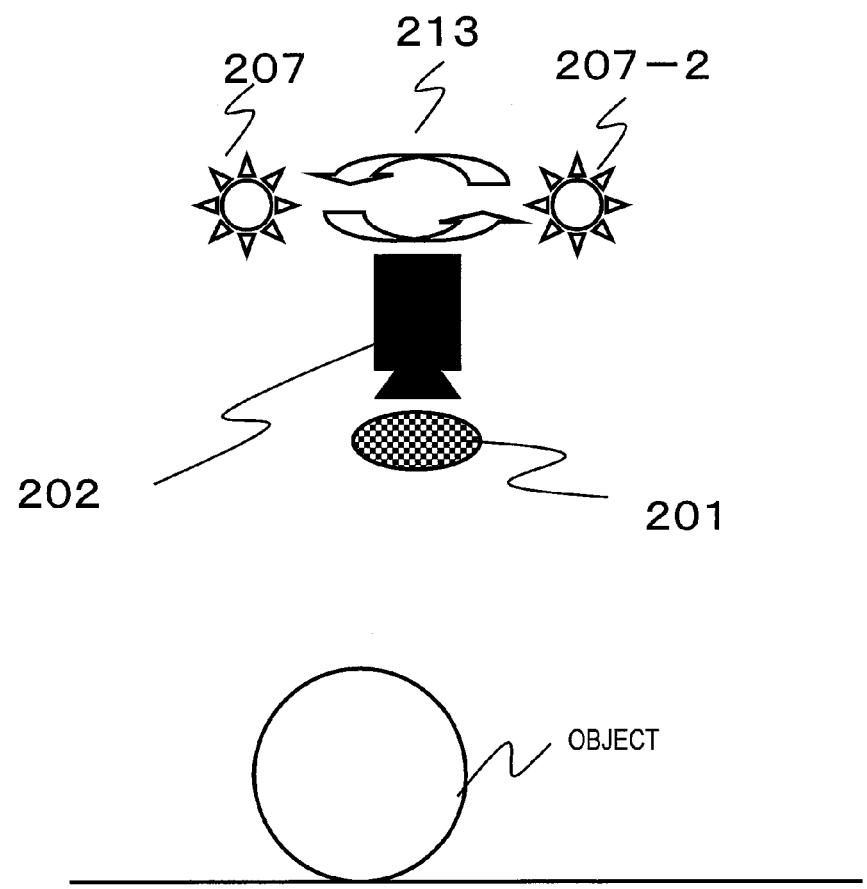
FIG. 35 A system diagram showing the shooting conditions for the area dividing device according to the second embodiment of the present invention.

In step S301, the illumination section 101 emits non-polarized light from the light emitting device 207 that is at the light source position specified by the control section 120. This may be done by forming the illumination section 101 from a plurality of light emitting devices 207, and by switching between the light emitting devices 207 and 207-2 from which light is emitted by means of the illumination position changing section 112, thereby changing the light source position. FIG. 35 is a system diagram showing the shooting conditions for the area division of the present embodiment. In FIG. 35, like elements to those of FIG. 21 are denoted by like reference numerals to those of FIG. 21, and will not be described in detail below.

The illumination position changing section 112 may vary the light source position by moving the light emitting device 207 by means of the illumination position changing device 213. The illumination position changing device 213 may be implemented by a motor, or the like. The light emitting device 207 may be provided at a moving portion of a robot. FIG. 36 is a system diagram showing the shooting, conditions for the area division of the present embodiment. In FIG. 36, like elements to those of FIG. 35 are denoted by like reference numerals to those of FIG. 35, and will not be described in detail below.

In step S102, the polarization image capturing section 103 receives light, by means of an image sensor, from the object through the patterned polarizer 201, as described above, thus obtaining a third polarization image, which is an image including polarization information. This is achieved by the control section 120 synchronizing the illumination unit 121 and the polarization information obtaining section 122 with each other.

In step S103, the polarization information obtaining section 104 generates polarization information, which is information regarding the received polarized light, by using the correspondence with the brightness of the light having passed through the three-way or more polarizer, for each of unit pixels of the captured third polarization image, as described above.

In step S302, the illumination position changing section 112 controls the illumination section 101 so that light is emitted from the light emitting device 207-2 that is at a position different from that of step S301, so that the illumination section 101 emits light onto the object from a position different from that of step S301. This can be achieved, as described above, by forming the illumination section 101 from a plurality of light emitting devices 207 and 207-2, or by moving the light emitting device 207, so as to vary the light source position.

In step S105, the polarization image capturing section 103 receives light, by means of an image sensor, from the object through the patterned polarizer 201, as described above, thus again capturing a fourth polarization image, which is an image including polarization information. This is achieved by the control section 120 synchronizing the illumination unit 121 and the polarization information obtaining section 122 with each other. As compared with the third polarization image, the fourth polarization image is an image of the same object, but only with a different polarization state of the emitted light.

In step S106, as described above, the polarization information obtaining section 104 generates polarization information, which is information regarding the received polarized light, by using the correspondence with the brightness of the light having passed through the three-way or more polarizer, for each of unit pixels of the captured fourth polarization image, as described above.

In step S107, as described above, the light source dependency estimation section 105 estimates the light source dependency by making a comparison between the polarization information obtained by the polarization information obtaining section from the third polarization image and the fourth polarization image. Herein, the light source dependency is estimated by making a comparison between the polarization phase information, as polarization information.

In step S108, the area dividing section 106 performs an area division by using the polarization information generated by the polarization information obtaining section 104 and the light source dependency information estimated by the light source dependency estimation section 105, as described above. The image division criterion of the area dividing section 106 is similar to FIG. 16, and the flow chart showing the flow of the process performed by the area dividing section 106 is also similar to FIG. 17.

Figure 38:
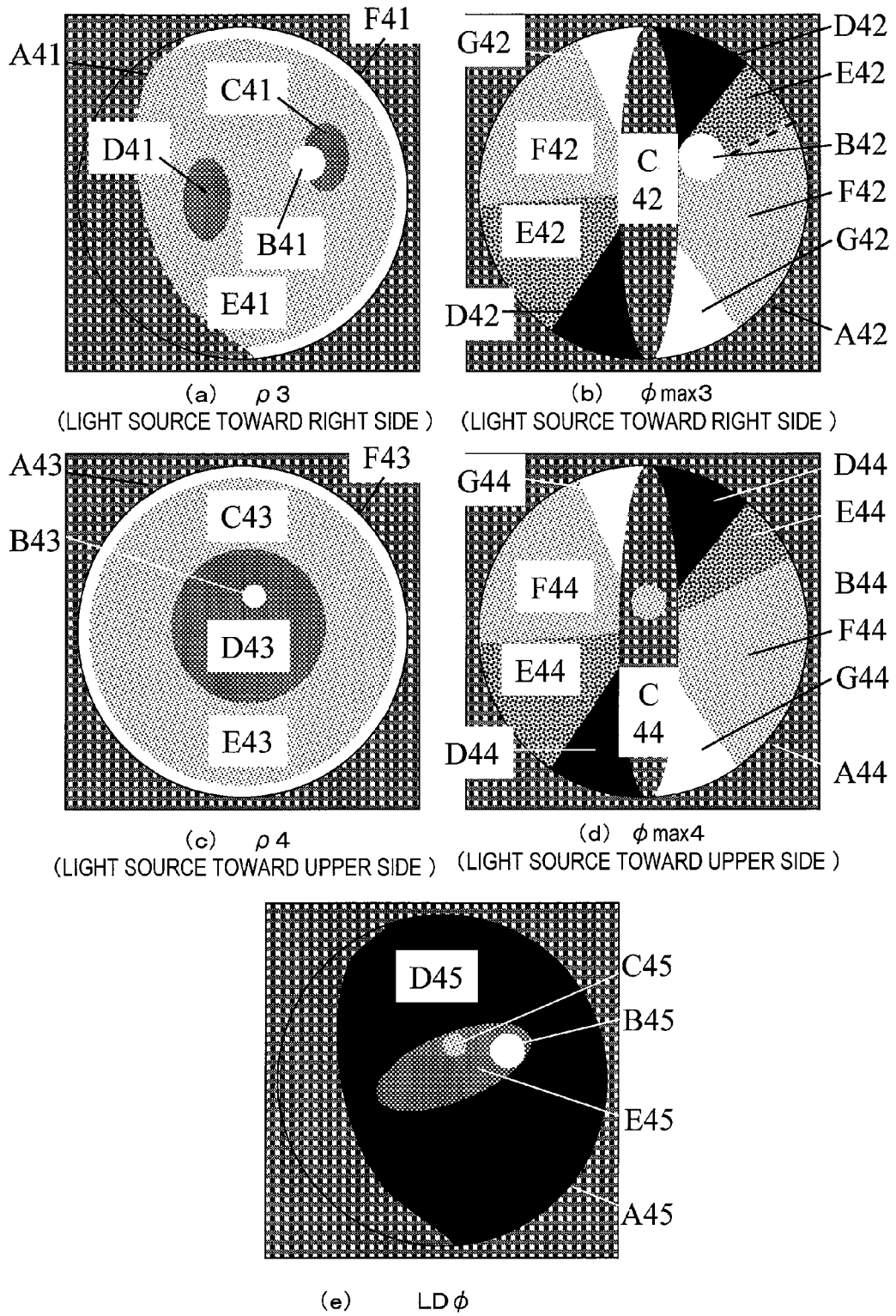
FIG. 38 Schematic diagrams showing intermediate results of a process of the area dividing method according to the second embodiment of the present invention.
Figure 39:
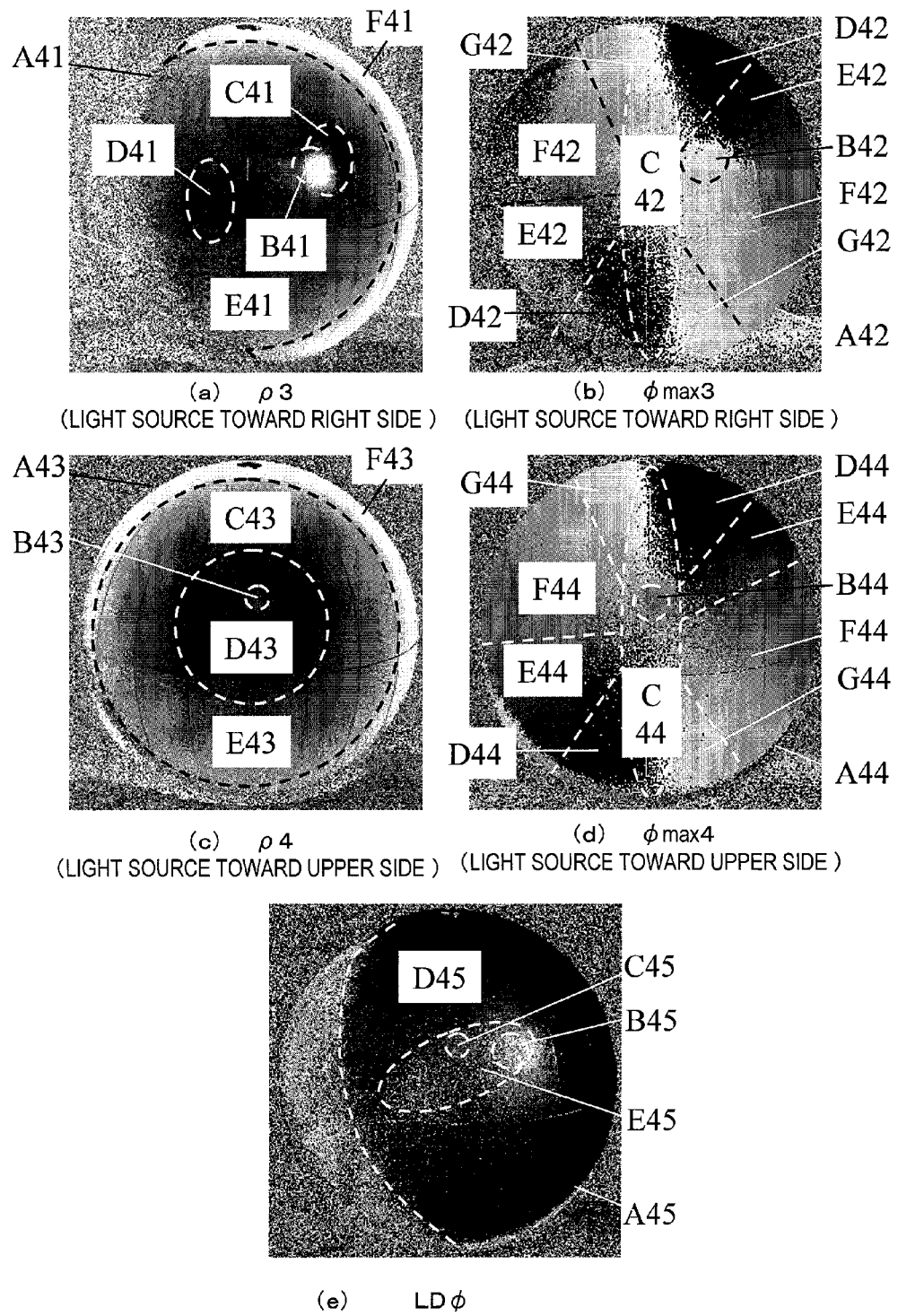
FIG. 39 A diagram showing the image of FIG. 37 divided into a plurality of areas based on the high/low of the brightness.

FIGS. 37 to 42 show results of performing the area division of the present embodiment. FIG. 37 shows the polarization information obtained by the polarization information obtaining section 104 when the position of the light emitting device 207 is changed by the illumination position changing section 112 where the object is a globe. In this figure, FIG. 37(a) shows the degree of polarization ρ3 obtained from the third polarization image captured with the light emitting device 207 arranged toward the right side of the image, FIG. 37(b) shows the polarization phase φmax3 obtained from the third polarization image, FIG. 37(c) shows the degree of polarization ρ4 obtained from the fourth polarization image captured with the light emitting device 207-2 arranged toward the upper side of the camera, FIG. 37(d) shows the polarization phase φmax4 obtained from the fourth polarization image, and FIG. 37(e) shows the first light source dependency LDφ obtained from the polarization phases φmax3 and φmax4. Note that in FIG. 37(e), white represents the value of the first light source dependency LDφ being 1, and black represents the value being 0. FIG. 38 shows the images of FIG. 37 in a schematic manner (with shading emphasized). In the figure, areas (A41 to E45) correspond to the areas in FIG. 39. FIG. 39 shows views obtained by dividing each image of FIG. 7 into a plurality of areas based on the high/low of the brightness.

Figure 40:
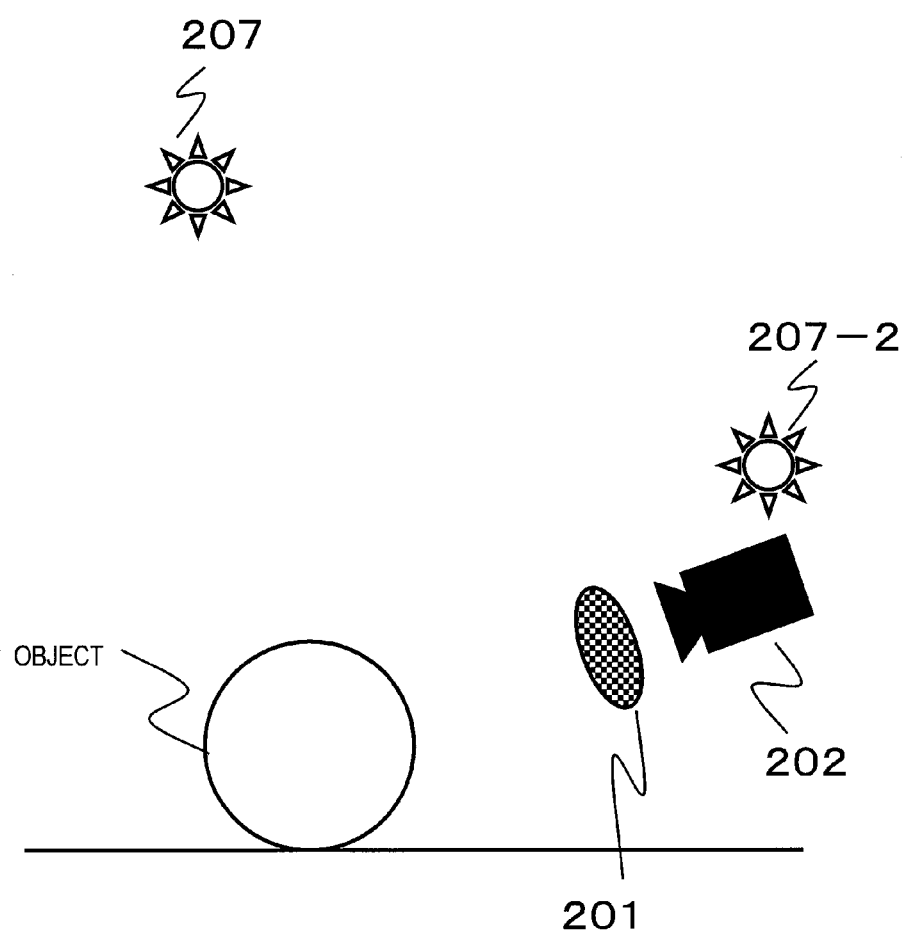
FIG. 40 A schematic diagram showing the positional relationship between light emitting devices and an image capture device in the area dividing device according to the second embodiment of the present invention.

FIG. 40 is a schematic diagram showing the positional relationship between the light emitting devices 207 and 207-2 and the image capture device 202 in this process. FIG. 41 shows results of performing the area division of the present embodiment by using the polarization information of FIG. 37. In this figure, FIG. 41(a) shows pixels of the third polarization image where the degree of polarization ρ3 is greater than or equal to the threshold Thρ in step S201. FIGS. 41(b), (c) and (d) show the diffuse reflection non-polarized area, the specular reflection polarized area and the diffuse reflection polarized area, respectively, divided by the area division of the present embodiment. FIG. 41(e) shows the diffuse reflection area, which is obtained as the union of the diffuse reflection non-polarized area and the diffuse reflection polarized area. In FIG. 41, white pixels represent divided areas. With the conventional method of only using the degree of polarization, FIG. 41(a) will be divided as a specular reflection area and FIG. 41(b) as a diffuse reflection area, thereby causing a significant error near the occluding edge, as described above. On the other hand, with the area dividing method of the present embodiment, the light source dependency is used, in addition to the polarization information, and therefore FIG. 41(c) is divided as a specular reflection area and FIG. 41(e) as a diffuse reflection area. Thus, it is possible to perform an accurate area division as compared with the conventional method.

FIG. 42 shows results where the degree of polarization ρ4 obtained from the fourth polarization image is used, instead of making a comparison using the degree of polarization ρ3 obtained from the third polarization image, in step S201. In this figure, FIG. 42(a) shows pixels of the fourth polarization image where the degree of polarization ρ4 is greater than or equal to the threshold Thρ in step S201. FIGS. 42(b), (c) and (d) show the diffuse reflection non-polarized area, the specular reflection polarized area and the diffuse reflection polarized area, respectively, divided by the area division of the present embodiment. FIG. 42(e) shows the diffuse reflection area, which is obtained as the union of the diffuse reflection non-polarized area and the diffuse reflection polarized area. In FIG. 42, white pixels represent divided areas. As with FIG. 41, no matter which input image is used, the area dividing method of the present embodiment, which uses the light source dependency in addition to the polarization information, is capable of performing an accurate area division as compared with the conventional method. However, data are disturbed in the background area In FIGS. 41 and 42. As described above, this is because the brightness resolution was low in the background area since it was very dark therein. Therefore, the reliability of the polarization information is decreased, and the data is disturbed. By increasing the brightness of the background area by elongating the exposure time, it is possible to obtain polarization information of a sufficient precision even in the background area. The background area may be masked so that it is excluded from the area dividing process. The area division has also failed for the shaded area. As described above, this is because the area dividing method of the present embodiment does not take shading into consideration.

Figure 44:
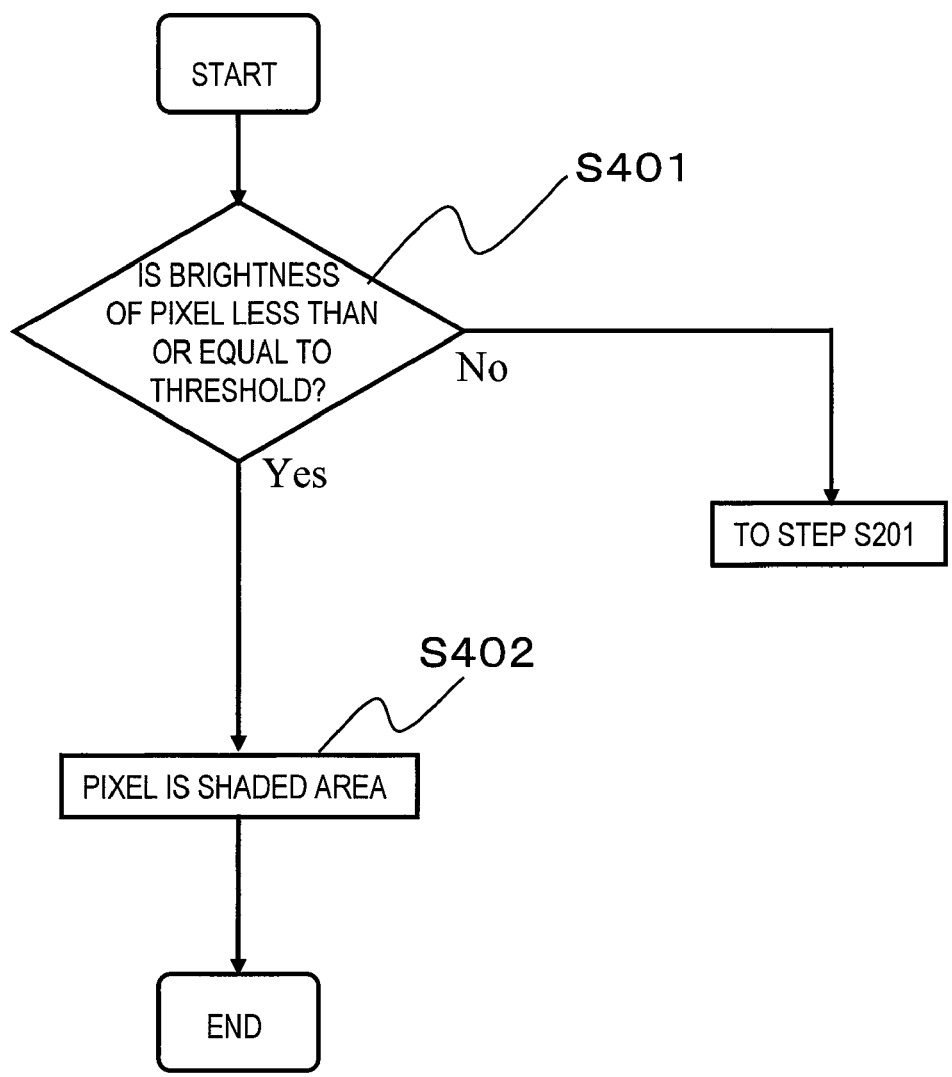
FIG. 44 A flow chart showing the flow of a process performed by the area dividing section, which performs an area division including shaded areas, according to the second embodiment of the present invention.

The area dividing section 106 may perform an area division taking shaded areas into consideration. In such a case, it is preferred that the brightness information of the image is used, in addition to the polarization information and the light source dependency information. FIG. 43 shows an image division criterion for the area dividing section 106 in this process. FIG. 44 is a flow chart showing the flow of the process performed by the area dividing section 106 of the present embodiment which performs an area division including shaded areas. In FIG. 44, like steps to those of FIG. 17 are denoted by like reference numerals to those of FIG. 17 and will not be described in detail below. This process will now be described in detail.

First, in order to estimate whether the pixel is a shaded area, the area dividing section 106 compares the set threshold and the luminance value with each other so as to determine whether the luminance value is less than or equal to the threshold (step S401). As described above, this utilizes the fact that the luminance value is low in a shaded area, and estimates, as a shaded area, a pixel whose luminance value is less than or equal to the threshold. Such a threshold for estimating the shaded area may be determined experimentally, and may be set to 256, for example, for a 16-bit monochrome image. The luminance value for detecting the shaded area may be the polarization maximum luminance value Imax or the polarization minimum luminance value Imin obtained by the polarization information obtaining section 104, or the average value or the weighted average value (e.g., Imax+2·Imin) between the polarization maximum luminance value Imax and the polarization minimum luminance value Imin. Particularly, it is very effective to use the polarization minimum luminance value Imin, because the influence of the specular reflection component, where the possibility of over-exposure is high and the luminance values will be very high, can be made small. Imax+Imin, which is the average value, is an image equivalent to an image captured under a non-polarized light source where no polarizer is provided. Therefore, by performing an image process by using the average value, it is possible to perform a process similar to normal, processes where polarized light is not used.

If the luminance value of the pixel is less than or equal to the threshold (Yes in step S401), it is determined that the pixel is a shaded area (step S402), and the process is ended. On the other hand, if the luminance value of the pixel is greater than or equal to the threshold (No in step S401), it is determined that the pixel is not a shaded area, and the process proceeds to step S201 of FIG. 17, thus performing an area dividing process described above.

The shaded area may be further divided into an attached shadow area and a cast shadow area by using the polarization information. This process will now be described in detail.

Figure 45:
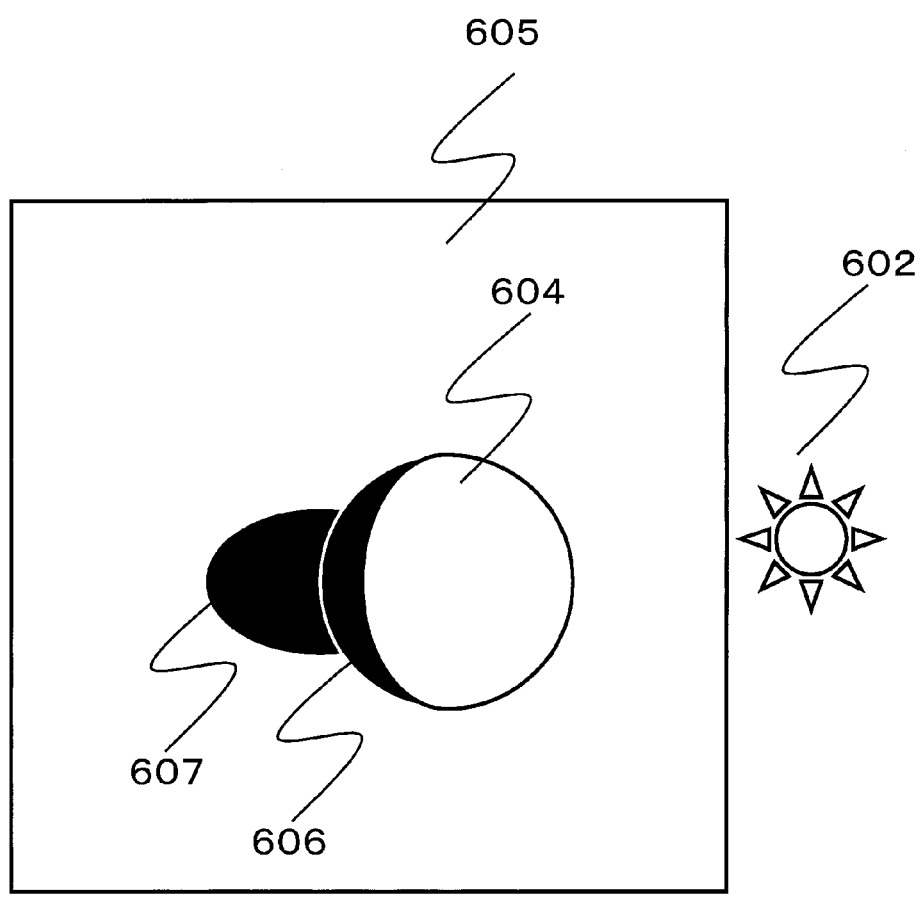
FIG. 45 A schematic diagram illustrating the shading classification into an attached shadow and a cast shadow.

First, an attached shadow and a cast shadow will be described. FIG. 45 is a schematic diagram illustrating the classification of shading into an attached shadow and a cast shadow. Here, the object 604 placed on a plane 605 is illuminated by a light source 602. In this figure, reference numerals 606 and 607 each denote a shading. The reference numeral 606 is an attached shadow produced because the normal of the object 604 is not facing toward the light source 602. The reference numeral 607 is a cast shadow produced on 605 because the light is blocked by the object 604, which is a light-blocking object.

Next, the difference in polarization characteristics between an attached shadow and a cast shadow will be described. First, it is assumed that images are captured in an image-capturing scene that satisfies Condition 3 below, which holds in almost any image-capturing scene on the ground.

Condition 3: "in an image-capturing scene where the object is present, there exists an object having a large surface near the object, with a light source present in the opposite direction from the large surface with respect to the object"

This holds in such an image-capturing scene as follows, for example.

1. In an indoor scene, a ball, being the object, is placed on a desk. The ball is illuminated by a fluorescent light installed on the ceiling.

2. In an indoor scene, a person, being the object, is sitting on a chair placed on the floor surface. The person is illuminated by sunlight coming in through a window.

3. In an outdoor scene, an automobile, being the object, is running on a road. The object is illuminated by sunlight.

Since a wall or a building also has a large surface, this condition holds in almost any image-capturing scene on the ground.

Figure 46:
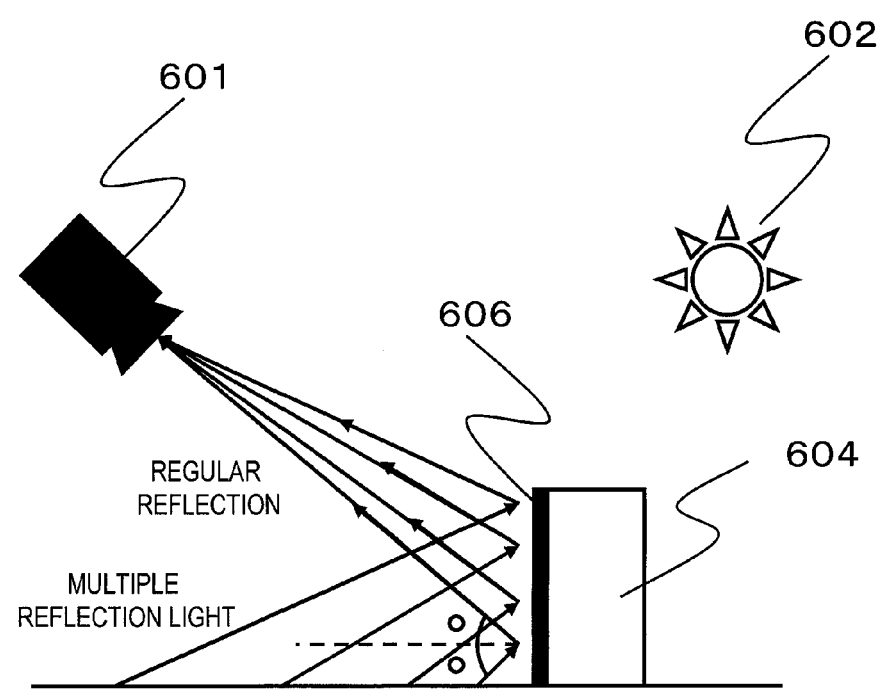
FIG. 46 A schematic diagram illustrating how multiple reflection light is incident on an attached shadow area.

First, consider an attached shadow, for cases where Condition 3 holds. As shown in FIG. 45, an attached shadow is a shading produced because the normal of the object is facing in the opposite direction to the light source. Herein, it is believed from Condition 3 that multiple reflection light is incident on the attached shadow from various directions, in view of the fact that there is a large surface in the opposite direction to the light source and the fact that there are actually many rays of diffracted light (multiple reflection light) in the shaded area. That is, it is believed that there exists multiple reflection light, which is to be regular reflection, for the camera and the normal of the pixel having an attached shadow. FIG. 46 is a schematic diagram showing this. This figure shows the image capture device 601 including therein the area dividing device of the present embodiment.

It is known that the reflection characteristic of an object surface is represented as the sum of the specular reflection component, which is a gloss, and the diffuse reflection component, which is a mat reflection component, as described above. While the diffuse reflection component is observed irrespective of the direction of the light source illuminating the object, the specular reflection component is a component that is strongly dependent on direction and is observed only when the light source is present generally in the regular reflection direction with respect to the normal direction and the viewing direction of the object. This holds also for the polarization characteristic.

It is known that where the object is an object that causes specular reflection, which is a gloss, if light is coming from every direction, the object is strongly influenced by the specular reflection, which is a regular reflection component (for a transparent object, see, for example, Megumi Saito, Yoichi Sato, Katsushi Ikeuchi, Hiroshi Kashiwagi, "Measurement of Surface Orientations of Transparent Objects Using Polarization in Highlight", Trans. of IEICE, D-II, Vol. J82-D-II, No. 9, pp. 1383-1390, 1999). Thus, an attached shadow has a polarization characteristic of specular reflection.

From FIGS. 72 and 73 above, showing the degrees of polarization of the specular reflection component and the diffuse reflection component, it can be seen that if light is coming from every direction, the degree of polarization of the specular reflection component is higher than that of the diffuse reflection component. From this, it is speculated that the specular reflection component will be dominant also for the polarization characteristic.

Excluding an occluding edge, and the like, where the emittance angle is close to 90°, the degree of polarization of the specular reflection component is higher than that of the diffuse reflection component, as can be seen from FIGS. 72 and 73. Therefore, an attached shadow, which exhibits the reflection characteristic of the specular reflection component, has a relatively high degree of polarization.

Figure 47:
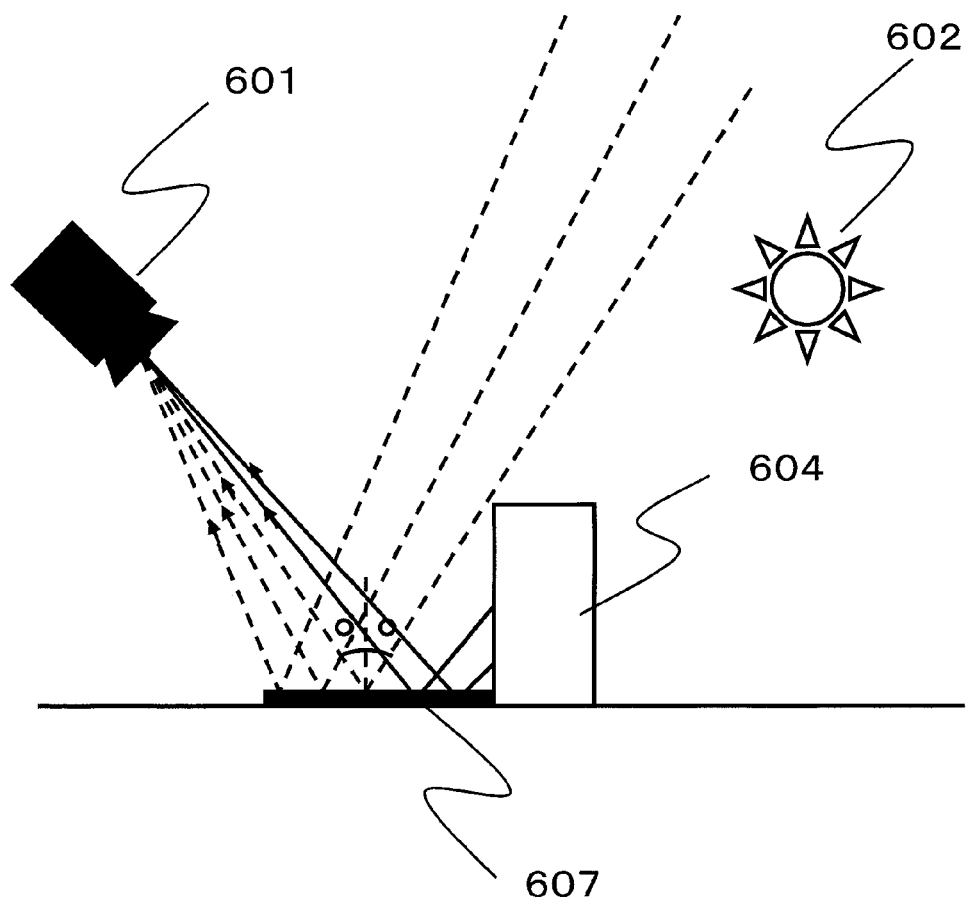
FIG. 47 A schematic diagram illustrating how multiple reflection light is incident on an cast shadow area.

Next, consider a cast shadow. As shown in FIG. 45, a cast shadow is a shading produced as light is blocked by some light-blocking object. In view of Condition 3, a cast shadow is likely to occur on a surface that has a normal direction close to that of the large surface. Therefore, multiple reflection light is incident only from limited directions, as compared with an attached shadow. From this, it is believed that it is unlikely that a light source exists in the regular reflection direction. FIG. 47 is a schematic diagram showing this.

Moreover, as shown in FIG. 73, the degree of polarization of the diffuse reflection component is relatively low. From this, it can be seen that a cast shadow has a relatively small polarization component. In a shaded area, the brightness itself is small, and it is therefore very difficult to estimate the small polarization component. Thus, a cast shadow has a very large polarization estimation error.

In summary, the polarization characteristics of shaded areas are classified as follows.

Attached shadow

High degree of polarization, low polarization estimation error.

Exhibits specular reflection characteristic in many cases.

Cast shadow

Low degree of polarization, large polarization estimation error.

Exhibits diffuse reflection characteristic in many cases.

By using this classification criterion, shadings are divided into the attached shadow and the cast shadow.

Figure 49:
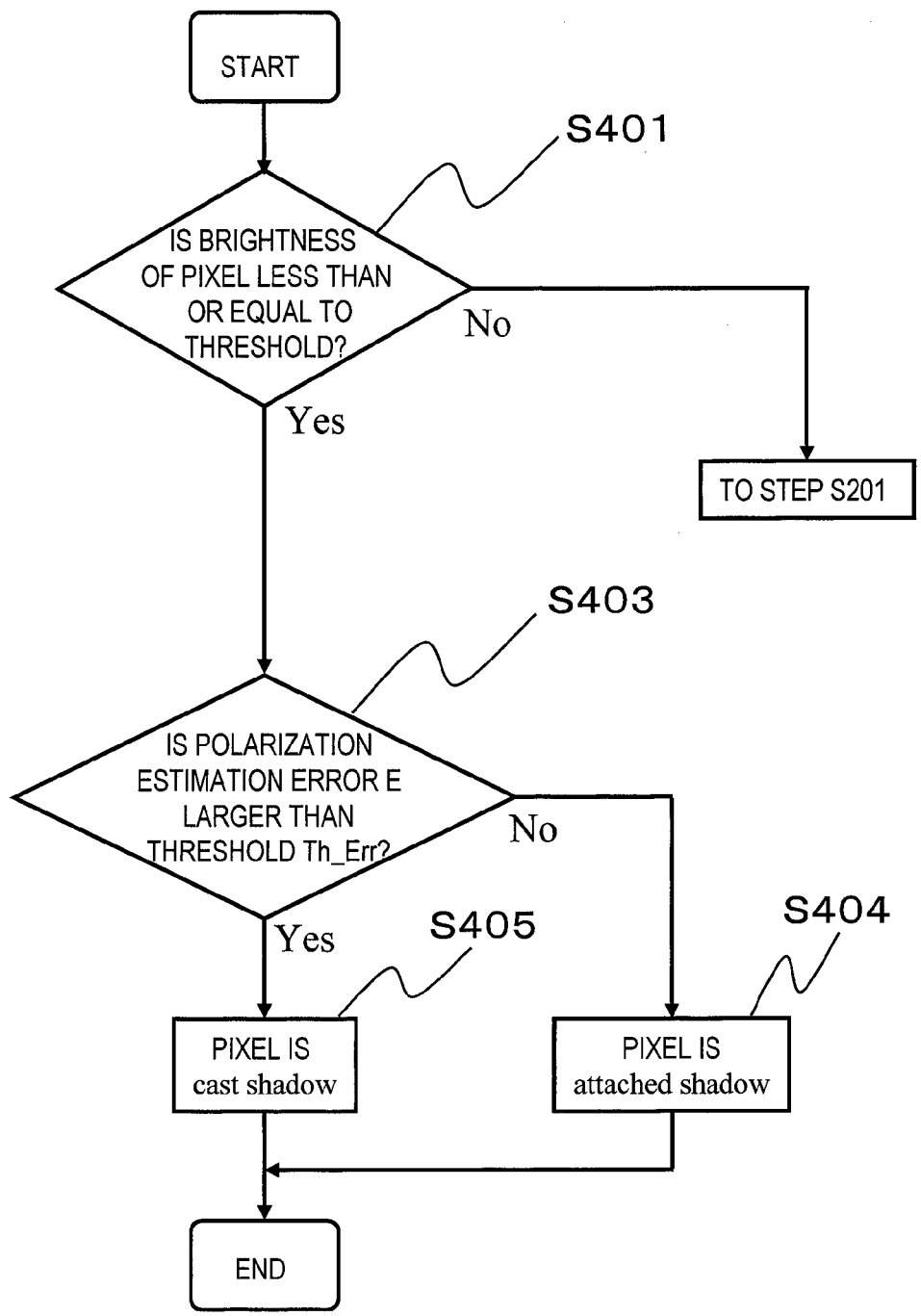
FIG. 49 A flow chart showing the flow of a process performed by the area dividing section, which performs an area division including an attached shadow and a cast shadow, according to the second embodiment of the present invention.

FIG. 48 shows an image division criterion for the area dividing section 106 in this process. FIG. 49 is a flow chart showing the flow of the process performed by the area dividing section 106 of the present embodiment which performs an area division including the attached shadow and the cast shadow. In FIG. 49, like steps to those of FIG. 44 are denoted by like reference numerals to those of FIG. 44 and will not be described in detail below. This process will now be described in detail.

First, in order to estimate whether the pixel is a shaded area, the area dividing section 106 compares the set threshold and the luminance value with each other so as to determine whether the luminance value is less than or equal to the threshold (step S401). As described above, this utilizes the fact that the luminance value is low in a shaded area, and estimates, as a shaded area, a pixel whose luminance value is less than or equal to the threshold. If the luminance value of the pixel is greater than the threshold, it is determined that the pixel is not a shaded area (No in step S401), and the process proceeds to step S201 of FIG. 17, thus performing an area dividing process described above. On the other hand, if the luminance value of the pixel is less than or equal to the threshold, it is determined that the pixel is a shaded area (Yes in step S401), and it is determined whether the polarization estimation error E obtained by the polarization information obtaining section 104 is greater than the threshold Th_Err (step S403). If the polarization estimation error E is less than or equal to the threshold Th_Err (No in step S403), it is determined that the pixel is an attached shadow (step S404), and the process is ended. On the other hand, if the polarization estimation error E is greater than the threshold Th_Err (Yes in step S403), it is determined that the pixel is a cast shadow (step S405), and the process is ended.

The threshold Th_Err for this process may be determined with reference to the luminance value of the captured image, the amplitude component A of Expression 1, or the bias component C. For example, the threshold Th_Err may be determined as follows when it is determined with reference to the amplitude component A.

[Exp. 14]

$$Th\_Err = (Th\_E)^2 \cdot (2A)^2 \cdot N \quad \text{Expression 14}$$

This expression indicates how much the polarization estimation error E differs from the amplitude component A. Herein, Th_E is an arbitrary positive constant, which may be determined experimentally, and may be set to 0.3, for example. N is the number of samples described above.

The criterion for dividing shadings into the attached shadow and the cast shadow is not limited to polarization estimation error information, but may also be degree-of-polarization information, for example. This process will now be described in detail.

Figure 51:
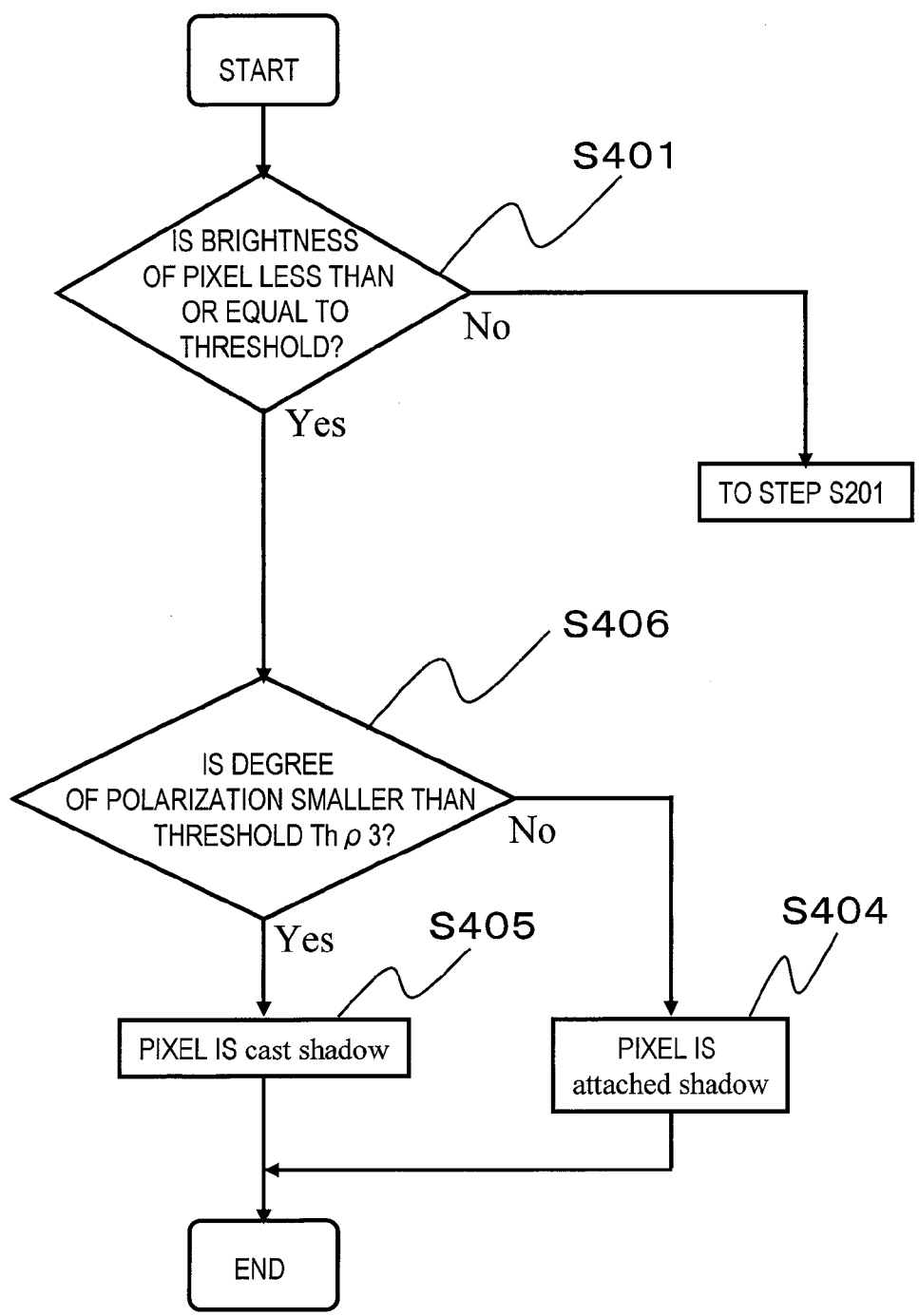
FIG. 51 A flow chart showing the flow of another process performed by the area dividing section, which performs an area division including an attached shadow and a cast shadow, for the second embodiment of the present invention.

FIG. 50 shows an image division criterion for the area dividing section 106 in this process. FIG. 51 is a flow chart showing the flow of the process performed by the area dividing section 106 of the present embodiment which performs an area division including shaded areas. In FIG. 51, like steps to those of FIG. 49 are denoted by like reference numerals to those of FIG. 49 and will not be described in detail below. This process will now be described in detail.

In order to estimate whether the pixel is a shaded area, as described above, the area dividing section 106 compares the set threshold and the luminance value with each other so as to determine whether the luminance value is less than or equal to the threshold (step S401). If the brightness is above the threshold (No in step S401), the process proceeds to step S201 of FIG. 17, thus performing an area dividing process described above. On the other hand, if the brightness is less than or equal to the threshold (Yes in step S401), it is determined that the pixel is a shaded area, and it is determined whether the degree of polarization ρ obtained by the polarization information obtaining section 104 is greater than the threshold Thρ3 (step S406). If the degree of polarization ρ is greater than or equal to the threshold Thρ3 (No in step S406), it is determined that the pixel is an attached shadow (step S404), and the process is ended. On the other hand, if the polarization estimation error E is smaller than the threshold Thρ3 (Yes in step S406), it is determined that the pixel is a cast shadow (step S405), and the process is ended.

In this process, the threshold Thρ3 of the degree of polarization in step S406 may be set to be equal to the threshold Thρ of step S203. Step S203 and step S406 may use different thresholds, instead of using the same threshold Thρ. In such a case, since it can be assumed that the brightness resolution in a shaded area is smaller than the polarized component, the value of Thρ3 is preferably set to be smaller than Thρ.

As described above, by using the area dividing method of the present invention, it is possible to perform an area division using the polarization information and the light source dependency. Such an area division is capable of a division between the specular reflection component and the diffuse reflection component taking into consideration the polarized light of the diffuse reflection component. It is also possible to perform an area division using the brightness information, in addition to the polarization information and the light source dependency. Such an area division is capable of a division between the specular reflection area and the diffuse reflection area taking into consideration of a shaded area, and even a division between the attached shadow and the cast shadow.

Third Embodiment

Figure 52:
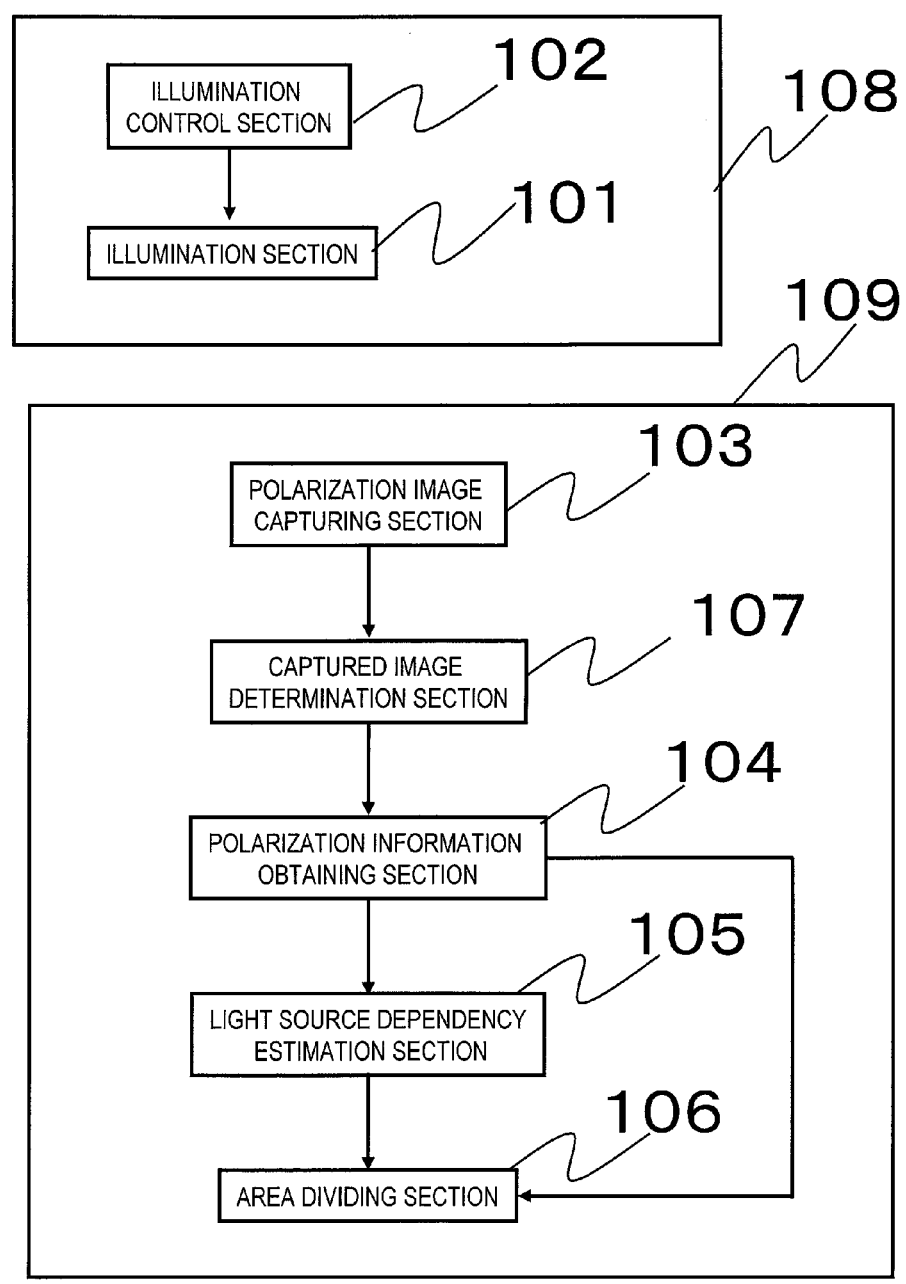
FIG. 52 A block diagram showing an area dividing system according to a third embodiment of the present invention.

FIG. 52 shows a block diagram of an area dividing system of the present embodiment. In FIG. 52, like elements to those of FIG. 1 are denoted by like reference numerals to those of FIG. 1, and will not be described in detail below.

Figure 53:
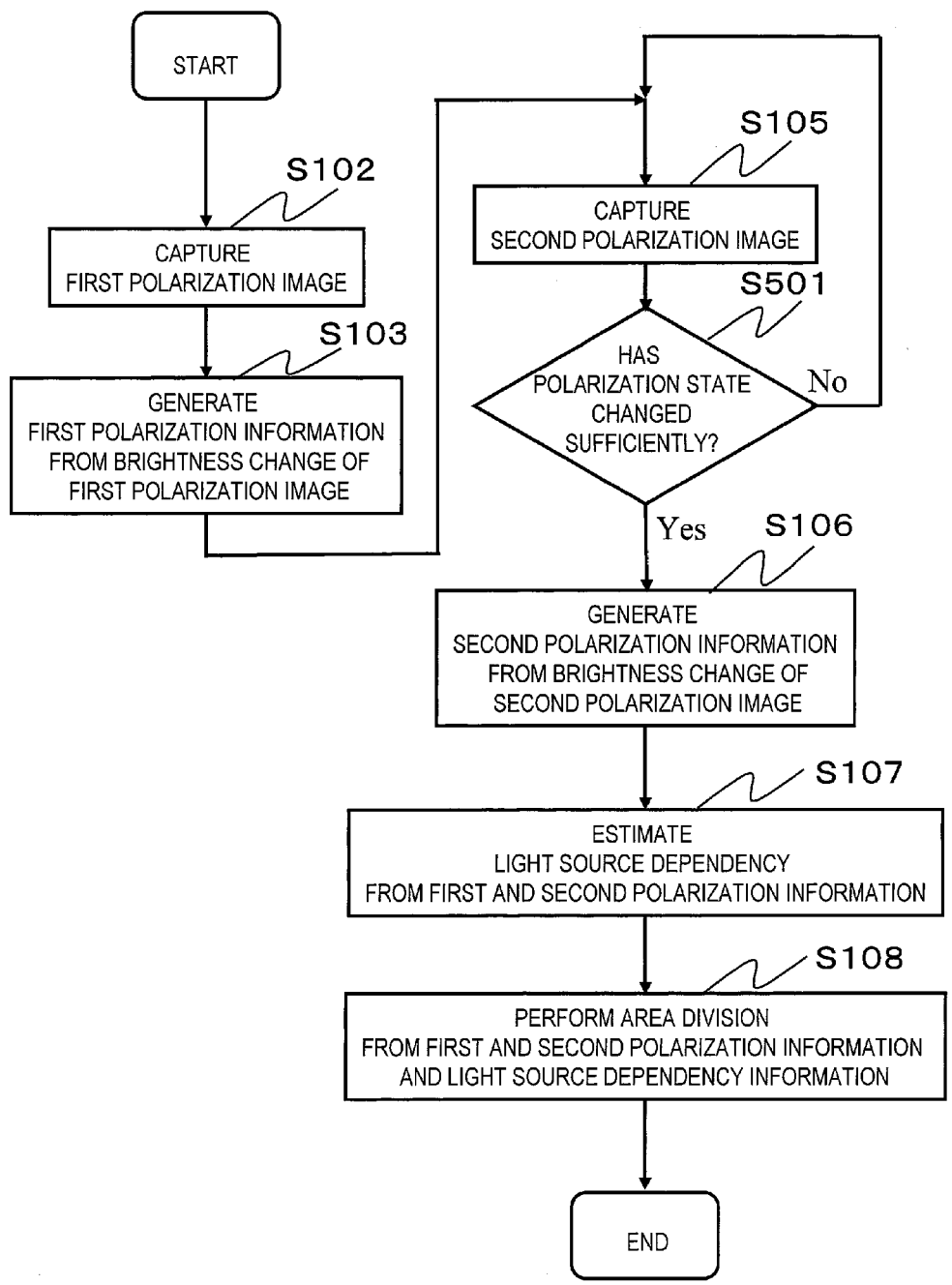
FIG. 53 A flow chart showing the flow of a process of an area dividing method according to the third embodiment of the present invention.
Figure 54:
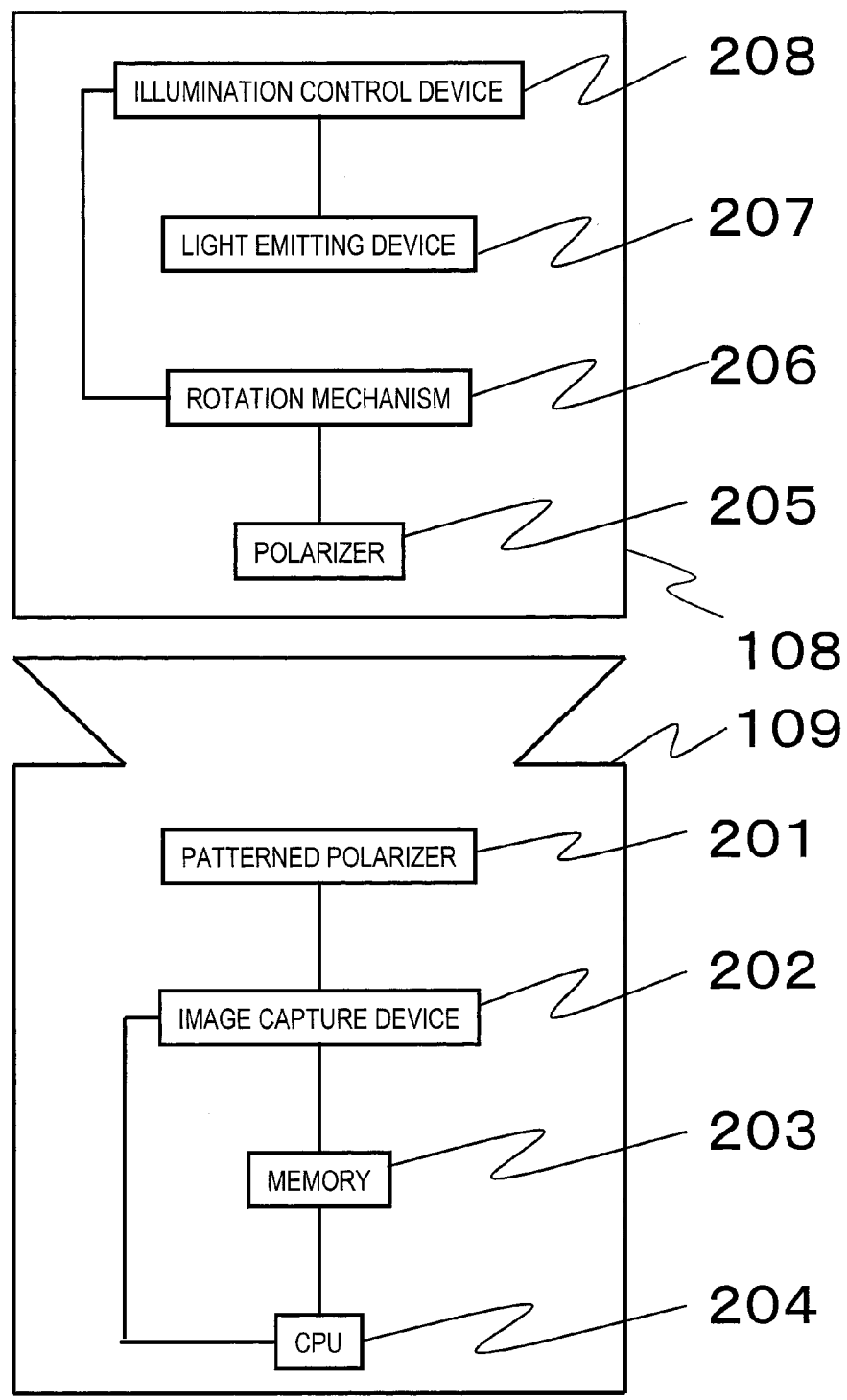
FIG. 54 A diagram showing an exemplary configuration of a camera including therein an area dividing device and a light emitting device according to the third embodiment of the present invention.

A difference from the first embodiment is that an illumination device 108 and an area dividing device 109 are separated from each other, and the area dividing device 109 includes a captured image determination section 107. FIG. 53 is a flow chart showing the flow of a process of an area dividing method of the present embodiment. In FIG. 53, like steps to those of FIG. 2 are denoted by like reference numerals to those of FIG. 2 and will not be described in detail below. Moreover, FIG. 54 shows an exemplary configuration of a camera including therein the area dividing device of the present embodiment, and an illumination device. In FIG. 54, like elements to those of FIG. 3 are denoted by like reference numerals to those of FIG. 3, and will not be described in detail below.

The area dividing system of the present embodiment is an area dividing system, including the illumination device 108 and the area dividing device 109, for capturing an image of an object and thereby performing an optical area division of the surface of the object, wherein the illumination device 108 includes the illumination section 101 for emitting linearly-polarized light onto the object, and the illumination control section 102 for changing the polarization state of the linearly-polarized light of the illumination section 101, thereby emitting polarized light of different main axis directions onto the object over time. The area dividing device 109 includes: the polarization image capturing section 103 for receiving light having passed through a three-way or more polarizer having different polarization main axis angles to thereby obtain polarization image of the object; the captured image determination section 107 for comparing a polarization image captured in the past by the polarization image capturing section 103 with a currently-captured polarization image to thereby determine whether the captured polarization states have changed sufficiently; the polarization information obtaining section 104 for generating, from the obtained polarization image, polarization information, which is information regarding the received polarized light, by using the correspondence with the brightness of the light having passed through the three-way or more polarizer, for each of unit pixels of the polarization image; the light source dependency estimation section 105 for estimating light source dependency information by making a comparison between the polarization information generated by the polarization information obtaining section 104 as the polarization state of the illumination section 101 is changed by the illumination control section 102; and the area dividing section 106 for performing an area division by using the polarization information generated by the polarization information obtaining section 104 and the light source variation information estimated by the light source dependency estimation section 105.

Next, the area dividing device 109 of the present embodiment will be described in detail.

First, in step S102, the polarization image capturing section 103 receives light, by means of an image sensor, from the object through the patterned polarizer 201, as described above, thus obtaining a first polarization image, which is an image including polarization information.

In step S103, the polarization information obtaining section 104 generates the polarization information, which is information regarding the received polarized light, by using the correspondence with the brightness of the light having passed through the three-way or more polarizer, for each of unit pixels of the captured first polarization image, as described above.

In step S105, the polarization image capturing section 103 receives light, by means of an image sensor, from the object through the patterned polarizer 201, as described above, thus again capturing a second polarization image, which is an image including polarization information.

In step S501, the captured image determination section 107 makes a comparison between the first polarization image and the second polarization image to determine whether the captured polarization states have changed sufficiently. This can be done by making a comparison between the luminance values of the captured polarization images. Specifically, a difference image between the captured second polarization image and the captured first polarization image may be produced, and it may be determined that the captured polarization states have changed sufficiently if the maximum value of the difference value is greater than or equal to a threshold. The threshold for this process may be determined experimentally, and may be set to 1000, for example, for a 16-bit monochrome image.

With the area dividing method of the present embodiment, the illumination device 108 and the area dividing device 109 are provided separately, and the illumination device 108 is not synchronized with the area dividing device 109. Therefore, the area dividing device 109 determines whether the polarization states of the captured images have changed by means of the area determination section 107.

If the captured image determination section 107 determines that the polarization states have changed sufficiently (Yes in step S501), in step S106, the polarization information obtaining section 104 generates polarization information, which is information regarding the received polarized light, by using the correspondence with the brightness of the light having passed through the three-way or more polarizer, for each of unit pixels of the captured second polarization image, as described above. On the other hand, if the captured image determination section 107 determines that the polarization states have not changed sufficiently (No in step S501), the area dividing device 109 again obtains a second polarization image, which is an image including polarization information, as described above. The process after step S106 is similar to that of the first embodiment, and will not be further described below.

Polarization information may be obtained, instead polarization images, in order to determine whether the captured polarization states have changed sufficiently. In such a case, the difference between second polarization information and first polarization information may be produced, and it may be determined that the captured polarization states have changed sufficiently if the maximum value of the difference is greater than or equal to a threshold. The threshold for this process may be determined experimentally, and the threshold may be set to 90 degrees where the difference in polarization phase is calculated as the polarization information, and to 0.1 where the difference in the degree of polarization is calculated as the polarization information.

Figure 55:
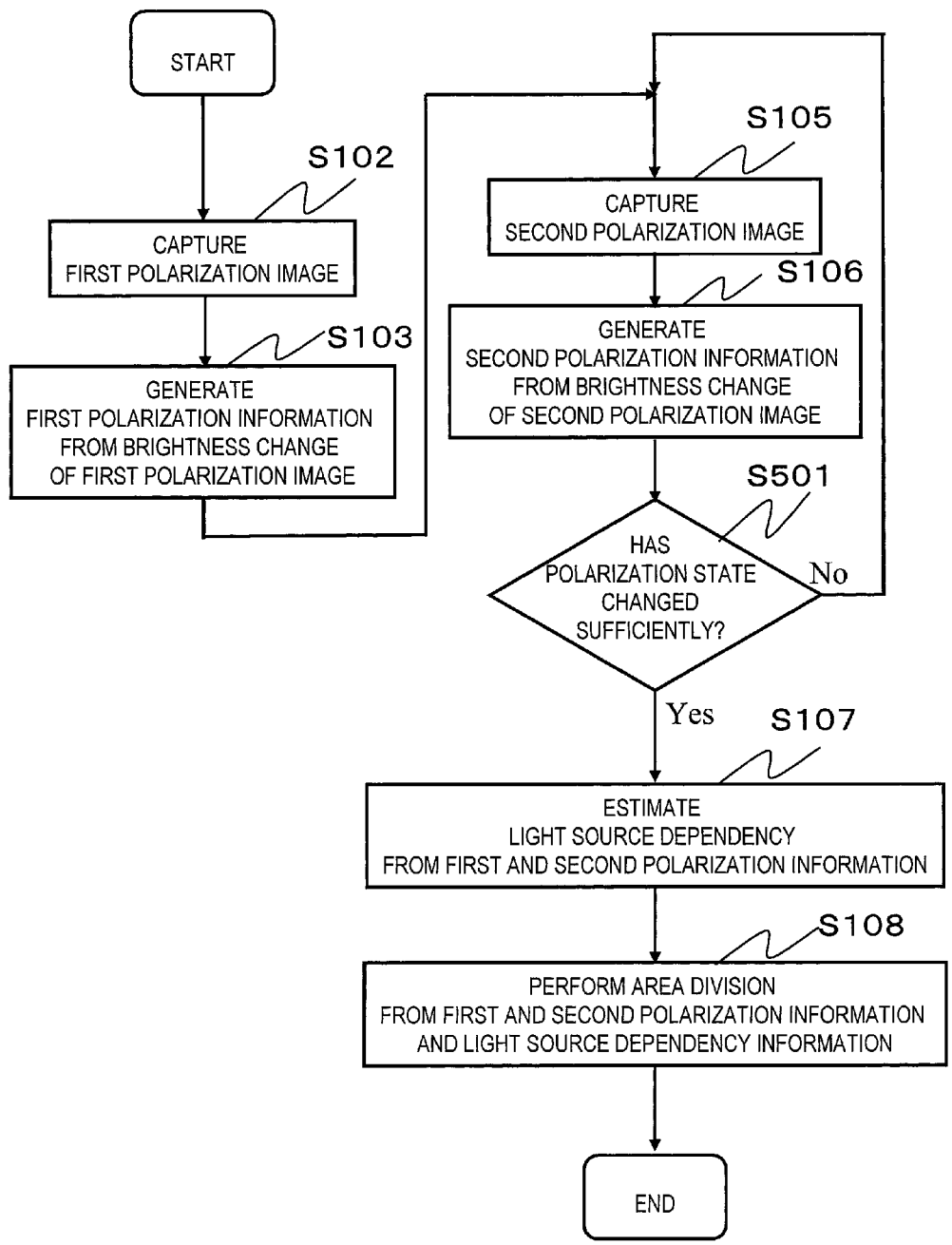
FIG. 55 A flow chart showing the flow of the process of an area dividing method according to the third embodiment of the present invention.

FIG. 55 is a flow chart showing the flow of the process of an area dividing method of the present embodiment. In FIG. 55, like steps to those of FIG. 53 are denoted by like reference numerals to those of FIG. 53 and will not be described in detail below.

With the area dividing system of the present embodiment, it is possible to realize the area dividing device 109 of an even smaller size by separating the illumination device 108 and the area dividing device 109 from each other.

The illumination device 108 and the area dividing device 109 may be synchronized with each other, wherein the area dividing device 109 captures images based on the synchronization signals from the illumination device 108. This process will be described.

Figure 56:
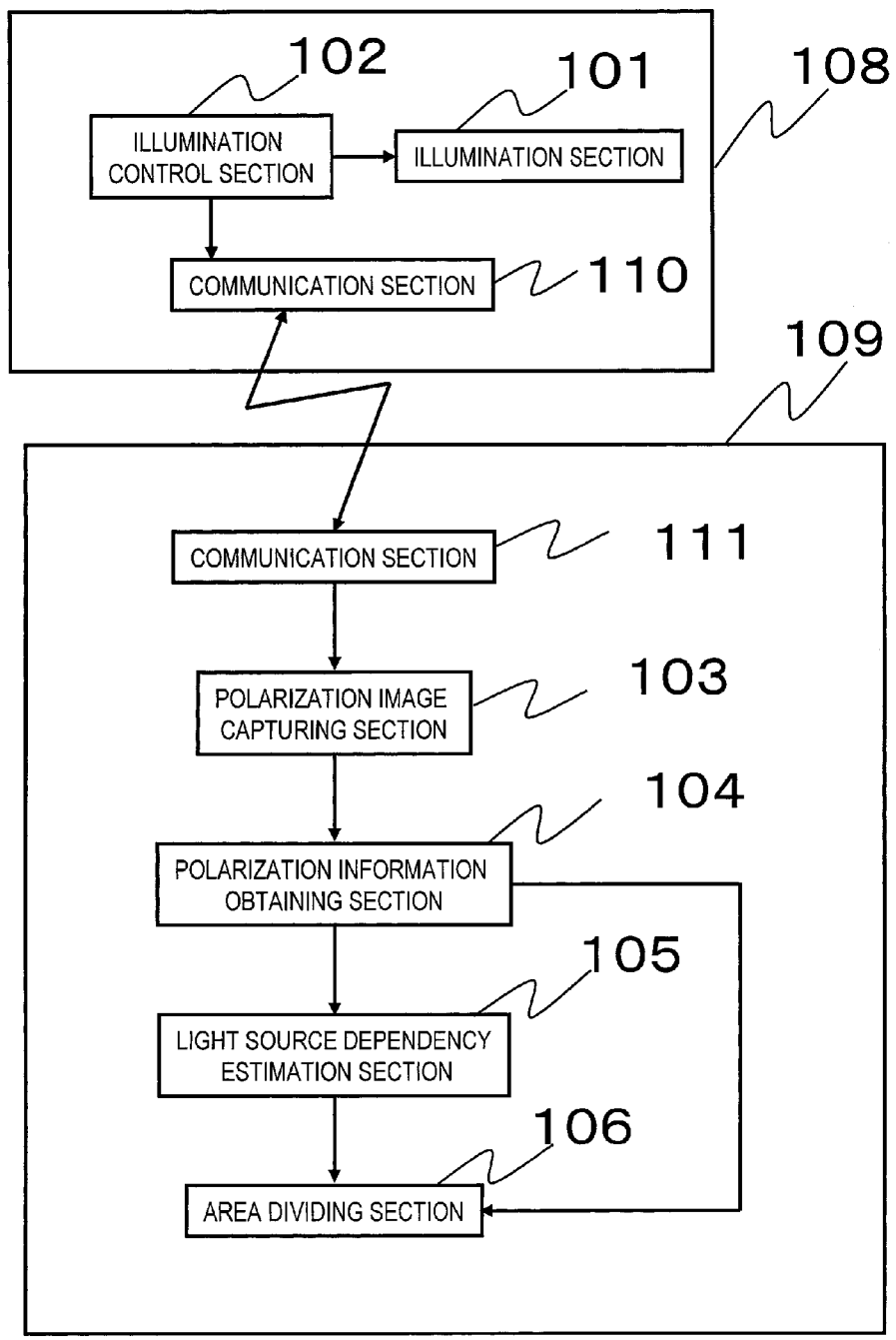
FIG. 56 Another block diagram showing the area dividing system according to the third embodiment of the present invention.
Figure 57:
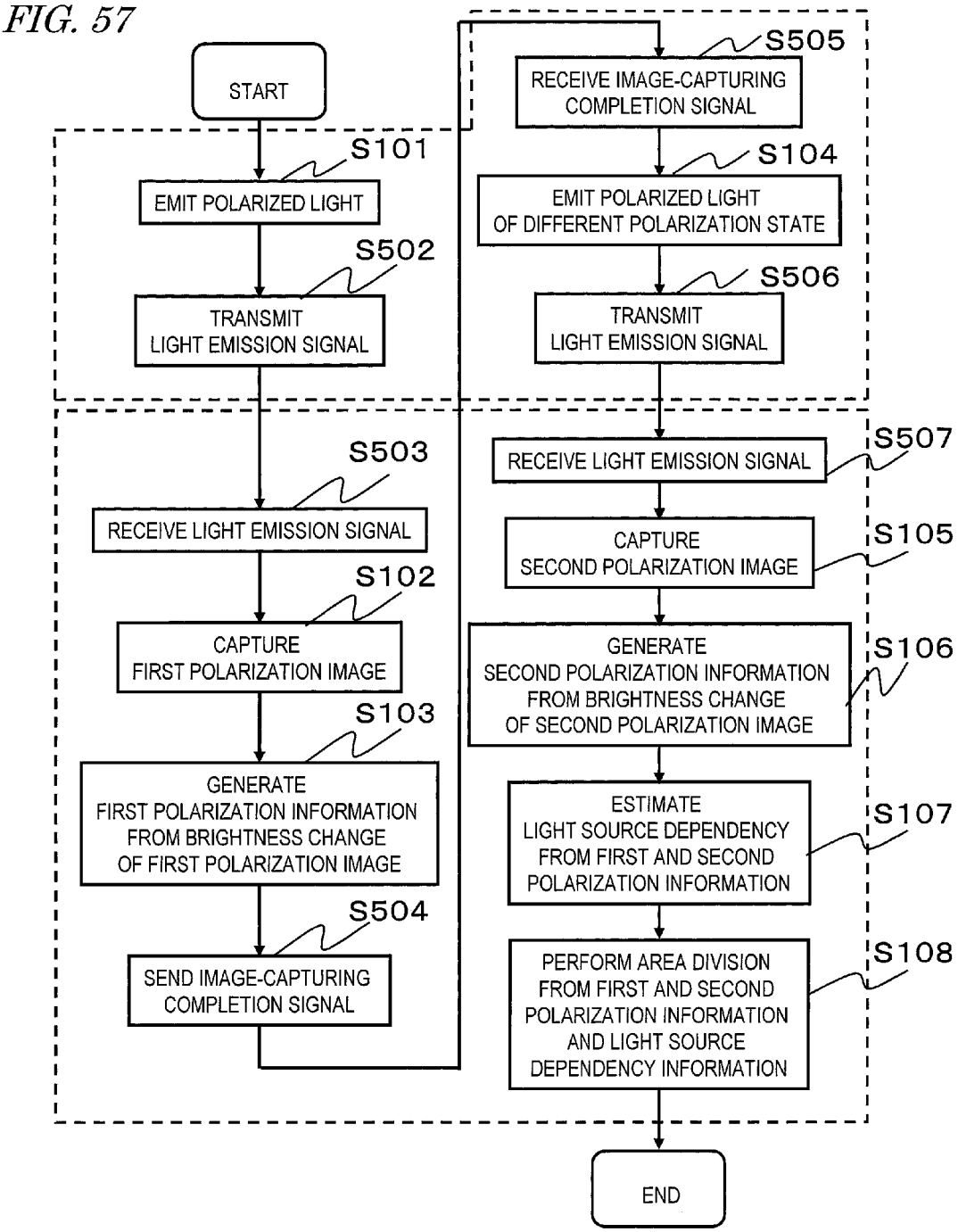
FIG. 57 A flow chart showing the flow of another process of the area dividing method according to the third embodiment of the present invention.
Figure 58:
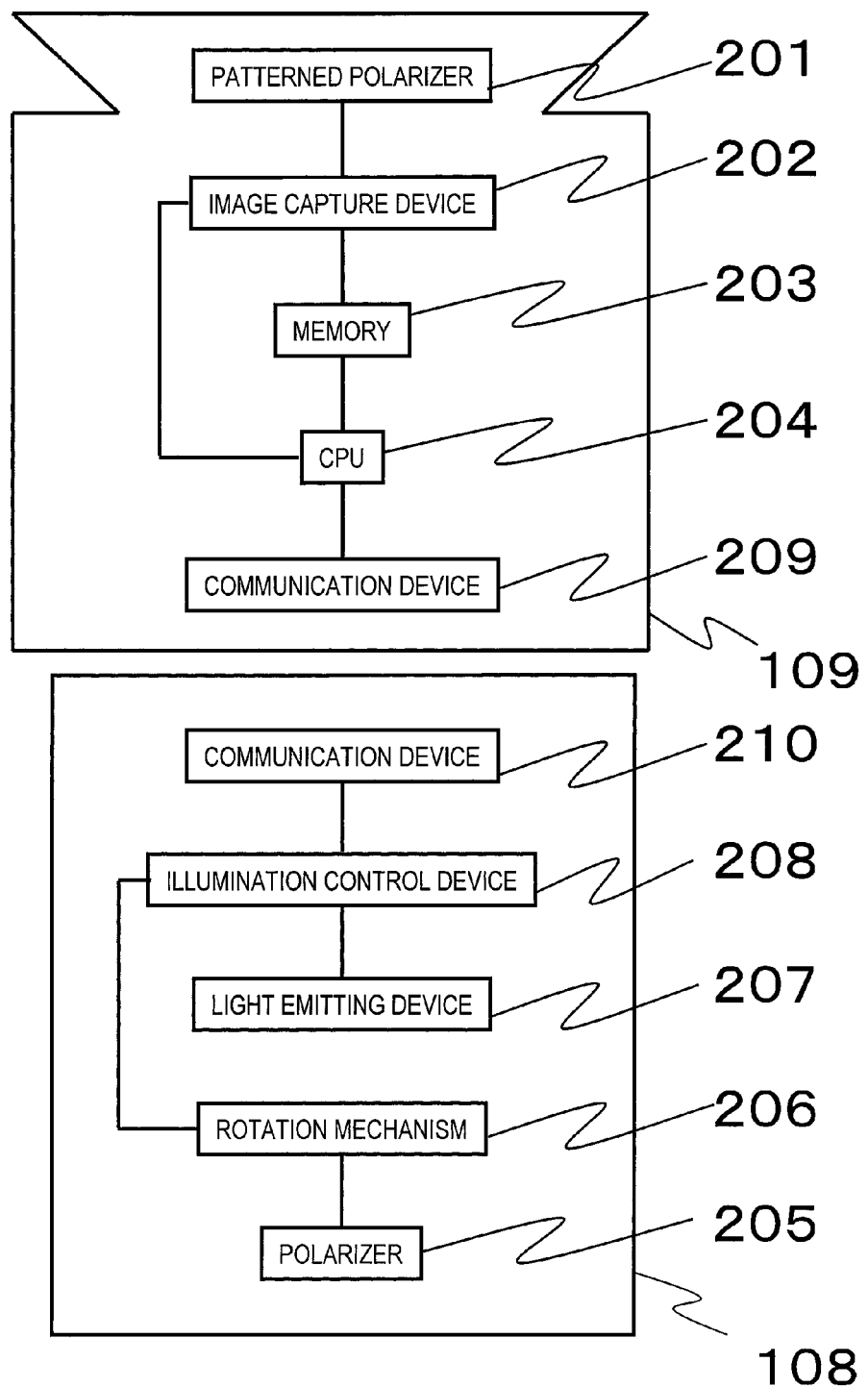
FIG. 58 A diagram showing another exemplary configuration of a camera including therein an area dividing device and a light emitting device according to the third embodiment of the present invention.

FIG. 56 shows a block diagram of an image processing system of the present embodiment. In FIG. 56, like elements to those of FIG. 52 are denoted by like reference numerals to those of FIG. 52, and will not be described in detail below. A difference from the configuration shown in FIG. 52 is that the illumination device 108 and the area dividing device 109 both include communication sections 110 and 111, and the captured image determination section 107 is absent in the area dividing device 109. FIG. 57 is a flow chart showing the flow of a process of the area dividing method of the present embodiment. In FIG. 57, like steps to those of FIG. 2 are denoted by like reference numerals to those of FIG. 2 and will not be described in detail below. Moreover, FIG. 58 shows an exemplary configuration of a camera including therein the area dividing device of the present embodiment, and an illumination device. In FIG. 58, like elements to those of FIG. 54 are denoted by like reference numerals to those of FIG. 54, and will not be described in detail below.

As described above, the illumination section 101 emits polarized light which is polarized in a main axis direction specified by the illumination control section 102, in step S101. Then, the illumination device 108 transmits, by means of a communication device 209, a signal indicating a light emission to the area dividing device 109 (step S502). When the area dividing device 109 receives the signal indicating a light emission at a communication device 210 (step S503), the polarization image capturing section 103 receives light, by means of an image sensor, from the object through the patterned polarizer 201, as described above, thus obtaining a first polarization image, which is an image including polarization information (step S102). Then, the patterned polarizer has three or more polarization main axis angles, as described above. The polarization information obtaining section 104 generates polarization information, which is information regarding the received polarized light as described above (step S103), and the area dividing device 109 transmits, by means of the communication device 210, a signal indicating the completion of image-capturing of the first polarization image to the illumination device 108 (step S504). As the illumination device 108 receives the signal indicating the completion of image-capturing at the communication device 209 (step S505), the illumination control section 102 controls the illumination section 101 so that polarized light in a polarization state that is different from that when obtaining the first polarization image is emitted onto the object, as described above. Then, the illumination section 101 again emits polarized light which is polarized in a main axis direction specified by the illumination control section 102 onto the object (step S104). Thereafter, the illumination device 108 again transmits, by means of the communication device 209, a signal indicating a light emission to the area dividing device 109 (step S506). As the area dividing device 109 receives the signal indicating a light emission at the communication device 210 (step S507), the area dividing device 109 obtains the second polarization image through steps S105-S108 as described above, and finally performs an area division.

The illumination device 108 may include the illumination position changing section 112, instead of the illumination control section 102, and the position of the light source may be changed as described above. In the area dividing system of the present embodiment, the illumination device 108 and the area dividing device 109 are separated from each other, and the light emission and the image-capturing are synchronized with each other by communications, thus realizing an efficient area division with the area dividing device 109 of an even smaller size.

(Model-Based Image Synthesis Using Area Division)

The area division of the present invention is particularly effective for a model-based image synthesis process used in digital archives, etc. The model-based image synthesis is important as a method for interactively presenting captured image data since it is possible to arbitrarily vary the light source direction or the viewing direction of the captured image. It is very effective also for giving realism. Therefore, the model-based image synthesis process can be used in applications such as virtual museums or AR (Augmented Reality). Originally, such a model-based image synthesis divides a captured image into the specular reflection component and the diffuse reflection component, and uses a different model for each component. However, as described above, the separation between the specular reflection component and the diffuse reflection component is insufficient, and the image quality therefore deteriorates. The cause of this problem is as follows. Since the parameter estimation in each model uses the specular reflection component and the diffuse reflection component, which are different from actual components, the process will estimate parameters that are different from actual parameters. If an image is synthesized by using parameters different from the actual parameters, there will be a significant error in the output image when a viewpoint-converted image or a light source-varied image is generated, as described above.

By using the area dividing method of the present invention, it is possible to realize a model-based image synthesis with little image deterioration. This method will be described.

First, the concept of this process will be described. The image synthesis process of the present invention includes a parameter estimation device 300, and an image synthesis apparatus 301. The following five input information are used.

Diffuse reflection image of object
Specular reflection image of object
3-dimensional shape information of object
Light source position/color/illuminance
Viewpoint/light source information in synthesized image (Embodiment of Parameter Estimation Device and Image Synthesis Apparatus)

Figure 59:
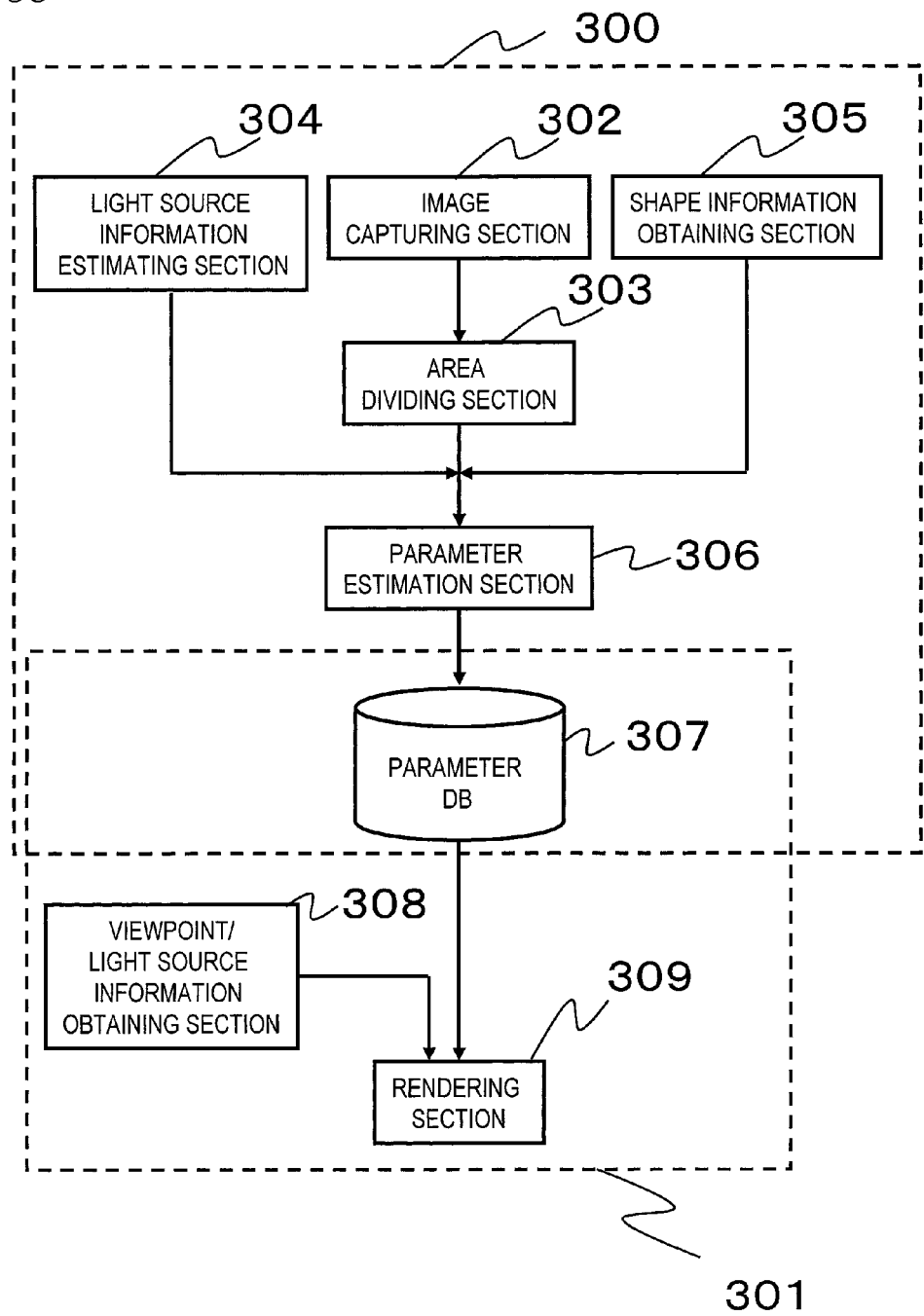
FIG. 59 A block diagram showing a configuration of an image synthesis apparatus according to one embodiment of the present invention.

FIG. 59 is a block diagram showing a configuration of the parameter estimation device 300 and the image synthesis apparatus 301 according to one embodiment of the present invention.

The parameter estimation device 300 of FIG. 59 includes: an image capturing section 302 for capturing an image by using an image capture device; an area dividing section 303 for dividing an image into a specular reflection area and a diffuse reflection area by the area dividing method described above; a light source information estimating section 304 for estimating light source information, such as the direction, the position, the brightness, the color or the spectrum information, of the light source illuminating the object; a shape information obtaining section 305 for obtaining, as shape information, the normal information of the surface of the object or the 3-dimensional position information thereof; a parameter estimation section 306 for estimating a reflection model parameter by modeling the light source information estimated by the light source information estimating section for each area divided by the area dividing section 303 and the shape information obtained by the shape information obtaining section, from the captured image of the object; and a parameter DB (database) 307 for storing the reflection parameter estimated by the parameter estimation section 306.

Moreover, the image synthesis apparatus 301 includes a viewpoint/light source information obtaining section 308 for obtaining the viewpoint or light source information of the image to be synthesized, and a rendering section 309 for synthesizing an image according to the viewpoint or light source information obtained by the viewpoint/light source information obtaining section 308 by using the model parameter information stored in the parameter DB 307.

Figure 60:
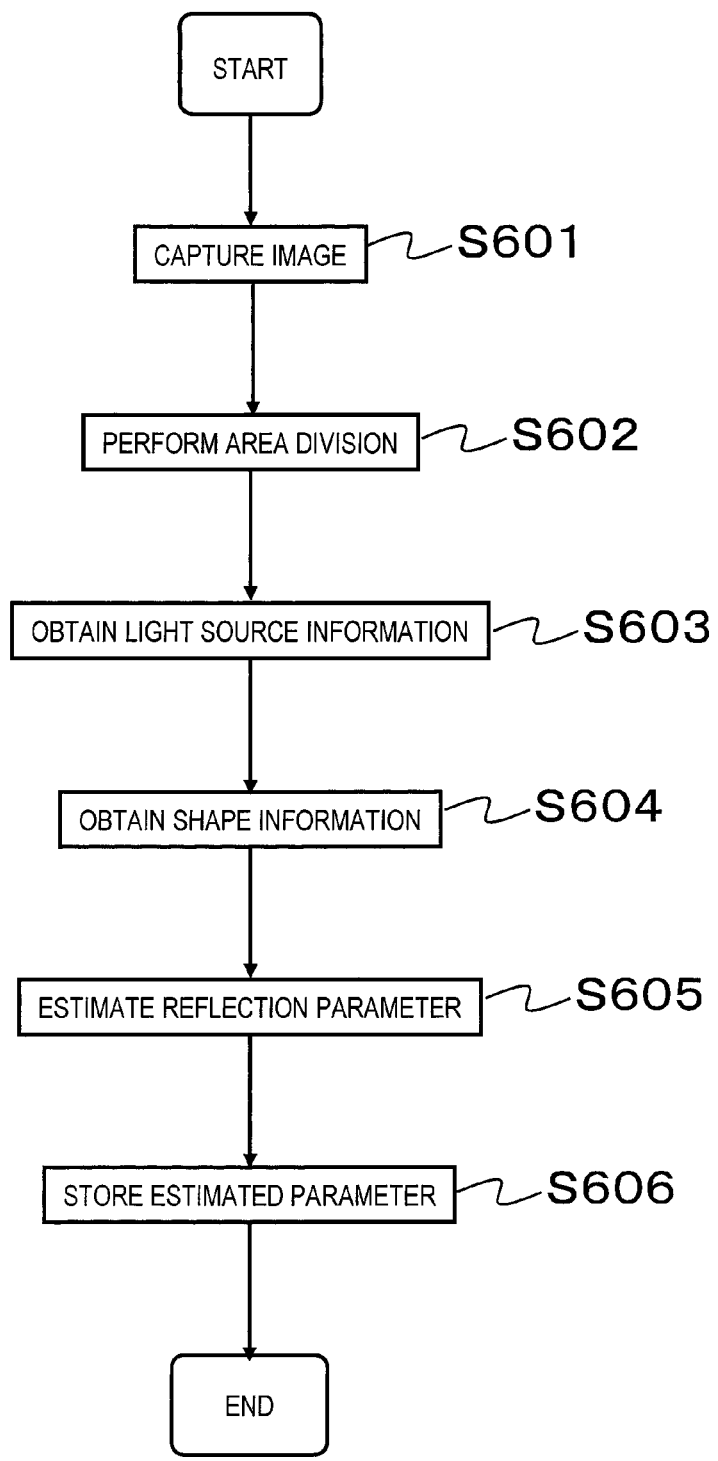
FIG. 60 A flow chart showing the flow of a process of a parameter estimation method in an image synthesis method according to one embodiment of the present invention.
Figure 61:
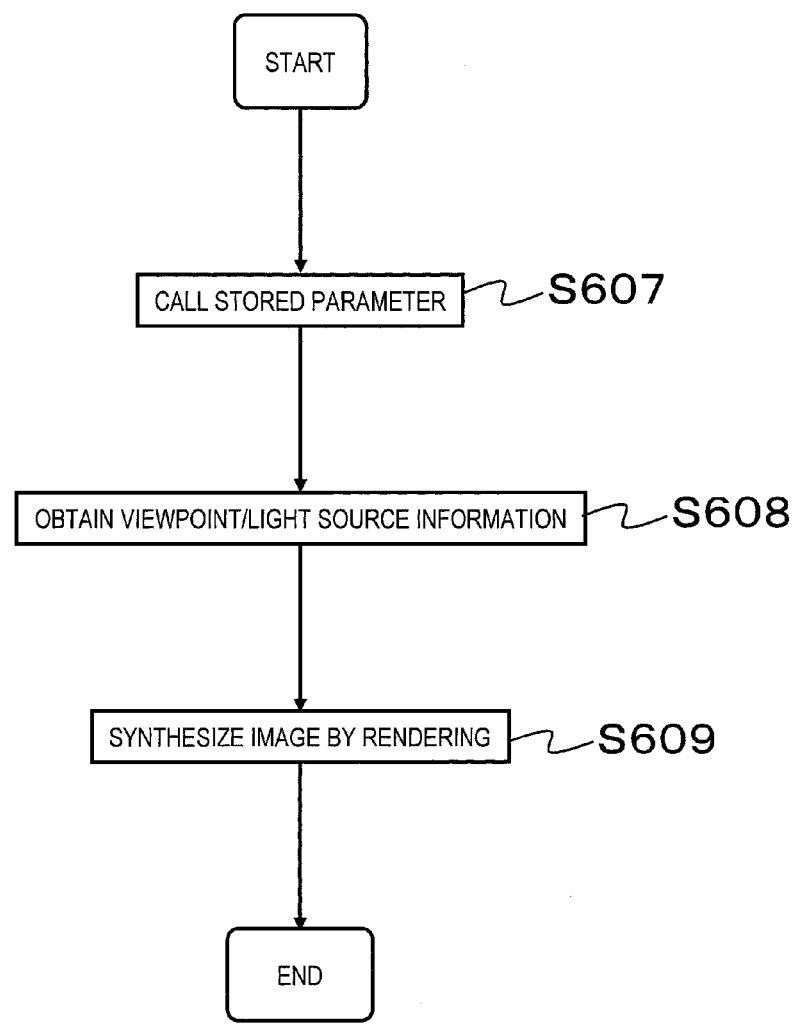
FIG. 61 A flow chart showing the flow of a process of an image synthesis estimation method in an image synthesis method according to one embodiment of the present invention.

First, referring to FIGS. 60 and 61, the flow of the process of the parameter estimation method of the present embodiment will be described. FIGS. 60 and 61 are flow charts showing the flows of the processes of the parameter estimation method and the image synthesis method according to the image synthesis method of the present embodiment.

In step S601 of FIG. 60, the image capturing section 302 captures an image of the object by the polarization image capturing section 103 and the polarization information obtaining section 104 described above to thereby obtain the weighted average value Imax+2·Imin between the polarization maximum luminance value Imax and the polarization minimum luminance value Imin. In step S602, the area dividing section 303 divides the image captured by the image capturing section 302 into a diffuse reflection area and a specular reflection area by the area dividing method described above.

In step S603, the light source information estimating section 304 obtains, as the light source information, the direction of the light source, as well as the color information and the illuminance information thereof. In step S604, the shape information obtaining section 305 obtains the surface normal information or the 3-dimensional position information of the object, which is the shape information of the object.

In step S605, the parameter estimation section 306 estimates the reflection parameter of each of the diffuse reflection image and the specular reflection image, which have been divided by the area dividing section 303, by using the light source information estimated by the light source information estimating section and the shape information obtained by the shape information obtaining section. In step S606, the parameter DB 307 stores, as model parameters, the reflection parameter for the diffuse reflection component and the reflection parameter for the specular reflection component obtained by the parameter estimation section 306, and the shape information obtained by the shape information obtaining section 305.

Next, referring to FIG. 61, the flow of the process of the image synthesis estimation method will be described.

First, in step S607, the rendering section 309 calls the model parameter information stored in the parameter DB 307. In step S608, the viewpoint/light source information obtaining section 308 obtains the viewpoint or the light source direction of the image to be synthesized, and also the color information or the illuminance information thereof. In step S609, the rendering section 309 synthesizes an image according to the viewpoint and the light source information obtained by the viewpoint/light source information obtaining section 308 by using the model parameter information stored in the parameter DB 307.

Figure 62:
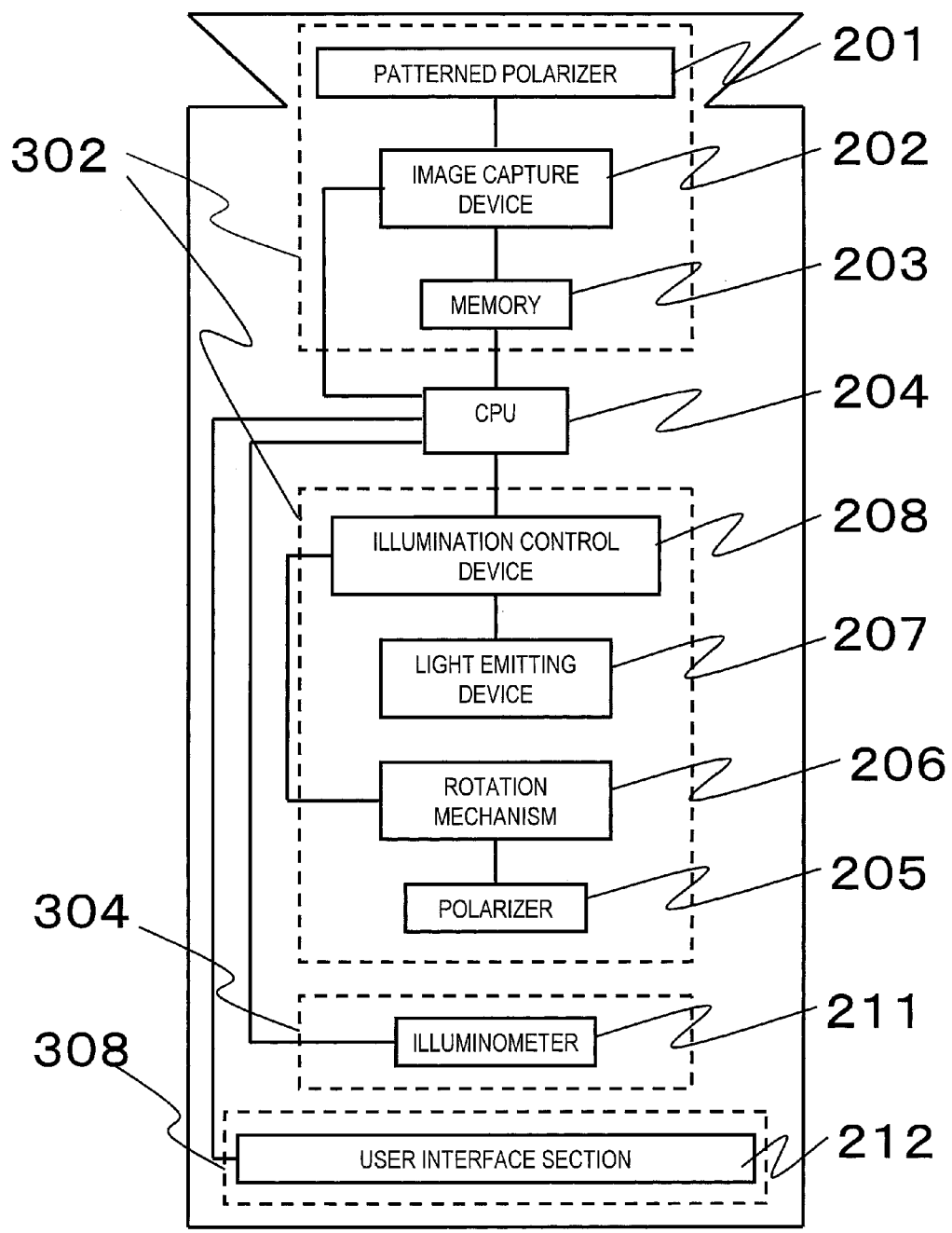
FIG. 62 A diagram showing an exemplary configuration of a camera including therein an image synthesis apparatus of the present invention.

FIG. 62 shows an exemplary configuration of a camera including therein an image synthesis apparatus of the present embodiment.

It is assumed that the area dividing section 303, the light source information estimating section 304, the shape information obtaining section 305, the parameter estimation section 306 and the rendering section 309 shown in FIG. 59 are implemented by the CPU 204 of FIG. 61 executing a program. Note however that some or all of these functions may be implemented by hardware.

The viewpoint/light source information obtaining section 308 of FIG. 59 is carried out by an user interface section 212 of FIG. 61. The memory 203 stores, as model parameters, the polarization image captured by the image capturing section 302, the specular reflection component and the diffuse reflection component image obtained by the area dividing section 303, the light source information estimated by the light source information estimating section, the shape information obtained by the shape information obtaining section 305, the reflection parameter information estimated by the parameter estimation section 306, and the viewpoint/light source information obtained by viewpoint/light source information obtaining section.

Each of the processes will now be described.

First, the parameter estimation device 300 of FIG. 59 will be described.

The image capturing section 302 captures an image of the object by using an image capture device such as a CCD or a CMOS. It is preferred that an image thus captured is recorded with a sufficient brightness resolution so that the specular reflection component where the brightness is very high and the diffuse reflection component are not saturated at the same time. Therefore, it is preferred to use an image capture device capable of shooting with a wide dynamic range, such as a cooled CCD camera or multiple exposure shooting. Such an image capturing section may use the weighted average value Imax+2·Imin between the polarization maximum luminance value Imax and the polarization minimum luminance value Imin obtained by the polarization information obtaining section 104 described above. Particularly, Imax+2·Imin, which is a weighted average value, is an image equivalent to an image captured under a linearly-polarized light source where no polarizer is provided. Therefore, by performing an image process by using the weighted average value, it is possible to perform a process similar to normal processes where polarized light is not used.

The area dividing section 303 of FIG. 59 divides an image captured by the image capturing section 302 into a diffuse reflection area and a specular reflection area by the area dividing method described above.

The light source information estimating section 304 obtains, as the light source information, the direction of the light source, as well as the color information and the illuminance information thereof. For example, a mirror surface of a known shape for estimating the light source information may be provided near the object, and it may be estimated from the image of the mirror surface captured by the image capturing section 302 (for example, Masayuki Kanbara and Naokazu Yokoya, "Geometric and Photometric Registration for Vision-based Augmented Reality", IEICE Technical Report, PRMU2002-190, pp. 7-12, 2003). This process will now be described in detail.

Figure 63:
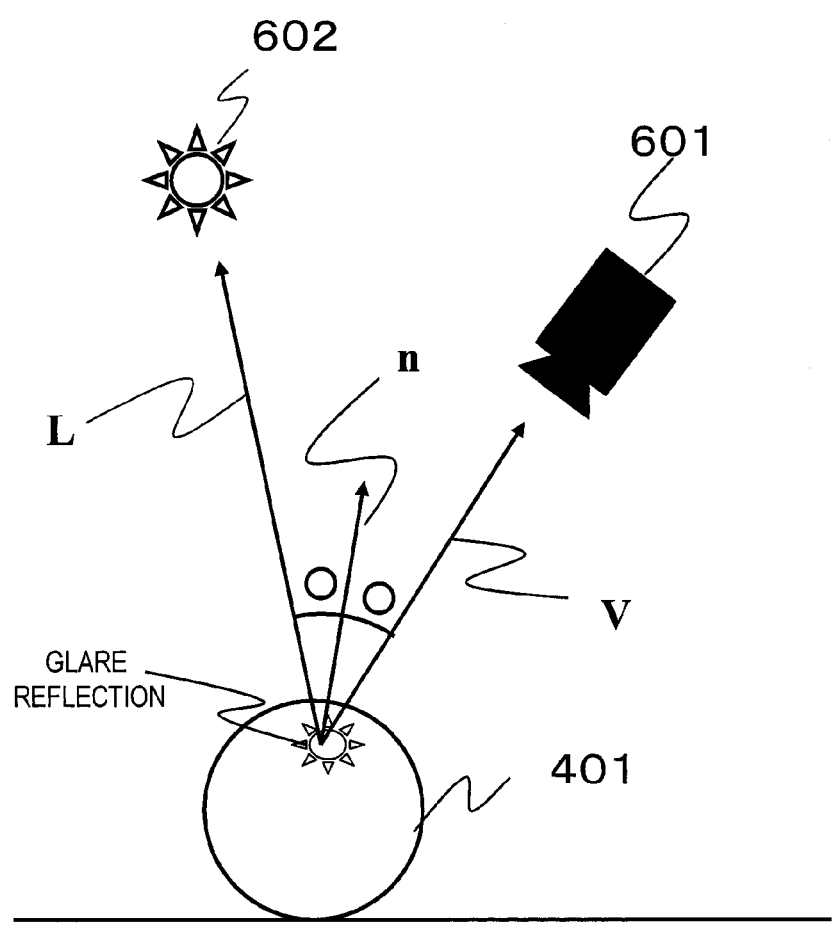
FIG. 63 A schematic diagram illustrating a light source estimation method utilizing a mirrored ball.

The process of the light source information estimating section 304 is performed by using a sphere 401, which can be regarded as a mirror surface shown in FIG. 63. The mirrored ball 401 is provided near the object, with a known position and a known normal direction. The image capturing section 302 captures an image of the mirrored ball 401. The image-capturing environment is reflected as a glare on the mirrored ball 401. The position of the glare reflection is such a position that the viewing direction and the direction toward the object being reflected are in a regular reflection relationship with respect to the normal direction on the mirrored ball. Therefore, if the position of the mirrored ball and the normal direction thereof are known, the direction of the object being reflected can be detected from the image of the reflection on the mirror surface. Taking into consideration the fact that the light source has a high luminance value, it is possible to obtain the direction of the light source by detecting high-brightness pixels from the captured image of the mirrored ball. Moreover, if the reflectance of the mirror surface is known, it is also possible to obtain light source illuminance information such as the color information or luminance of the light source.

The light source position information may be obtained, as the light source information, in addition to or instead of the direction of the light source. This may be done by using stereo image process techniques known in the field of image processing, wherein two such mirrored balls as described above are used, or a plurality of images captured while changing the position of the image capture device are used, for example.

Instead of always capturing the image of such a mirrored ball, light source information obtained through image-capturing previously may be used. This is advantageous in cases where the light source environment does not change, as with an indoor surveillance camera. In such a case, an image of a mirrored ball may be captured upon installment of the camera, to obtain the light source information.

The light source information estimating section 304 may estimate the light source direction by using the object, instead of using a reference object such as the sphere 401 which can be regarded as a mirror surface. This method will be described. First, in an area where an image of the object is captured, a pixel with the highest luminance value is selected. As will be described later, the normal direction of the pixel with the highest luminance value is known since the shape information obtaining section 305 has estimated the surface normal information, which is the shape information of the object. Assuming that the light source in the regular reflection direction is reflected as a glare in the pixel with the highest luminance value, the direction of the light source can be obtained from the normal direction, as with the method using a reference object described above.

By providing the image capture device 601 with an illuminometer 211, the incident illuminance may be measured as light source information. The method for using the incident illuminance information will be described later.

The shape information obtaining section 305 obtains the surface normal information or the 3-dimensional position information of the object, which is the shape information of the object. Means for obtaining the shape information of the object may be any existing method such as, for example, a slit-ray projection method, a patterned light projection method, or a laser radar method.

The obtainment of the shape information is not limited to these methods. For example, it may use a stereo vision using a plurality of cameras, a motion stereo method using the movement of the camera, a photometric stereo method using an image captured while changing the position of the light source, a method for measuring the distance from the object by using millimeter waves or ultrasonic waves, and also a method using polarization characteristics of the reflected light (e.g., U.S. Pat. No. 5,028,138 or Daisuke Miyazaki, Katsushi Ikeuchi, "A Method to Estimate Surface Shape of Transparent Objects by Using Polarization Raytracing Method", Trans. of IEICE, vol. J88-D-II, No. 8, pp. 1432-1439, 2005). Herein; a photometric stereo method and a method using polarization characteristics will be described.

The photometric stereo method is a method for estimating the normal direction and the reflectance of the object by using three or more images of different light source directions. For example, "H. Hayakawa, "Photometric Stereo under a light source with arbitrary motion", Journal of the Optical Society of America A, vol. 11, pp. 3079-89, 1994" is a method in which six or more points of an equal reflectance on the image are obtained as known information and used as a constraint so as to estimate the following parameters even with the light source position information being unknown.

Object information: normal direction and reflectance of each point on image

Light source information: light source direction and illuminance at point from which object is observed Herein, a photometric stereo method is carried out, which uses only the diffuse reflection image, which is separated by the diffuse reflection/specular reflection separation method described above. This method results in a significant error for an object where there is specular reflection because the method originally assumes that the object reflects light totally in diffuse reflection. However, by using only the diffuse reflection area separated, it is possible to eliminate the estimation error due to the presence of the specular reflection component.

Diffuse reflection images of different light source directions are represented as a brightness matrix $I_d$ as follows.

Expression 15

$$I_d = \begin{bmatrix} i_{d1(1)} & \Lambda & i_{dF(1)} \\ M & O & M \\ i_{d1(P)} & \Lambda & i_{dF(P)} \end{bmatrix}$$ [Exp. 15]

Herein, $i_{df(p)}$ represents the luminance value of the diffuse reflection image of the light source direction f at a pixel p. The number of pixels of the image is P, and the number of images captured with different light source directions is F. Now, by the Lambertian model, the luminance value of the diffuse reflection image can be expressed as follows.

[Exp. 16]

$$i_{f(p)} = (\rho_{dp} \cdot n_p^T) \cdot (t_f L_f)$$ Expression 16

Herein, $\rho_{dp}$ is the reflectance (albedo) of the pixel p, $n_p$ is the normal direction vector of the pixel p, $t_f$ is the incident illuminance of the light source f, and $L_f$ is the direction vector of the light source f.

Expression 15 and Expression 16 together yield the following expression.

[Exp. 17]

$$I = R \cdot N \cdot L \cdot T = S \cdot M$$ Expression 17 where

Expression 18

$$R = \begin{bmatrix} \rho_1 & & 0 \\ & O & \\ 0 & & \rho_P \end{bmatrix}$$ [Exp. 18]

$$N = [n_1 \; \Lambda \; n_P]^T = \begin{bmatrix} n_{1x} & n_{1y} & n_{1z} \\ M & M & M \\ n_{Px} & n_{Py} & n_{Pz} \end{bmatrix}$$ [Exp. 19]

$$L = [L_1 \; \Lambda \; L_F] = \begin{bmatrix} l_{x1} & \Lambda & l_{xF} \\ l_{y1} & \Lambda & l_{yF} \\ l_{z1} & \Lambda & l_{zF} \end{bmatrix}$$ [Exp. 20]

$$T = \begin{bmatrix} t_1 & & 0 \\ & O & \\ 0 & & t_F \end{bmatrix}$$ [Exp. 21]

$$S = [s_1 \; \Lambda \; s_P]^T = \begin{bmatrix} s_{1x} & s_{1y} & s_{1z} \\ M & M & M \\ s_{Px} & s_{Py} & s_{Pz} \end{bmatrix} = R \cdot N$$ [Exp. 22]

$$M = [M_1 \; \Lambda \; M_F] = \begin{bmatrix} m_{x1} & \Lambda & m_{xF} \\ m_{y1} & \Lambda & m_{yF} \\ m_{z1} & \Lambda & m_{zF} \end{bmatrix} = L \cdot T$$ [Exp. 23]

Herein, R is called the surface reflection matrix, N the surface normal matrix, L the light source direction matrix, T the light source intensity matrix, S the surface matrix, and M the light source matrix.

Using a singular value decomposition, Expression 17 can be developed as follows.

Expression 19

$$I = U \cdot \Sigma \cdot V$$ [Exp. 24]

$$U = [U' \; U'']$$ [Exp. 25]

$$\Sigma = \begin{bmatrix} \Sigma' & 0 \\ 0 & \Sigma'' \end{bmatrix}$$

$$V = \begin{bmatrix} V' \\ V'' \end{bmatrix}$$

$$U^T \cdot U = V^T \cdot V = V \cdot V^T = E$$ [Exp. 26]

E is the unit matrix. U' is a P×3 matrix, U'' is a P×(F−3) matrix, Σ' is a 3×3 matrix, Σ'' is an (F−3)×(F−3) matrix, V' is a 3×F matrix, and V" is an (F−3)×F matrix. It can be assumed that U" and V" are orthogonal bases of signal components U' and V', respectively, i.e., noise components. By using the singular value decomposition, Expression 19 can be rearranged as follows.

[Exp. 27]

$$\hat{I} = U'' \cdot \Sigma' \cdot V' = \hat{S} \cdot \hat{M} \quad \text{Expression 20}$$

$$\hat{S} = U' \cdot (\pm [\Sigma']^{1/2})$$

$$\hat{M} = (\pm [\Sigma']^{1/2}) \cdot V' \quad \text{[Exp. 28]}$$

That is, although the shape information and the light source information can be obtained simultaneously by solving Expression 20, the variability of the 3×3 matrix A below remains.

[Exp. 29]

$$S = \hat{S} \cdot A \quad \text{Expression 21}$$

[Exp. 30]

$$M = A^{-1} \cdot \hat{M} \quad \text{Expression 22}$$

Herein, A is any 3×3 matrix. It is necessary to obtain the matrix A in order to obtain the shape information and the light source information. This is satisfied, for example, if it is known that the reflectance is equal among six or more points on the image. For example, assuming that the reflectance is equal among arbitrary six points k1 to k6,

[Exp. 31]

$$(s_{k1})^2 = (s_{k2})^2 = (s_{k3})^2 = (s_{k4})^2 = (s_{k5})^2 = (s_{k6})^2 = 1 \quad \text{Expression 23}$$

Expression 18, Expression 21 and Expression 23 together yield the following.

[Exp. 32]

$$(s_{ki})^2 = (\hat{s}_{ki}^T \cdot A)^2 = (\hat{s}_{ki}^T \cdot A)^T \cdot (\hat{s}_{ki}^T \cdot A) =$$
$$(\hat{s}_{ki}^T \cdot A) \cdot (\hat{s}_{ki}^T \cdot A)^T = \hat{s}_{ki}^T \cdot A \cdot A^T \cdot \hat{s}_{ki} = 1 \quad \text{Expression 24}$$

Moreover, assuming that

[Exp. 33]

$$B = A \cdot A^T \quad \text{Expression 25}$$

Expression 24 is as follows.

[Exp. 34]

$$\hat{s}_{ki}^T \cdot B \cdot \hat{s}_{ki} = 1 \quad \text{Expression 26}$$

Herein, from Expression 25, the matrix B is a symmetric matrix, and therefore the number of unknowns of the matrix B is 6. That is, Expression 26 can be solved if it is known that the reflectance is equal among six or more points on the image.

Once the matrix B is known, the matrix A can be solved by applying a singular value decomposition to Expression 25. Moreover, the shape information and the light source information are obtained from Expression 21 and Expression 22.

From the above, for an object of which six or more pixels sharing an equal reflectance are known, the following information can be obtained by obtaining three or more images while changing the light source direction.

Object information: normal direction vector and reflectance of each point on image Light source information: light source direction vector and luminance from object observation point Note however that the reflectance of the object and the luminance of the light source obtained through the above process are relative, and in order to obtain absolute values, there is needed known information different from the above, such as the reflectance being known for six or more points on the image.

As described above, with the photometric stereo method and the method using polarization characteristics, the surface normal information is obtained. On the other hand, with such methods as the slit-ray projection method or the stereo vision, 3-dimensional position information of the object is obtained. The object surface normal information is inclination information within a minute space of the 3-dimensional position information of the object, and they are both shape information of the object.

By the above process, the shape information obtaining section 305 obtains the surface normal information and the 3-dimensional position information of the object, which are shape information of the object.

By the above process, the following information are obtained.

Diffuse reflection image of object

Specular reflection image of object 3-dimensional shape information of object

Light source position/illuminance

Then, the parameter estimation section 306 estimates, by a different method, each of the reflection parameters of the diffuse reflection component and the specular reflection component divided by the area dividing section 303. First, the process for the diffuse reflection component will be described.

The parameter estimation section 306 estimates the albedo of the object by using the diffuse reflection area divided by the area dividing section 303. Since the albedo is not influenced by the light source information, it is possible to realize a process that is robust against light source variations by performing a process using an albedo image.

This process will now be described. First, the reflection characteristics of an object will be described. Assuming a dichroic reflection model, the brightness of an object is expressed by the following expression as the sum of the diffuse reflection component and the specular reflection component.

[Exp. 35]

$$I = I_a + I_d + I_s \quad \text{Expression 27}$$

Herein, I is the luminance value of the object of which an image is captured by the image capture device, $I_a$ is the ambient light component, $I_d$ is the diffuse reflection component, and $I_s$ is the specular reflection component. Herein, the ambient light component refers to indirect light which is the light of the light source being scattered by objects, etc. This is scattered everywhere in the space, giving slight brightnesses even to shaded portions where direct light cannot reach. Therefore, it is usually often treated as noise.

Considering that the ambient light component is sufficiently small and is negligible as noise, an image can be separated into a diffuse reflection component and a specular reflection component.

From Expression 16, the following relationship holds for the diffuse reflection component.

Expression 28

$$\rho_{dp} = \frac{i_{f(p)}}{t_f \cdot \cos\theta_i} \quad [\text{Exp. 36}]$$

Herein, $\theta_i$ denotes the angle between the normal direction vector of the object and the light source direction vector. Herein, the angle $\theta_i$ is known from the light source information estimating section 304 and the shape information obtaining section 305. Since the incident illuminance $t_f$ of the light source can also be estimated, as will be described later, the albedo $\rho_{dp}$ of the object can be obtained from Expression 28.

Instead of obtaining the albedo of the object, one may obtain and use a pseudo-albedo, which is the albedo multiplied by the radiation brightness of the light source, from the following expression.

$$t_f \cdot \rho_{dp} = \frac{i_{f(p)}}{\cos\theta_i} \quad [\text{Exp. 37}]$$

Next, the estimation of the reflection parameter for the specular reflection component will be described. The parameter estimation section 306 estimates parameters for expressing an object by using the normal information of the object obtained by the shape information obtaining section 305, and the diffuse reflection image and the specular reflection image separated by the area dividing section 303. Herein, a method using the Cook-Torrance model, which is widely used in the field of computer graphics, will be described.

With the Cook-Torrance model, a specular reflection image is modeled as shown in the following expressions.

Expression 29

$$I_s = K_s \rho_{s,\lambda} \quad [\text{Exp. 38}]$$

Expression 30

$$K_s = \frac{1}{\pi} E_i k_s \quad [\text{Exp. 39}]$$

Expression 31

$$\rho_{s,\lambda} = \frac{F_\lambda D G}{n \cdot V} \quad [\text{Exp. 40}]$$

Expression 32

$$F_\lambda = \frac{1}{2} \frac{(g_\lambda - c)^2}{(g_\lambda + c)^2} \left(1 + \frac{[c(g_\lambda + c) - 1]^2}{[c(g_\lambda - c) + 1]^2}\right) \quad [\text{Exp. 41}]$$

Expression 33

$$c = L \cdot H \quad [\text{Exp. 42}]$$

Expression 34

$$g_\lambda = \sqrt{n_\lambda^2 - 1 + c^2} \quad [\text{Exp. 43}]$$

Expression 35

$$D = \frac{1}{4m^2 \cos^4\beta} \exp\left\{-\frac{\tan^2\beta}{m^2}\right\} \quad [\text{Exp. 44}]$$

-continued

Expression 36

$$G = \min\left\{1, \frac{2(n \cdot H)(n \cdot V)}{(V \cdot H)}, \frac{2(n \cdot H)(n \cdot L)}{(V \cdot H)}\right\} \quad [\text{Exp. 45}]$$

Expression 37

$$E_i = \sum_{j=0}^{n-1} I_j n \cdot L_j \quad [\text{Exp. 46}]$$

Figure 64:
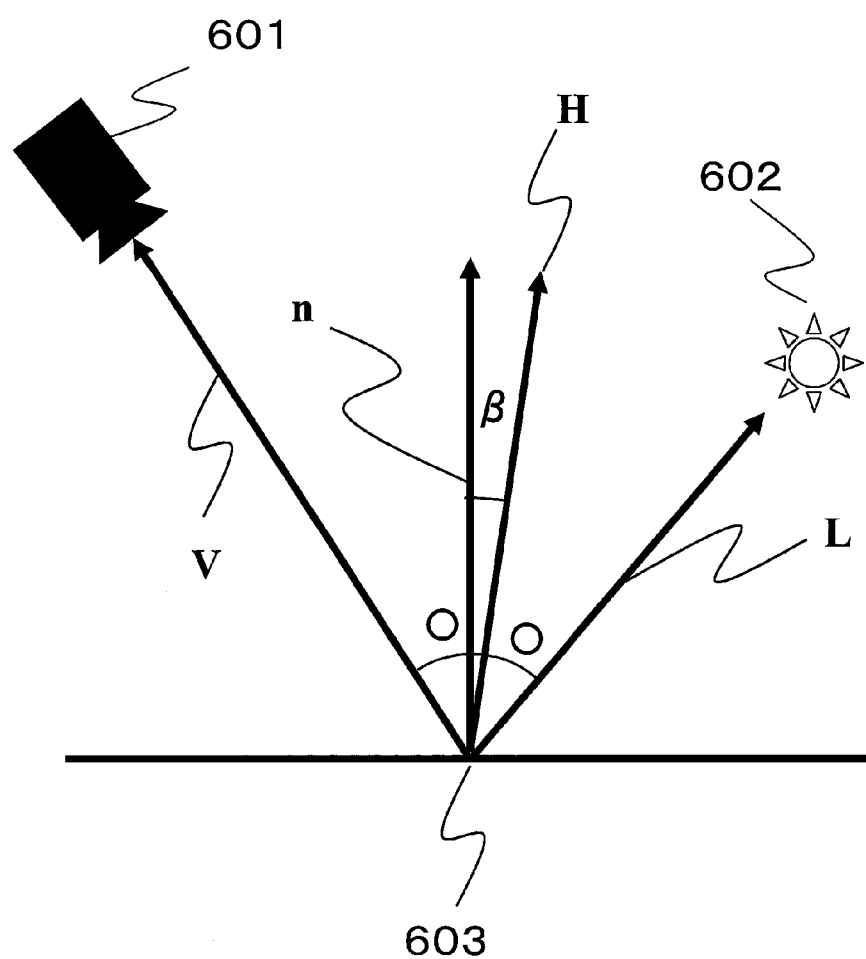
FIG. 64 A schematic diagram illustrating the relationship between the normal direction vector, the viewing vector and the light source direction vector.

Herein, Ei denotes the incident illuminance, $\rho_{s,\lambda}$ the bidirectional reflectance function of the specular reflection component for the wavelength $\lambda$, n the normal direction vector of the object, V the viewing vector, L the light source direction vector, H the half-way vector between the viewing vector and the illumination direction vector, and $\beta$ the angle between the half-way vector H and the normal direction vector n (see FIG. 64). F$\lambda$ denotes the Fresnel coefficient, which is the ratio of reflected light from the dielectric surface obtained from Fresnel equations, D the microfacet distribution function, and G the geometric attenuation factor representing the influence of shading due to roughness on the object surface. Moreover, n$\lambda$ denotes the refractive index of the object, m a coefficient representing the roughness of the object surface, and $I_j$ the luminance of the incident light. $K_s$ denotes the coefficient of the specular reflection component.

Moreover, Expression 27 can be developed as follows by using the Lambertian model of Expression 16.

[Exp. 47]

$$I = I_a + I_d + I_s = I_a + K_D + K_s \rho_{s,\lambda} \quad \text{Expression 38}$$

where

Expression 39

$$K_D = \frac{1}{\pi} S_r E_i k_d \rho_d \quad [\text{Exp. 48}]$$

Expression 40

$$S_r = \frac{dpx \cdot dpy}{2\pi r^2} \quad [\text{Exp. 49}]$$

Herein, $\rho_d$ denotes the reflectance (albedo) for the diffuse reflection component, dpx and dpy the lengths of one pixel of the image capture device, in the x direction and the y direction, respectively, and r the distance from the observation point O of the image capture device. $K_d$ is a coefficient that satisfies the following mathematical relation.

[Exp. 50]

$$k_d + k_s = 1 \quad \text{Expression 41}$$

Figure 65:
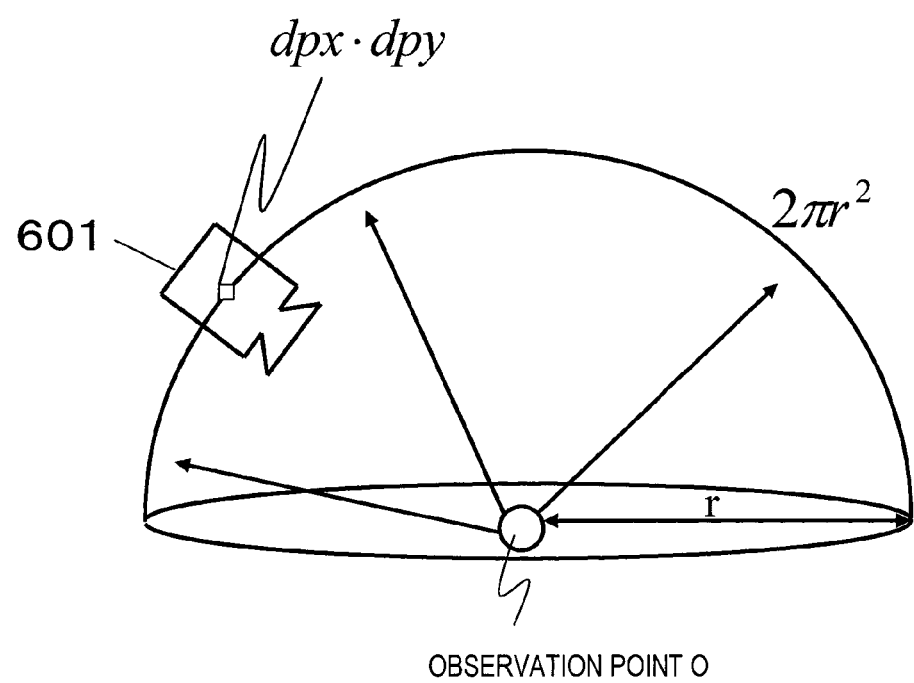
FIG. 65 A schematic diagram illustrating the constant Sr for expressing the difference in the luminance value between the diffuse reflection component and the specular reflection component.

Sr is a constant representing the difference in luminance value between the diffuse reflection component and the specular reflection component, and indicates that the diffuse reflection component reflects an energy from the object in every direction. FIG. 65 is a schematic diagram illustrating the constant Sr. In FIG. 65, the diffuse reflection component energy reflected at the observation point O spreads hemispherically. Herein, since the image capture device 601 is apart from the observation point O by r, the ratio $S_r$ between the energy reaching one image sensor of the image capture device and the total energy reflected at the observation point O is expressed by Expression 40.

From the above, the parameter estimation section 306 estimates the reflection parameter of the specular reflection component from Expressions 29 to 40.

Combining these mathematical relationships together, known parameters for parameter estimation and parameters to be estimated are as follows:

(Known Parameters)
Ambient light component $I_a$
Diffuse reflection component $I_d$
Specular reflection component $I_s$
Normal direction vector n of object
Light source direction vector L
Viewing vector V
Half-way vector H
Angle β between half-way vector H and normal direction vector n
Lengths dpx, dpy of one pixel of image capture device 601 in x, y direction
Distance r between image capture device 601 and observation point O
(Parameters to be Estimated)
Incident illuminance Ei
Coefficient $k_s$ of specular reflection component
Surface roughness m of object
Refractive index ηλ of object Herein, the coefficient $k_d$ of the diffuse reflection component and the reflectance (albedo) $\rho_d$ of the diffuse reflection component are also unknown parameters, but these are not estimated so as to estimate only the parameters of the specular reflection component.

Figure 66:
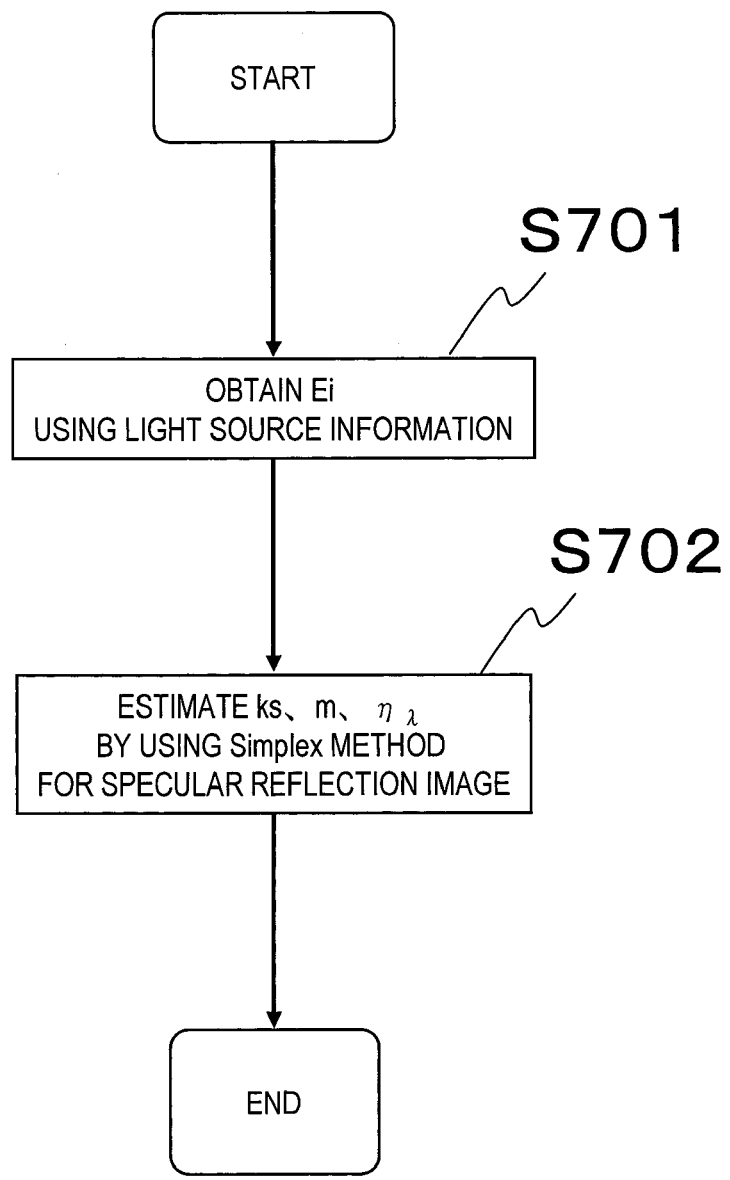
FIG. 66 A chart showing the flow of a specular reflection image parameter estimation process in an image synthesis process according to one embodiment of the present invention.

FIG. 66 is a chart showing the flow of the process performed by the parameter estimation section 306. The process includes the following two steps.

First, the incident illuminance Ei is obtained by using the light source information (step S701). Herein, the process uses the light source position information obtained by the light source information estimating section 304, the distance information between the image capture device and the object obtained by the shape information obtaining section 305, and the light source illuminance obtained by the light source information obtaining section 304. This can be obtained from the following expression.

Expression 41

$$E_i = \frac{R_1^2}{R_2^2} \cdot \frac{\cos\theta_1}{\cos\theta_2} \cdot I_i \qquad [\text{Exp. 51}]$$

Figure 67:
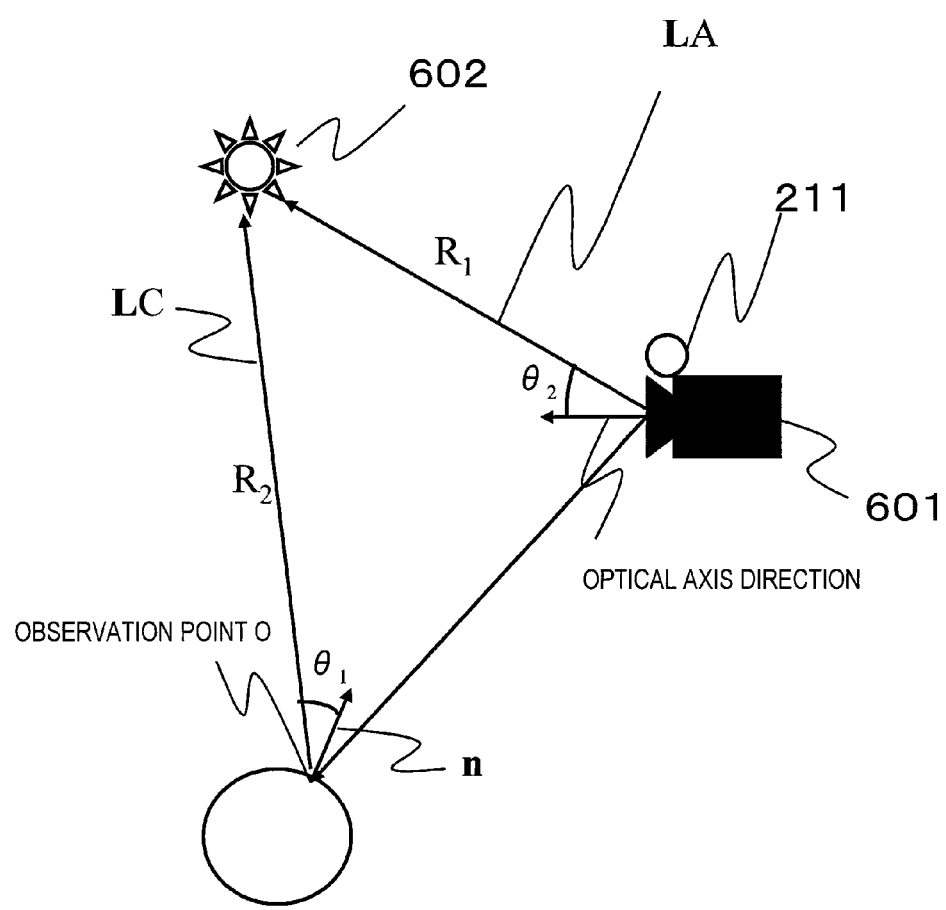
FIG. 67 A conceptual diagram illustrating various parameters of an expression representing the incident illuminance.

It is assumed that the image capture device 601 is provided with the illuminometer 211, as described above. Herein, $I_i$ denotes the incident illuminance of the light source 602 measured by the illuminometer 211, $R_1$ the distance between the image capture device 601 and the light source 602, $R_2$ the distance between the light source 602 and the observation point O, $\theta_1$ the angle between the normal direction vector n at the observation point O and the light source direction vector LC, and $\theta_2$ the angle between the optical axis direction in the image capture device 601 and the light source direction vector LA (see FIG. 67). Where it can be assumed that the size of the object is sufficiently smaller than the distance $R_2$ between the light source 602 and the observation point O, the distance R2 will be equal at all the observation points O on the object. Therefore, ($R_1/R_2$) in Expression 42 becomes a constant, and no longer needs to be actually measured. $\theta_1$ is known. This is because the normal direction vector n at the observation point O is known by the shape information obtaining section, and the light source direction vector LC is known by the light source information estimating section 304. Moreover, $\theta_2$ is known if the position of the light source is estimated by the light source information estimating section 304. Therefore, the right side of Expression 42 is all known.

Next, the unknown parameters m, ηλ and $k_s$ are estimated by using the simplex method (step S702). The simplex method is a method in which variables are assigned to vertices of a shape called a "simplex", and a function is optimized by changing the size and shape of the simplex (Noboru Ota, "Fundamentals Of Color Reproduction Optics", pp. 90-92, Corona Publishing Co., Ltd.). A simplex is a collection of (n+1) points in an n-dimensional space. Herein, n is the number of unknowns to be estimated and is herein "3". Therefore, the simplex is a tetrahedron. With vectors $x_i$ representing the vertices of the simplex, new vectors are defined as follows.

Expression 43

$$x_h = \underset{x_i}{\operatorname{argmax}}\{f(x_i)\},\ i = 1, 2, \ldots, n+1 \qquad [\text{Exp. 52}]$$

$$x_s = \underset{x_i}{\operatorname{argmax}}\{f(x_i)\},\ i \neq h \qquad [\text{Exp. 53}]$$

$$x_l = \underset{x_i}{\operatorname{argmax}}\{f(x_i)\},\ i = 1, 2, \ldots, n+1 \qquad [\text{Exp. 54}]$$

Expression 44

$$x_0 = \sum \frac{x_i}{n+1},\ i \neq h,\ i = 1, 2, \ldots, n+1 \qquad [\text{Exp. 55}]$$

where $$\underset{x_i}{\operatorname{argmax}}\{f(x_i)\}, \qquad [\text{Exp. 56}]$$

$$\underset{x_i}{\operatorname{argmax}}\{f(x_i)\} \qquad [\text{Exp. 57}]$$

denote $x_i$ that maximizes and minimizes the function $f(x_i)$, respectively.

The three operations used in this method are defined as follows.

1. Reflection:

[Exp. 58]

$$x_r = (1+\alpha)x_0 - \alpha x_h \qquad \text{Expression 45}$$

2. Expansion:

[Exp. 59]

$$X_e = \beta x_r + (1-\beta)x_h \qquad \text{Expression 46}$$

3. Contraction:

[Exp. 60]

$$x_c = \gamma x_h + (1-\gamma)x_0 \qquad \text{Expression 47}$$

Herein, α(>0), β(>1) and γ(1>γ>0) are coefficients.

The simplex method is based on the assumption that by selecting one of the vertices of the simplex that has the greatest function value, the function value in the reflection will be small. If this assumption is correct, it is possible to obtain the minimum value of the function by repeating the same process. Specifically, parameters given by initial values are updated by the three operations repeatedly until the error with respect to the target represented by the evaluation function becomes less than the threshold. Herein, m, $\eta_\lambda$ and $k_s$ are used as parameters, and the difference $\Delta I_s$ between the specular reflection component image calculated from Expression 29 and the specular reflection component image obtained by the area dividing section 303, represented by Expression 48, is used as the evaluation function.

Expression 48

$$\Delta I_s = \sum_j \sum_i M_{s(i,j)} (i'_{s(i,j)} - i_{s(i,j)})^2 \qquad \text{[Exp. 61]}$$

Herein, $i_{s(i,j)}'$ and $i_{s(i,j)}$ are the calculated specular reflection image estimate value $I_s'$, and the luminance value of the pixel (i,j) of the specular reflection component image $I_s$ obtained by the area dividing section 303, and $M_{s(i,j)}$ is a function that takes 1 when the pixel (i,j) has a specular reflection component and 0 otherwise.

Figure 68:
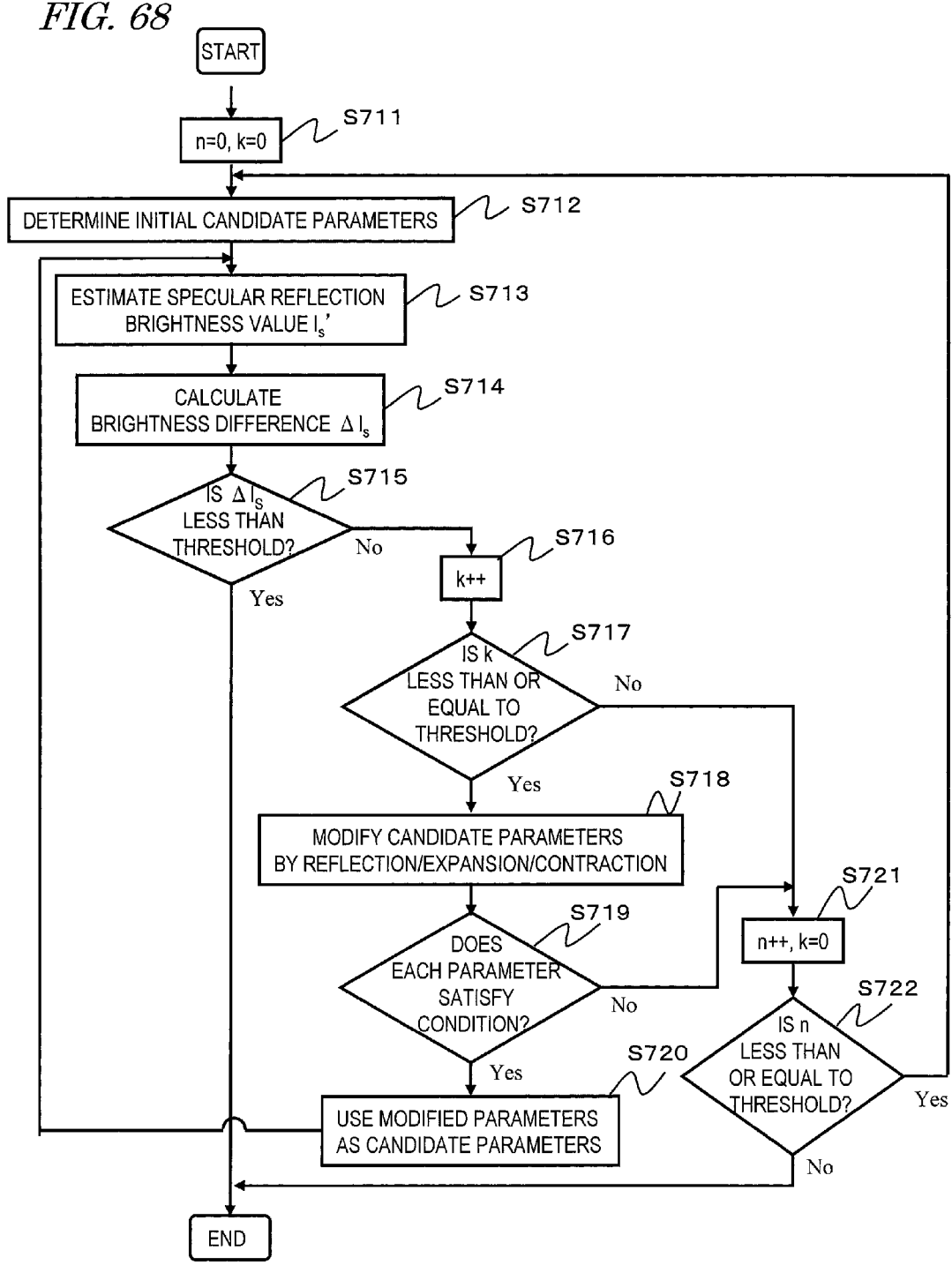
FIG. 68 A flow chart showing the flow of a parameter estimation process by a simplex method.

This process will now be described in detail. FIG. 68 is a flow chart illustrating the flow of this process.

First, the counters n and k for storing the number of times the updating operation has been repeated are initialized to 0 (step S711). The counter n is a counter for storing the number of times the initial value has been changed, and k is a counter for storing the number of times the candidate parameter has been updated by the simplex for an initial value.

Then, random numbers are used to determine the initial values of the candidate parameters m', $\eta_\lambda'$ and $k_s'$ of estimate parameters (step S712). Based on the physical constraints of the parameters, the range of initial values was determined as follows.

[Exp. 62]

$m \geq 0$ $\eta_\lambda \geq 1.0$ $0 \leq k_s \leq 1.0$ $0 \leq F_\lambda \leq 1.0$ $0 \leq D$ \hfill Expression 49

Then, the obtained candidate parameters are substituted into Expression 29 to obtain the specular reflection image estimate value $I_s'$ (step S713). Moreover, the difference $\Delta I_s$ between the calculated specular reflection image estimate value $I_s'$ and the specular reflection component image obtained by the area dividing section 303 is obtained from Expression 48, and this is used as the evaluation function of the simplex method (step S714). If the obtained $\Delta I_s$ is sufficiently small (Yes in step S715), the candidate parameters m', $\eta_\lambda'$ and $k_s'$ are selected as the estimate parameters m, $\eta_\lambda$ and $k_s$, assuming that the parameter estimation has been succeeded, and the process is ended. On the other hand, if $\Delta I_s$ is large (No in step S715), the candidate parameters are updated by the simplex method.

Before the candidate parameters are updated, the number of times update has been done is evaluated. First, 1 is added to the counter k storing the number of times update has been done (step S716), and the value of the counter k is judged (step S717). If the counter k is sufficiently large (No in step S717), it is determined that the operation has been repeated sufficiently, but the value has dropped to the local minimum and the optimal value will not be reached by repeating the update operation, and therefore the initial values are changed to attempt to escape from the local minimum. Therefore, 1 is added to the counter n and the counter k is set to 0 (step S721). It is determined whether the value of the counter n is higher than the threshold to thereby determine whether the process should be continued as it is or the process should be ended as being unprocessable (step S722). If n is greater than the threshold (No in step S722), the process is ended, determining that the image cannot be estimated. On the other hand, if n is smaller than the threshold (Yes in step S722), initial values are re-selected from random numbers within the range of Expression 49 (step S712) to repeat the process. Such a threshold for k may be, for example, 100, or the like. On the other hand, in step S717, if the counter k is less than or equal to the threshold (Yes in step S717), the candidate parameters are changed by using Expressions 45 to 47 (step S718). This process will be described later.

Then, it is determined whether the modified candidate parameters are meaningful as a solution (step S719). That is, the modified parameters may become physically meaningless values (for example, the roughness parameter m being a negative value) as the simplex method is repeated, and such a possibility is eliminated. For example, the following conditions may be given so that a parameter is determined to be meaningful if it satisfies the condition and meaningless otherwise.

[Exp. 63]

$0 \leq m$ $1.0 \leq \eta_\lambda$ $0.0 \leq k_s \leq 1.0$ $0.0 \leq D$ $0.0 \leq F_\lambda \leq 1.0$ \hfill Expression 50

These values can be obtained from the object. For example, the refractive index $\eta_\lambda$ is a value determined by the material of the object. For example, it is known to be 1.5 to 1.7 for plastic and 1.5 to 1.9 for glass, and these values can be used. That is, if the object is plastic, the refractive index $\eta_\lambda$ can be set to 1.5 to 1.7.

If the modified parameters satisfy Expression 50 (Yes in step S719), it can be assumed that the candidate parameters are meaningful values, and they are set as new candidate parameters (step S720), and the update process is repeated (step S713). On the other hand, if the modified parameters do not satisfy Expression 50 (No in step S719), the update process for the initial values is canceled, and the update is performed with new initial values (step S721).

Figure 69:
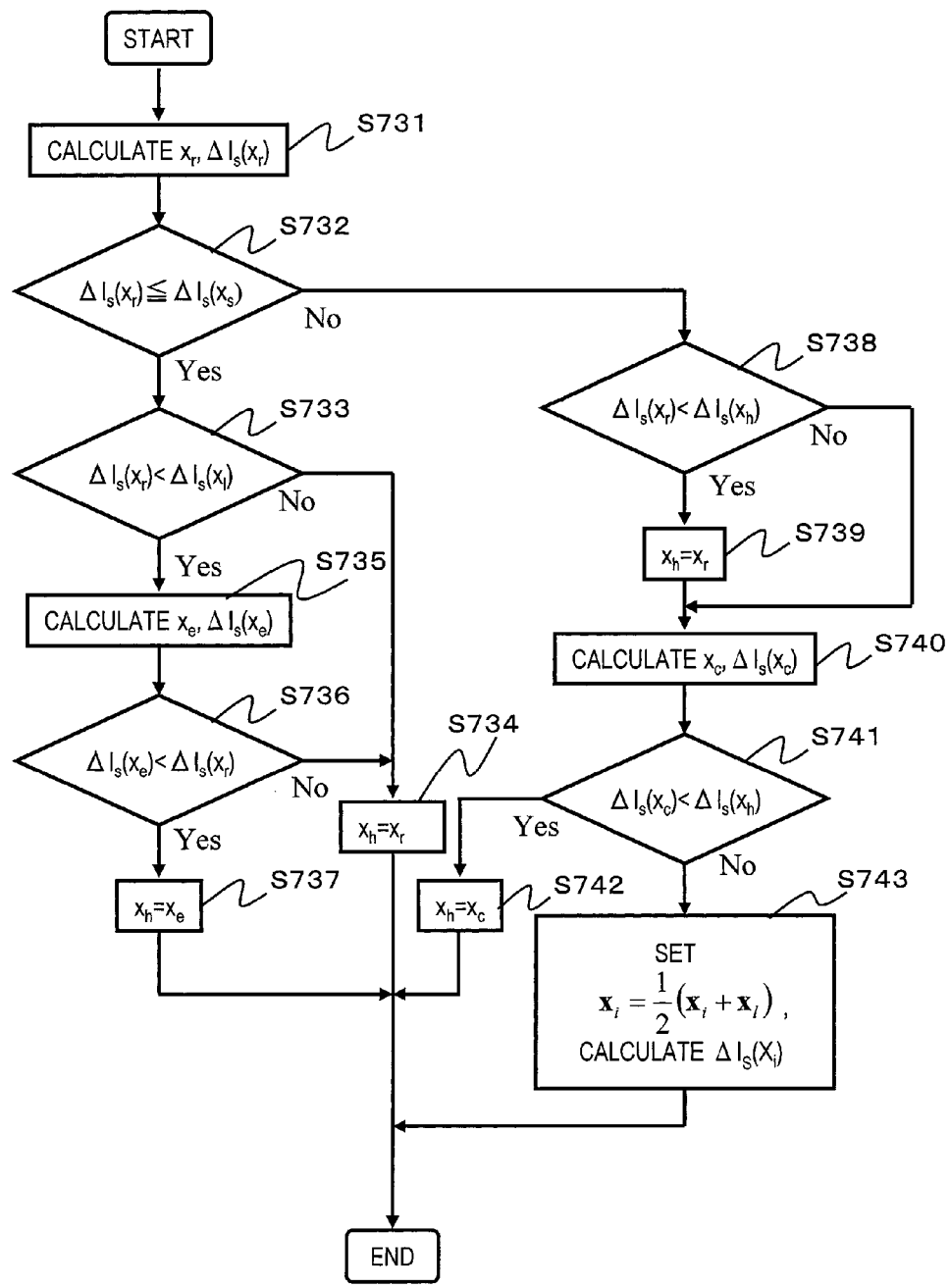
FIG. 69 A flow chart showing the flow of a parameter updating process in a simplex method.

The modifying process in step S718 will now be described in detail. FIG. 69 is a flow chart showing the flow of the process. Herein, the candidate parameters m', $\eta_\lambda'$ and $k_s'$ are represented as a vector and it is used as the parameter x. That is,

[Exp. 64]

$x = [m' \eta_{s,\lambda}' k_s']^T$

First, by using Expression 43, Expression 44 and Expression 45, the parameter $x_r$ having gone through the reflection operation is calculated, and Expression 48 is used to calculate the difference $\Delta I_s(x_r)$ with respect to the specular reflection component image with $x_r$ (step S731). Then, the obtained $\Delta I_s(x_r)$ and $\Delta I_s(x_s)$ of which the evaluation function is the second worst are compared with each other (step S732). If ΔI$_s$(x$_r$) is smaller than ΔI$_s$(x$_s$) (Yes in step S732), the evaluation value ΔI$_s$(x$_r$) having gone through the reflection operation and ΔI$_s$(x$_l$) whose evaluation value is currently the best are compared with each other (step S733). If ΔI$_s$(x$_r$) is greater than or equal to ΔI$_s$(x$_l$) (No in step S733), x$_h$ of which the evaluation value is lowest is changed to x$_r$ (step S734), and the process is ended.

On the other hand, if ΔI$_s$(x$_r$) is smaller than ΔI$_s$(x$_l$) (Yes in step S733), Expression 46 is used to perform the expansion process and to calculate the difference ΔI$_s$(x$_e$) between the parameter x$_e$ and the specular reflection component image with x$_e$ (step S735). Then, the obtained ΔI$_s$(x$_r$) and ΔI$_s$(x$_r$) obtained by the reflection operation are compared with each other (step S736). If ΔI$_s$(x$_e$) is smaller than ΔI$_s$(x$_r$) (Yes in step S736), x$_h$ of which the evaluation value is worst is changed to x$_e$ (step S737), and the process is ended.

On the other hand, if ΔI$_s$(x$_e$) is greater than ΔI$_s$(x$_r$) (No in step S736), x$_h$ of which the evaluation value is worst is changed to x$_r$ (step S734), and the process is ended.

In step S732, if ΔI$_s$(x$_r$) is greater than ΔI$_s$(x$_s$) (No in step S732), the evaluation value ΔI$_s$(x$_r$) having gone through the reflection operation and ΔI$_s$(x$_h$) of which the evaluation value is currently worst are compared with each other (step S738). If ΔI$_s$(x$_r$) is smaller than ΔI$_s$(x$_h$) (Yes in step S738), x$_h$ of which the evaluation value is worst is changed to x$_r$ (step S739), and Expression 46 is used to calculate the difference ΔI$_s$(x$_c$) between the parameter x$_c$ having gone through the contraction operation and the specular reflection component image with x$_c$ (step S740). On the other hand, if ΔI$_s$(x$_r$) is greater than ΔI$_s$(x$_h$) (No in step S738), the difference ΔI$_s$(x$_c$) between the parameter x$_c$ having gone through the contraction operation and the specular reflection component image with x$_c$ is calculated (step S740) without changing x$_h$.

Then, the obtained ΔI$_s$(x$_c$) and ΔI$_s$(x$_h$) of which the evaluation value is worst are compared with each other (step S741). If ΔI$_s$(x$_c$) is smaller than ΔI$_s$(x$_h$) (Yes in step S741), x$_h$ of which the evaluation value is worst is changed to x$_c$ (step S742), and the process is ended.

On the other hand, if ΔI$_s$(x$_c$) is greater than ΔI$_s$(x$_h$) (No in step S741), all the candidate parameters x$_i$ (i=1, 2, 3, 4) are changed as shown in the following expression, and the process is ended.

$$x_i = \frac{1}{2}(x_i + x_l) \quad \text{[Exp. 65]}$$

By repeating the process described above, m, η$_λ$ and k$_s$, being unknown parameters in the specular reflection image, are estimated.

By the process described above, it is possible to estimate all the unknown parameters.

Figure 70:
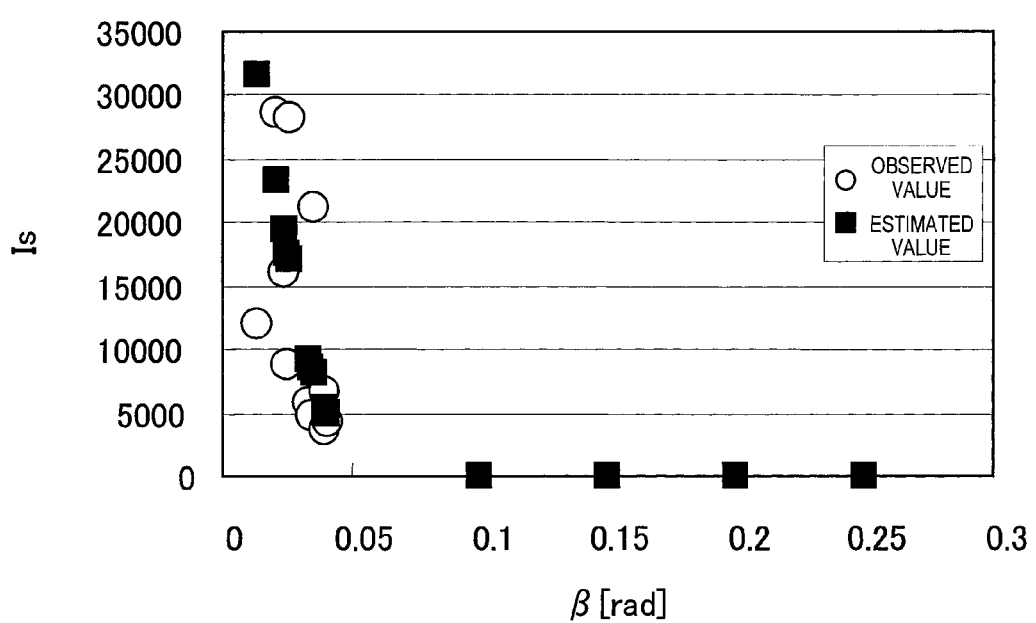
FIG. 70 A schematic graph showing BRDF obtained by using the area dividing device according to the first embodiment of the present invention.

FIG. 70 is a graph representing the half-way vector p along the horizontal axis and the luminance value Is of the specular reflection component along the vertical axis, for the area C of FIG. 75(a). In the graph, the open circular dots are obtained by plotting the luminance value Is observed for the area C. The solid squares are obtained by estimating and plotting the parameters of the Cook-Torrance model.

Figure 76:
FIG. 76 A synthesized image produced by using a conventional area dividing approach.

Note that FIG. 75(b) is a graph obtained where a conventional area dividing approach is used, as described above. FIG. 76 shows a synthesized image produced by using a conventional area dividing approach. Thus, if the parameter estimation fails, the texture of the synthesized image will be substantially different from the actual texture.

From these figures, it can be seen that with the conventional area dividing approach, the separation precision between the specular reflection component and the diffuse reflection component is low, and the reflection parameter estimation has therefore failed. Therefore, the synthesized image will have a substantially different texture from that of the actual image, as shown in FIG. 76. On the other hand, such a problem does not occur with the area dividing approach of the present invention.

The model used for the parameter estimation does not need to be the Cook-Torrance model, but may be, for example, the Torrance-Sparrow model, the Phong model, or the simplified Torrance-Sparrow model (for example, K. Ikeuchi and K. Sato, "Determining Reflectance Properties Of An Object Using Range And Brightness Images", IEEE Transactions on Pattern Analysis and Machine Intelligence, vol. 13, no. 11, pp. 1139-1153, 1991).

The parameter estimating method does not need to be the simplex method, but may be an ordinary parameter estimating method, such as, for example, the gradient method or the method of least squares.

The process described above may be performed for each pixel, or an equal set of parameters may be estimated for each of divided areas. Where the process is performed for each pixel, it is preferred to obtain samples in which known parameters such as the normal direction vector n of the object, the light source vector L or the viewing vector V are varied by moving the light source, the image capture device or the object. Where the process is performed for each area, it is preferred that the division of areas is changed so that variations in the parameters obtained for different areas are little so as to realize an optimal parameter estimation.

The parameter DB 307 stores, as model parameters, the reflection parameter for the diffuse reflection component and the reflection parameter for the specular reflection component obtained by the parameter estimation section 306, and the shape information obtained by the shape information obtaining section 305. FIG. 71 is a schematic diagram showing the model parameters stored in the parameter DB 307.

By the above process, the parameter estimation device 300 estimates parameters of the diffuse reflection component and parameters of the specular reflection component, and stores the estimated parameter information in the parameter DB 307.

Next, the image synthesis apparatus 301 will be described.

The viewpoint/light source information obtaining section 308 obtains the viewpoint and the light source information of an image to be synthesized. This may be done by the user inputting the viewpoint position, the light source position/light source illuminance, and the ambient light component information. Where a CG image is rendered on the real world, such as with the augmented reality, the light source information may be estimated by using the light source information estimating section 304.

The rendering section 309 synthesizes an image according to the viewpoint and the light source information obtained by the viewpoint/light source information obtaining section 308 by using the model parameter information stored in the parameter DB 307. The rendering section 309 separately renders the diffuse reflection component and the specular reflection component, and synthesizes an image by combining together the rendered diffuse reflection component, the rendered specular reflection component, and the ambient light component information.

First, the process will be described for the diffuse reflection component. As described above, an albedo image is what is obtained by dividing the diffuse component image by the inner product between the light source vector and the normal direction vector of the object. Thus, the diffuse reflection component can be synthesized by using the light source direction vector information obtained by the viewpoint/light source information obtaining section 308, together with the albedo image (estimated by the parameter estimation section 306) and the shape information (obtained by the shape information obtaining section 305) stored in the parameter DB. Specifically, the diffuse component image is synthesized by obtaining the inner product between the light source direction vector obtained by the viewpoint/light source information obtaining section 308 and the normal direction vector of the object, and further multiplying it with the albedo image. Where a plurality of light sources are input from the viewpoint/light source information obtaining section 308, the process synthesizes a diffuse reflection component image for each of the light sources and combines together the images to synthesize a single diffuse reflection component image.

Next, the process for the specular reflection component will be described. The specular reflection component can be synthesized by using the light source direction vector information obtained by the viewpoint/light source information obtaining section 308, together with the specular reflection parameter (estimated by the parameter estimation section 306) and the shape information (obtained by the shape information obtaining section 305) stored in the parameter DB. Specifically, the specular reflection component image is synthesized by substituting the estimated parameters into Expressions 29 to 37.

The rendering section 309 synthesizes an image according to the viewpoint and the light source information obtained by the viewpoint/light source information obtaining section 308 by synthesizing together the diffuse reflection component image and the specular reflection component image, thus obtained, and the ambient light component information obtained by the viewpoint/light source information obtaining section 308.

As described above, by using the area dividing method of the present invention, it is possible to perform, with a high precision, a model-based image synthesis used in digital archives, etc.

INDUSTRIAL APPLICABILITY

With the image process of the present invention, it is possible to more accurately separate between a specular reflection area and a diffuse reflection area by using two kinds of information, i.e., the light source condition dependency and the polarization information. Since an area dividing process can be achieved with an image that is captured as if taking a snapshot, the present invention is useful for various types of digital still cameras, digital camcorders and surveillance cameras.

REFERENCE SIGNS LIST

101 illumination section
102 illumination control section
103 polarization image capturing section
104 polarization information obtaining section
105 light source dependency estimation section
106 area dividing section
107 captured image determination section.
108 illumination device
109 area dividing device
110 communication section
111 communication section
112 illumination position changing section
120 control section
121 illumination unit
122 polarization information obtaining section

The invention claimed is:

1. An image processing apparatus for capturing an image of an object and thereby performing an optical area division of a surface of the object, comprising:
   a polarization image capturing section for obtaining a polarization image of the object by receiving light having passed through a three-way or more polarizer having different polarization main axis angles,
   wherein the area division is performed based on a polarization state on the surface of the object and a light source dependency, which represents a degree of change in the polarization state on the surface of the object occurring when changing at least one of a polarization state of light emitted from a light source and a light source position.

2. The image processing apparatus according to claim 1, comprising:
   an illumination unit including the light source and being capable of changing at least one of the polarization state of light emitted from the light source and the light source position; and
   a control section for synchronizing the changing by the illumination unit of at least one of the polarization state of light emitted from the light source and the light source position with the image-capturing by the polarization image capturing section.

3. The image processing apparatus according to claim 2, comprising:
   an illumination control section for changing the polarization state of light emitted from the light source;
   a polarization information obtaining section for generating, from the obtained polarization image, polarization information for received polarized light by using a correspondence with a brightness of the light having passed through the three-way or more polarizer, for each of unit pixels of the polarization image;
   a light source dependency estimation section for estimating light source dependency information by making a comparison between the polarization information generated by the polarization information obtaining section when the polarization state of light emitted from the light source is changed by the illumination control section; and
   an area dividing section for performing the area division based on the polarization information generated by the polarization information obtaining section and light source variation information estimated by the light source dependency estimation section.

4. The image processing apparatus according to claim 3, wherein the polarization information obtaining section generates, as the polarization information, at least one of a degree of polarization, a polarization phase, a polarization estimation error, a polarization maximum luminance value, and a polarization minimum luminance value.

5. The image processing device according to claim 4, wherein the area dividing section performs the area division so that the surface of the object is divided into areas each being a diffuse reflection area or a specular reflection area.

6. The image processing apparatus according to claim 4, wherein the area dividing section performs the area division so that the surface of the object is divided into areas each being a diffuse reflection non-polarized area, a diffuse reflection polarized area, or a specular reflection polarized area.

7. The image processing apparatus according to claim 4, wherein the area dividing section performs the area division so that the surface of the object is divided into areas each being a light source-dependent polarized area, a light source-dependent non-polarized area, a light source-independent polarized area, or a light source-independent non-polarized area.

8. The image processing apparatus according to claim 2, comprising:
   an illumination position changing section for changing the position of the light source;
   a polarization information obtaining section for generating, from the obtained polarization image, polarization information for received polarized light by using a correspondence with a brightness of the light having passed through the three-way or more polarizer, for each of unit pixels of the polarization image;
   a light source dependency estimation section for estimating light source dependency information by making a comparison between the polarization information generated by the polarization information obtaining section when the position of the light source is changed by the illumination control section; and
   an area dividing section for performing the area division based on the polarization information generated by the polarization information obtaining section and light source variation information estimated by the light source dependency estimation section.

9. The image processing apparatus according to claim 8, comprising:
   a plurality of illumination sections of different light source positions,
   wherein the illumination position changing section changes a position of illumination section by switching between the plurality of illumination sections.

10. The image processing apparatus according to claim 8, wherein the illumination position changing section changes the light source position by moving an illumination section.

11. The image processing apparatus according to claim 8, wherein the area dividing section performs the area division so that the surface of the object is divided into areas each being a diffuse reflection area or a specular reflection area.

12. The image processing apparatus according to claim 8, wherein the area dividing section performs the area division so that the surface of the object is divided into areas each being a specular reflection area, a diffuse reflection area, or a shaded area.

13. An image processing system comprising an illumination device and an area dividing device for capturing an image of an object and thereby performing an optical area division of a surface of the object,
   the illumination device comprising:
   an illumination section for emitting linearly-polarized light onto the object; and
   an illumination control section for changing a polarization state of the linearly-polarized light of the illumination section,
   the area dividing device comprising:
   a polarization image capturing section for obtaining a polarization image of the object by receiving light having passed through a three-way or more polarizer having different polarization main axis angles;
   a captured image determination section for comparing a polarization image captured in a past by the polarization image capturing section with a currently-captured polarization image to thereby determine whether the captured polarization states have changed sufficiently;
   a polarization information obtaining section for generating, from the obtained polarization image, polarization information for received polarized light by using a correspondence with a brightness of the light having passed through the three-way or more polarizer, for each of unit pixels of the polarization image;
   a light source dependency estimation section for estimating a light source dependency information by making a comparison between the polarization information generated by the polarization information obtaining section when it is determined by the captured image determination section that the polarization state of the illumination section has been changed by the illumination control section; and
   an area dividing section for performing the area division by using the polarization information generated by the polarization information obtaining section and light source variation information estimated by the light source dependency estimation section.

14. An image processing system comprising an illumination device and an area dividing device for capturing an image of an object and thereby performing an optical area division of a surface of the object,
   the illumination device comprising:
   an illumination section for emitting linearly-polarized light onto the object;
   an illumination control section for changing a polarization state of the linearly-polarized light of the illumination section; and
   a communication section for transmitting a signal indicating a light emission to the area dividing device and receiving a signal indicating a completion of image-capturing from the area dividing device,
   the area dividing device comprising:
   a communication section for receiving a signal indicating a light emission from the illumination device and transmitting a signal indicating a completion of image-capturing to the illumination device;
   a polarization image capturing section for obtaining a polarization image of the object by receiving light having passed through a three-way or more polarizer having different polarization main axis angles;
   a captured image determination section for comparing a polarization image captured in a past by the polarization image capturing section with a currently-captured polarization image to thereby determine whether the captured polarization states have changed sufficiently;
   a polarization information obtaining section for generating, from the obtained polarization image, polarization information for received polarized light by using a correspondence with a brightness of the light having passed through the three-way or more polarizer, for each of unit pixels of the polarization image;
   a light source dependency estimation section for estimating light source dependency information by making a comparison between the polarization information generated by the polarization information obtaining section when it is determined by the captured image determination section that the polarization state of the illumination section has been changed by the illumination control section; and
   an area dividing section for performing the area division by using the polarization information generated by the polarization information obtaining section and light source variation information estimated by the light source dependency estimation section.

15. An area dividing method for capturing an image of an object and thereby performing an optical area division of a surface of the object, comprising:
- an illumination step of emitting linearly-polarized light onto the object;
- an illumination control step of changing a polarization state of the linearly-polarized light of the illumination section;
- a polarization image capturing step of obtaining a polarization image of the object by receiving light having passed through a three-way or more polarizer having different polarization main axis angles;
- a polarization information obtaining step of generating, from the obtained polarization image, polarization information for received polarized light by using a correspondence with a brightness of the light having passed through the three-way or more polarizer, for each of unit pixels of the polarization image;
- a control step of synchronizing the illumination control step with the polarization image capturing step;
- a light source dependency estimation step of estimating light source dependency information by making a comparison between the polarization information generated by the polarization information obtaining step when the polarization state of the illumination step is changed by the illumination control step; and
- an area dividing step of performing the area division by using the polarization information generated by the polarization information obtaining step and light source variation information estimated by the light source dependency estimation step.

16. A non-transitory computer readable medium having stored thereon a program for an area dividing device for capturing an image of an object and thereby performing an optical area division of a surface of the object,
- wherein the program instructs a computer to perform steps included in the area dividing method according to claim 15.

17. A model-based image synthesis device comprising a parameter estimation device and an image synthesis apparatus for synthesizing an image using a reflection model,
the parameter estimation device comprising:
- an image capturing section for capturing an image of an object;
- an area dividing section for performing an optical area division of an image captured by the image capturing section according to the area dividing method according to claim 15;
- a light source information estimating section for estimating light source information regarding a light source illuminating the object;
- a shape information obtaining section for obtaining, as shape information, surface normal information or 3-dimensional position information of the object;
- a parameter estimation section for estimating a reflection model parameter by modeling the light source information estimated by the light source information estimating section for each area divided by the area dividing section and the shape information obtained by the shape information obtaining section, from the captured image of the object; and
- a parameter database for storing the reflection parameter estimated by the parameter estimation section, the image synthesis apparatus comprising:
- a viewpoint/light source information obtaining section for obtaining a viewpoint or light source information of an image to be synthesized; and
- a rendering section for synthesizing an image according to the viewpoint or light source information obtained by the viewpoint/light source information obtaining section by using the reflection parameter information stored in the parameter database.

18. A model-based image synthesis method comprising a parameter estimation step and an image synthesis method step for synthesizing an image using a reflection model,
the parameter estimation step comprising:
- an image capturing step of capturing an image of an object;
- an area dividing step of performing an optical area division of an image captured by the image capturing section according to the area dividing method according to claim 15;
- a light source information estimating step of estimating light source information regarding a light source illuminating the object;
- a shape information obtaining step of obtaining, as shape information, surface normal information or 3-dimensional position information of the object; and
- a parameter estimation step of estimating a reflection model parameter by modeling the light source information estimated by the light source information estimating section for each area divided by the area dividing section and the shape information obtained by the shape information obtaining section, from the captured image of the object, the image synthesis step comprising:
- a viewpoint/light source information obtaining step of obtaining a viewpoint or light source information of an image to be synthesized; and
- a rendering step of synthesizing an image according to the viewpoint or light source information obtained by the viewpoint/light source information obtaining section by using reflection parameter information estimated by the shape information obtaining step.

* * * * *